(12) United States Patent
Nonaka et al.

(10) Patent No.: US 6,895,181 B2
(45) Date of Patent: May 17, 2005

(54) CAMERA AND DISTANCE MEASURING METHOD THEREOF

(75) Inventors: Osamu Nonaka, Sagamihara (JP); Masataka Ide, Hachioji (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 10/644,646

(22) Filed: Aug. 20, 2003

(65) Prior Publication Data

US 2005/0031330 A1 Feb. 10, 2005

(30) Foreign Application Priority Data

| Aug. 27, 2002 | (JP) | 2002-247359 |
| Oct. 29, 2002 | (JP) | 2002-314449 |
| Nov. 7, 2002 | (JP) | 2002-324016 |
| Nov. 8, 2002 | (JP) | 2002-325266 |

(51) Int. Cl.[7] .............................................. G03B 13/36
(52) U.S. Cl. ...................................... 396/125; 348/349
(58) Field of Search ......................... 396/104, 125–128; 348/345–356

(56) References Cited

U.S. PATENT DOCUMENTS 5,597,999 A * 1/1997 Kinba et al. ............ 250/201.7
6,763,187 B2 * 7/2004 Shiraishi .................. 396/104
6,826,363 B2 * 11/2004 Taka ......................... 396/125

FOREIGN PATENT DOCUMENTS

| JP | 2000-201287 | 7/2000 |
| JP | 3115912 | 9/2000 |
| JP | 2001-141985 | 5/2001 |
| JP | 2001-249267 | 9/2001 |
| JP | 2001-255456 | 9/2001 |

* cited by examiner

Primary Examiner—W. B. Perkey
(74) Attorney, Agent, or Firm—Straub & Pokotylo; John C. Pokotylo

(57) ABSTRACT

The present invention provides a camera where a focusing position of a taking lens is adjusted as a first focus adjustment by a CPU, and as a second focus adjustment lower in accuracy but higher at a speed than the first focus adjustment. An object image is picked up through the taking lens by an imager, and an output signal of the imager is converted into image data. A compressibility of the image data obtained at the imager is set by an image processing section, and the image data is compressed in accordance with the set compressibility. Then, in accordance with the compressibility set by the image processing section, the CPU decides which of the first focus adjustment and the second focus adjustment is used to execute a final focus adjustment operation of the taking lens.

12 Claims, 30 Drawing Sheets

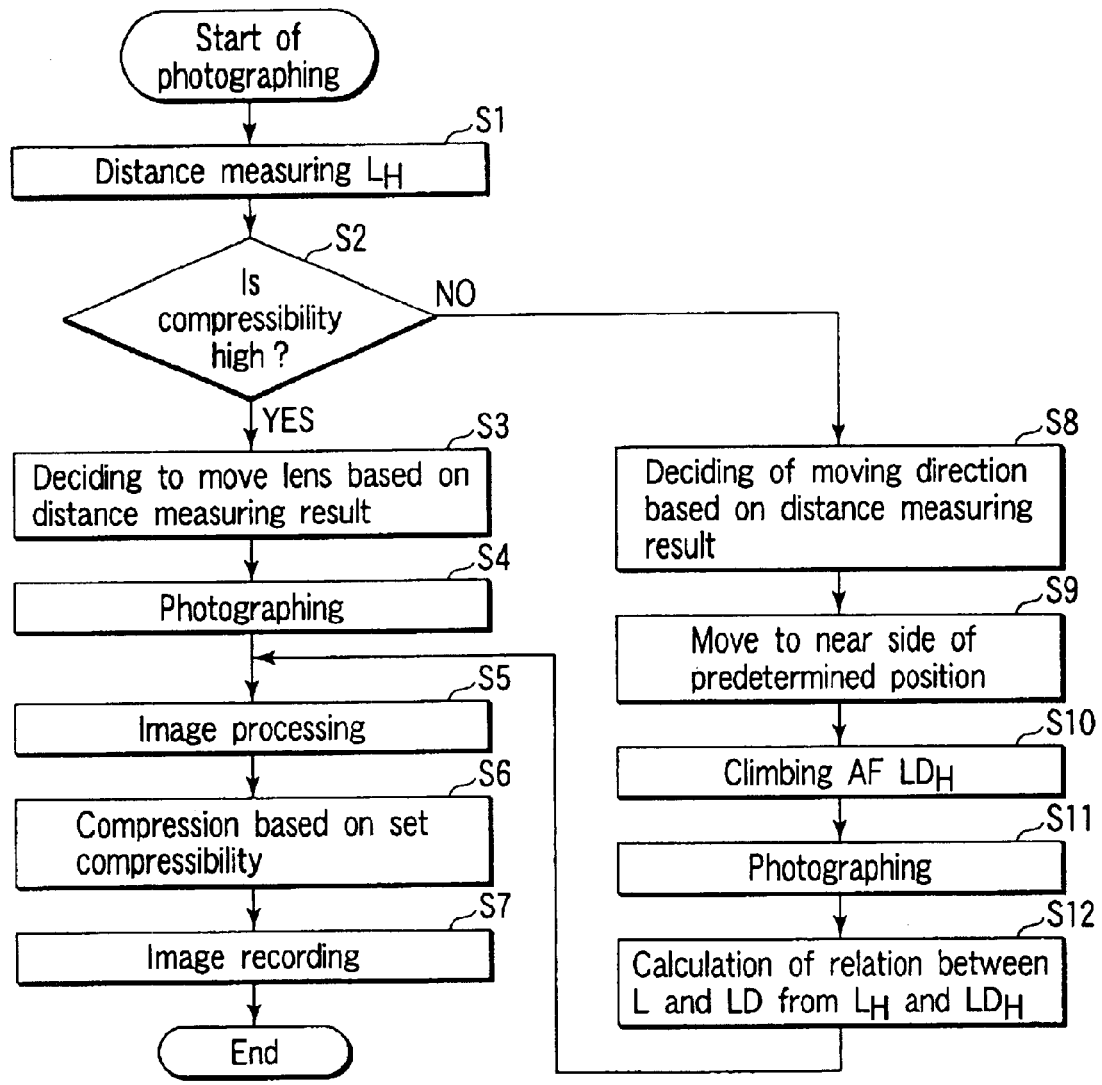
F I G. 6

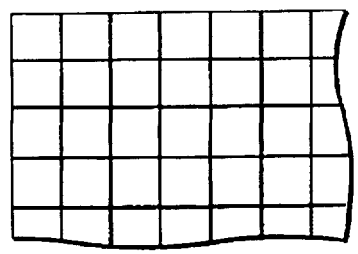
FIG. 18A
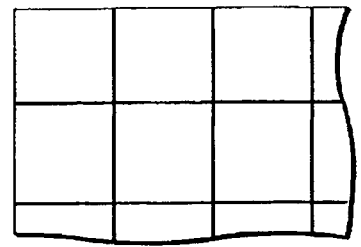
FIG. 18B
FIG. 19A  Image pattern 
FIG. 19B  Edge detection
Gain addition 
FIG. 19C  Addition result 
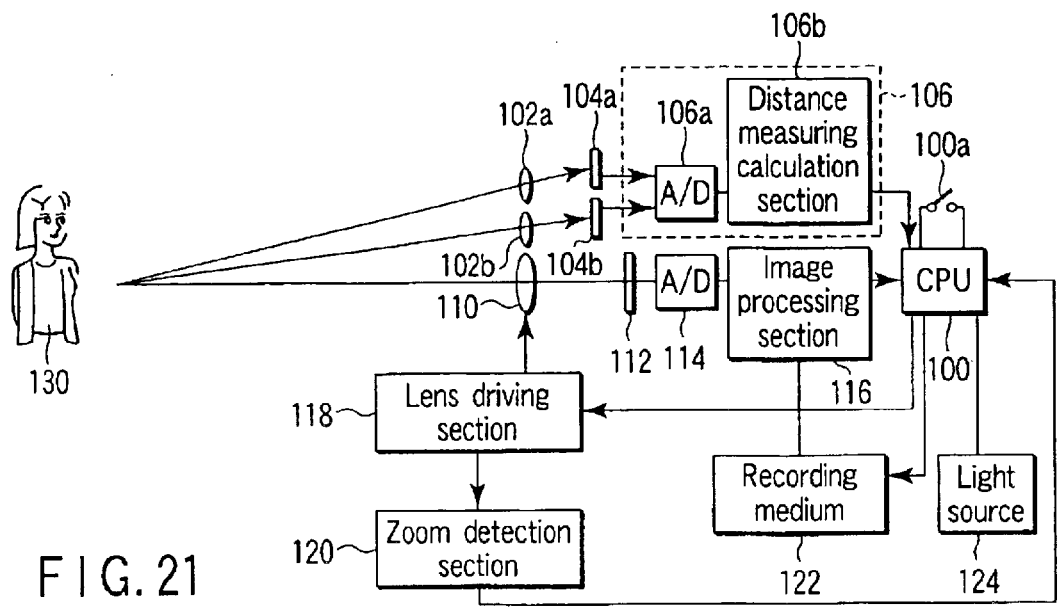
FIG. 21

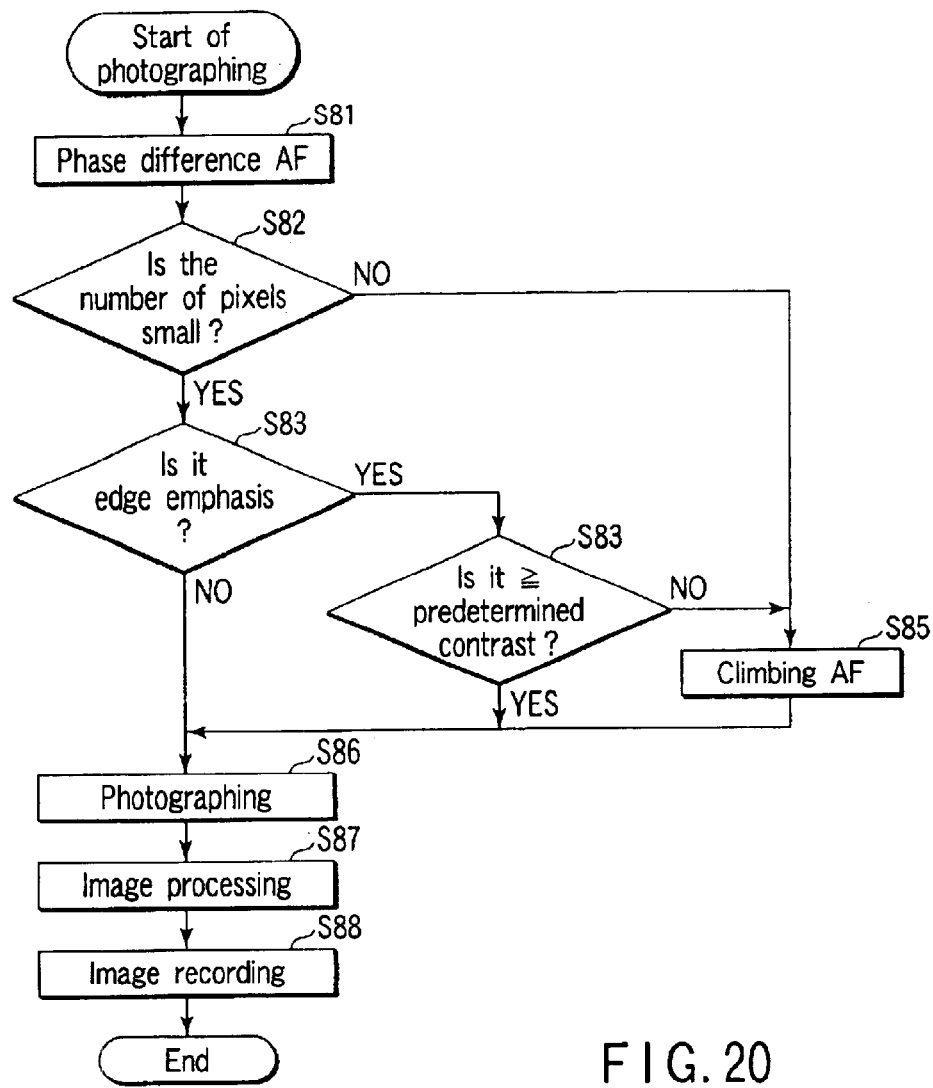
FIG. 20
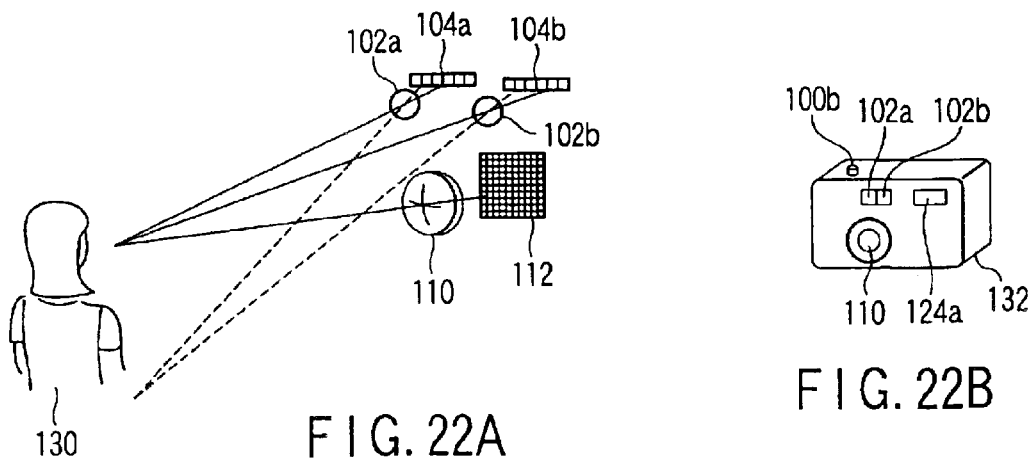
FIG. 22A
FIG. 22B

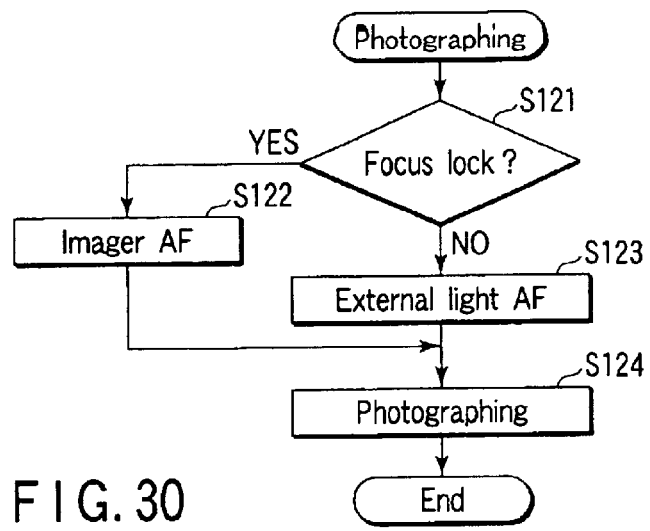
F I G. 30
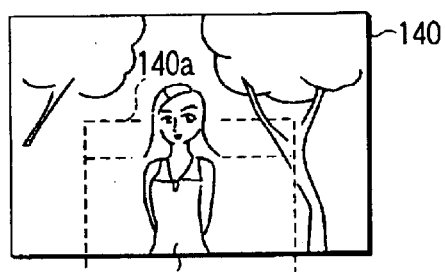
F I G. 32A
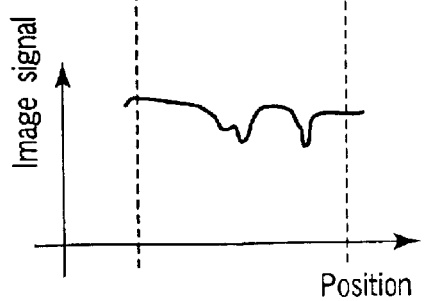
F I G. 32B
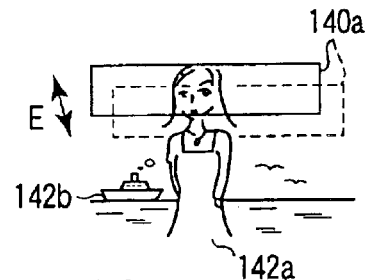
F I G. 32C
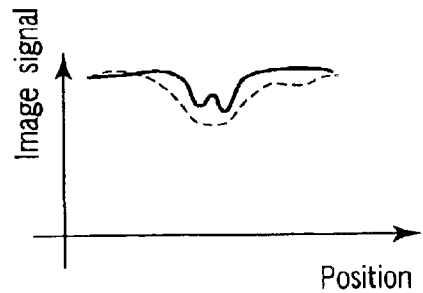
F I G. 32D

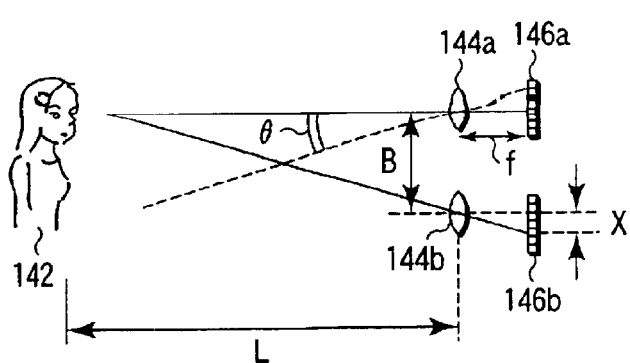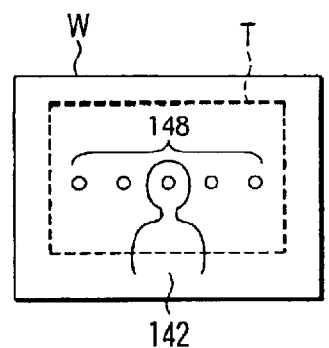
FIG. 33A  FIG. 33B
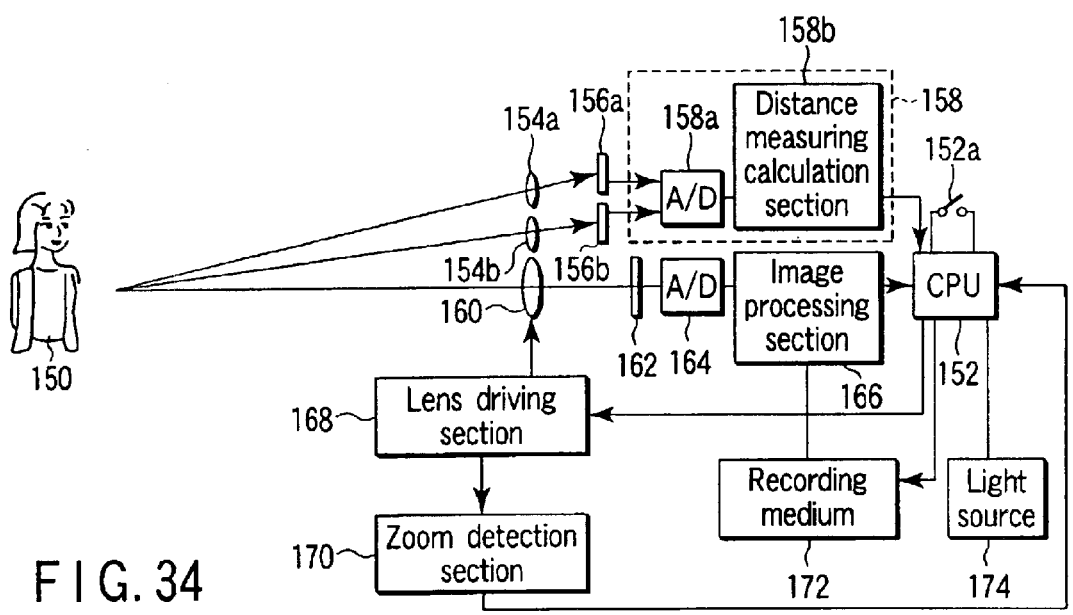
FIG. 34
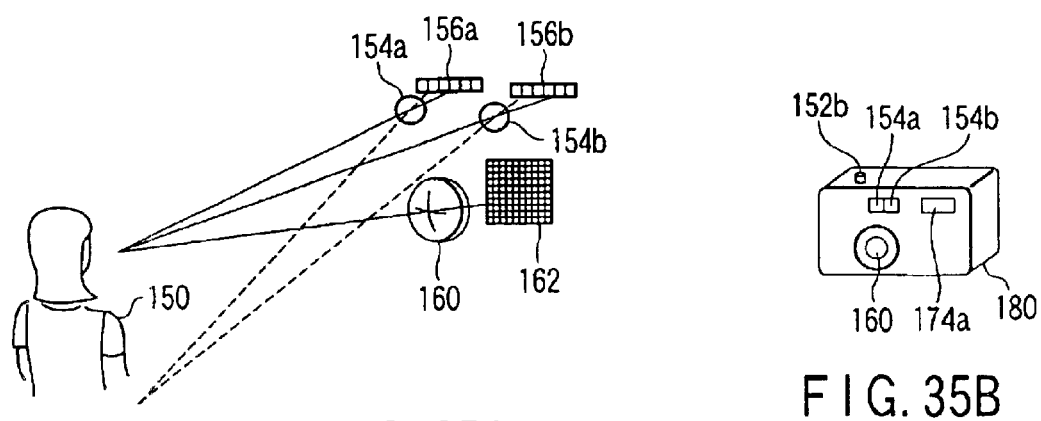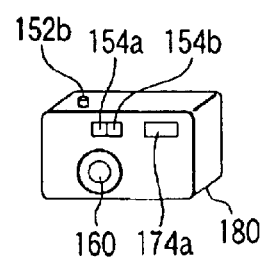
FIG. 35A  FIG. 35B

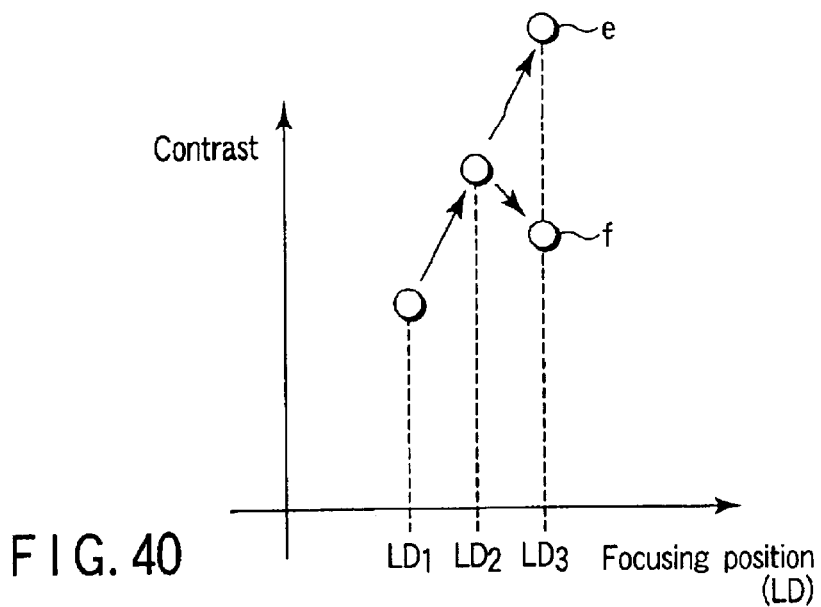
FIG. 40
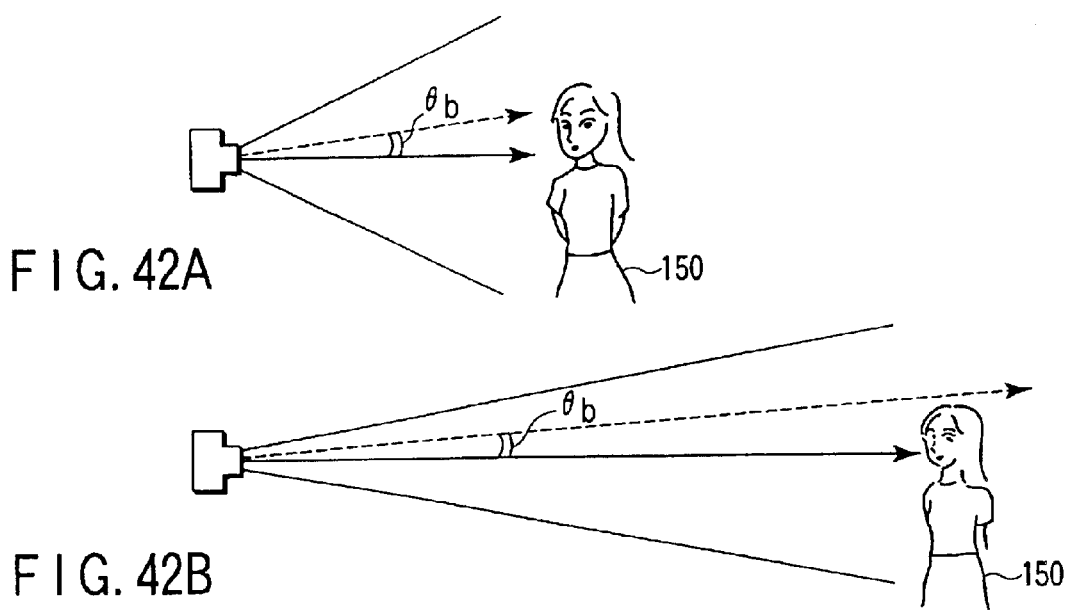
FIG. 42A
FIG. 42B
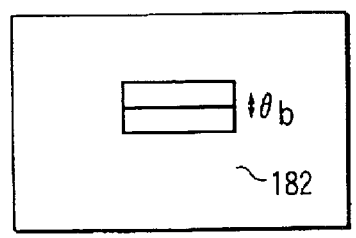 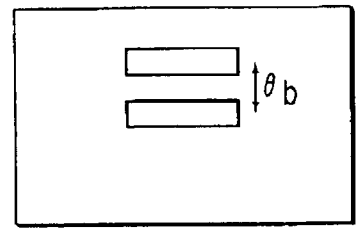
FIG. 43A    FIG. 43B

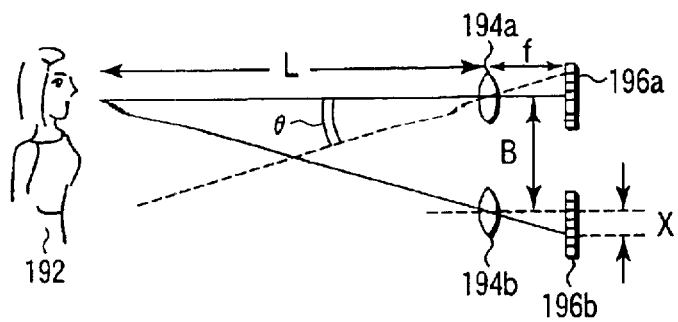
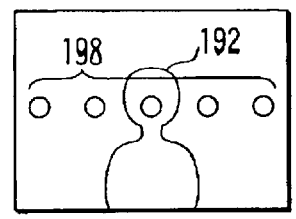
FIG. 46A    FIG. 46B
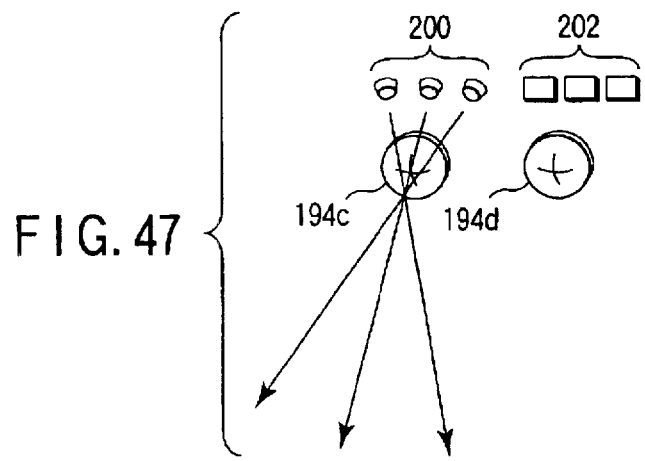
FIG. 47
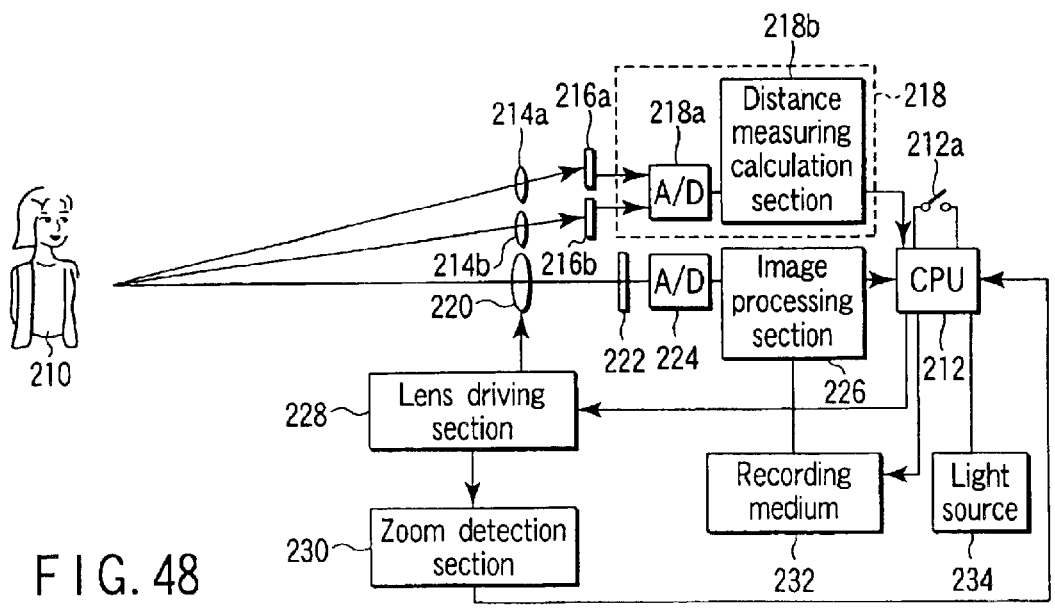
FIG. 48

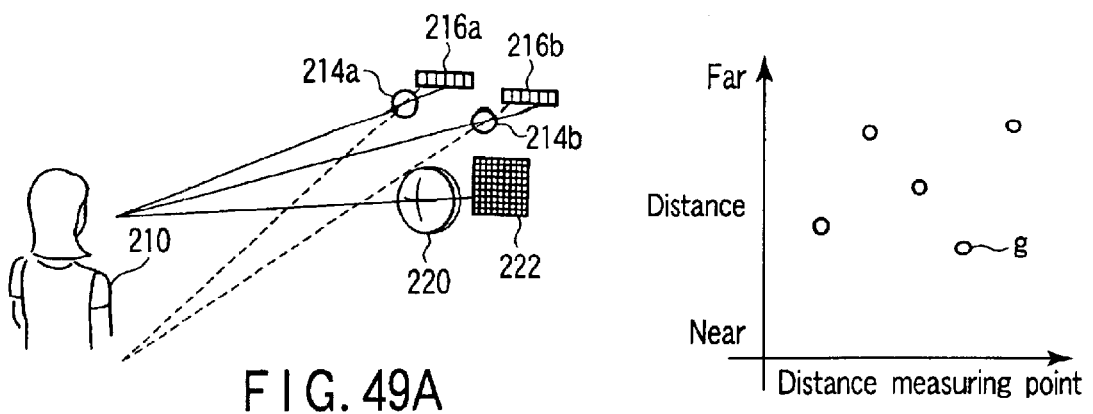
FIG. 49A
FIG. 50
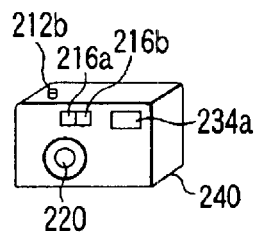
FIG. 49B
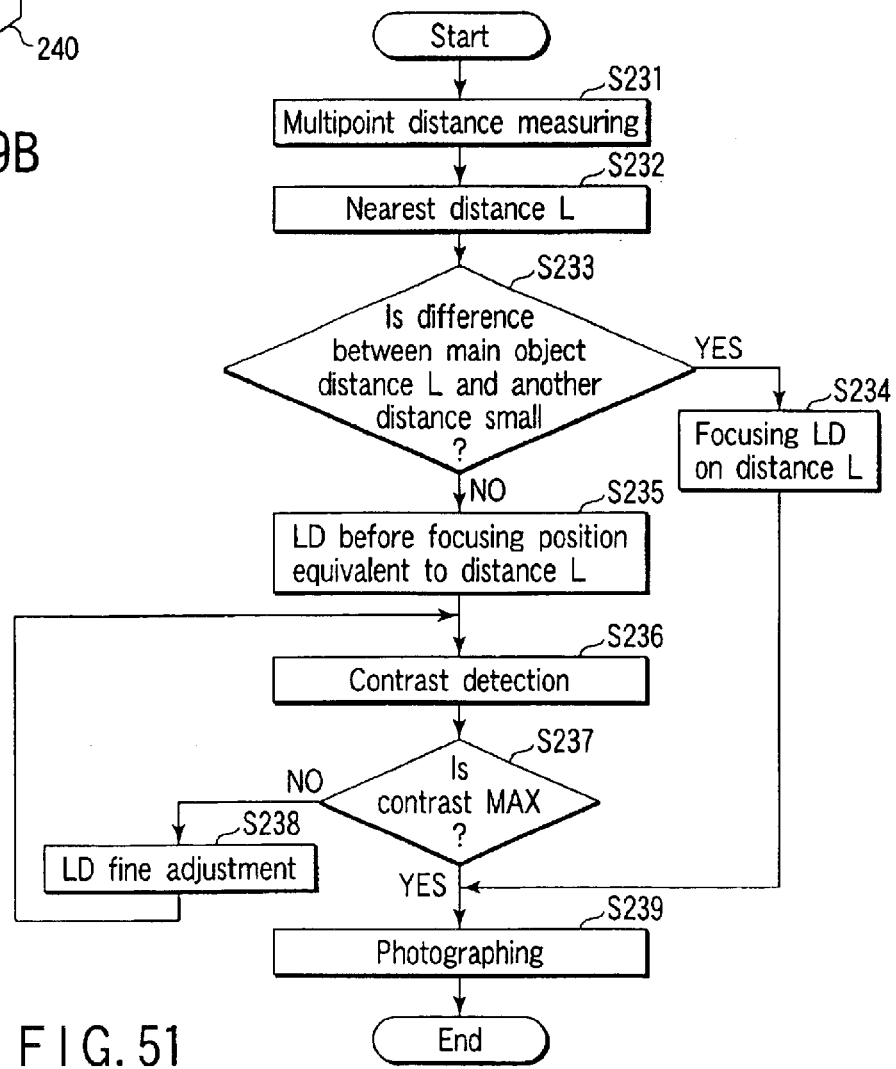
FIG. 51

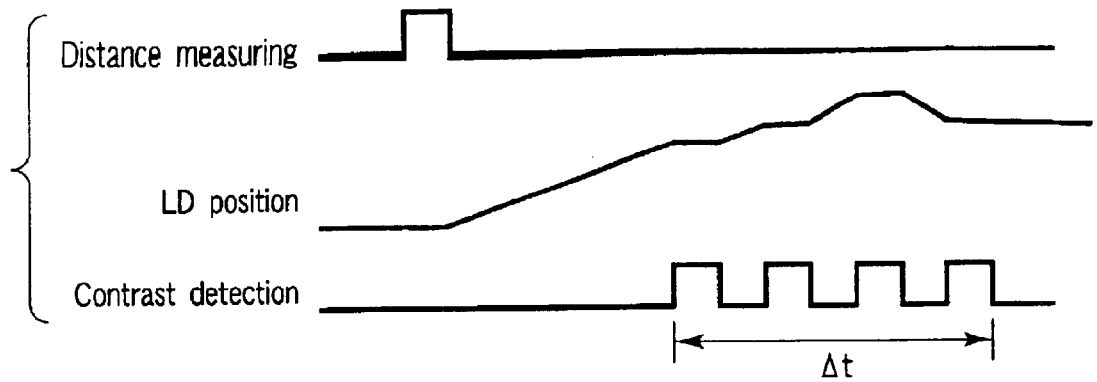
F I G. 52
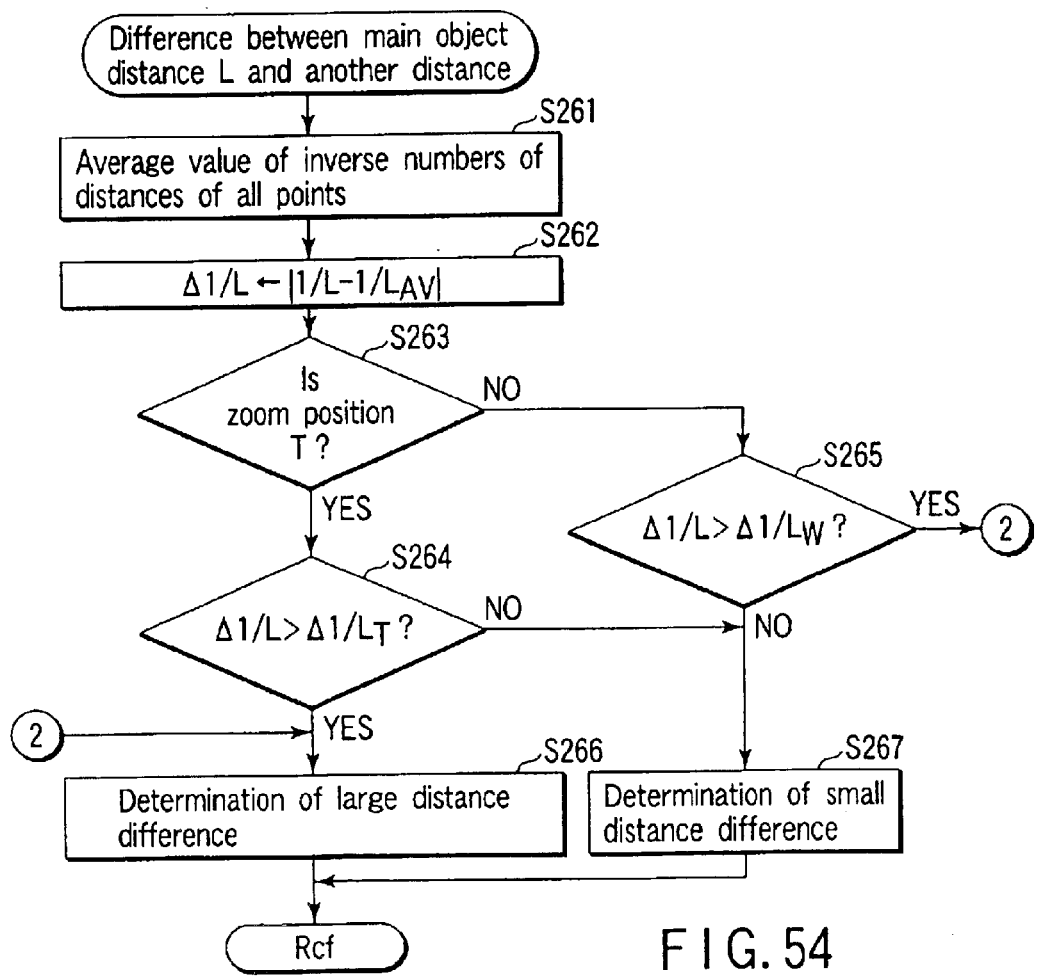
F I G. 54

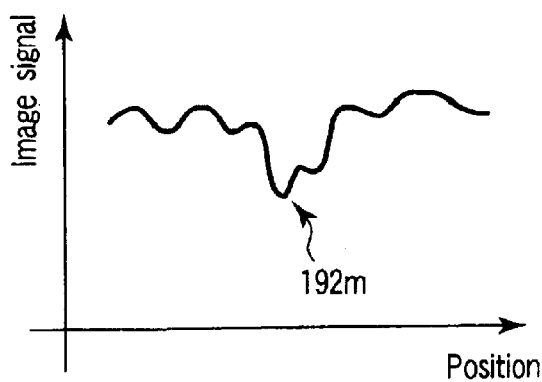
F I G. 57
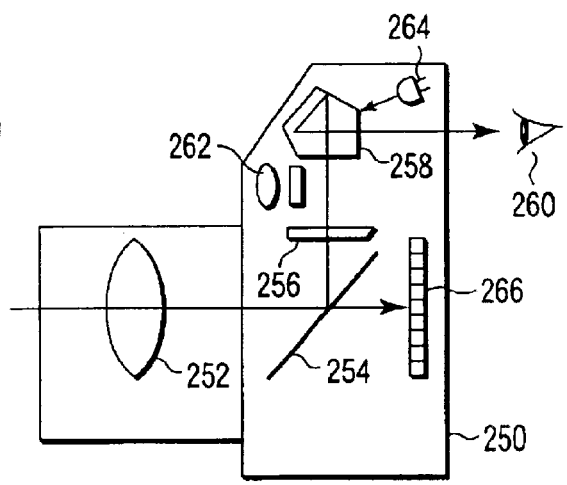
F I G. 60
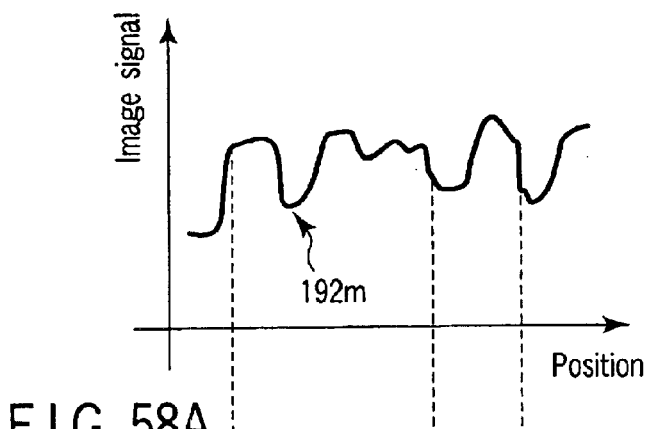
F I G. 58A
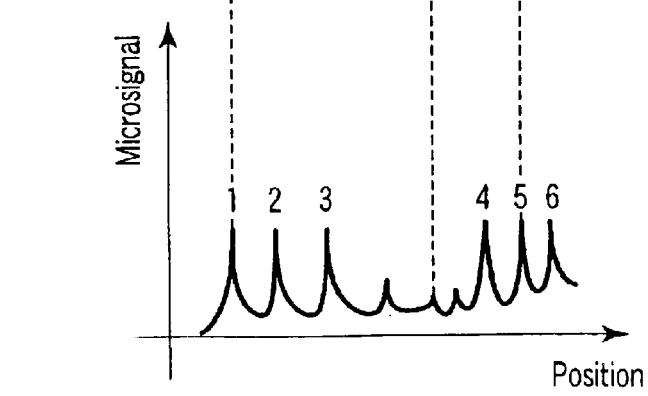
F I G. 58B
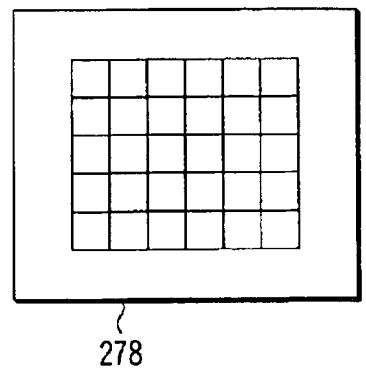
F I G. 61

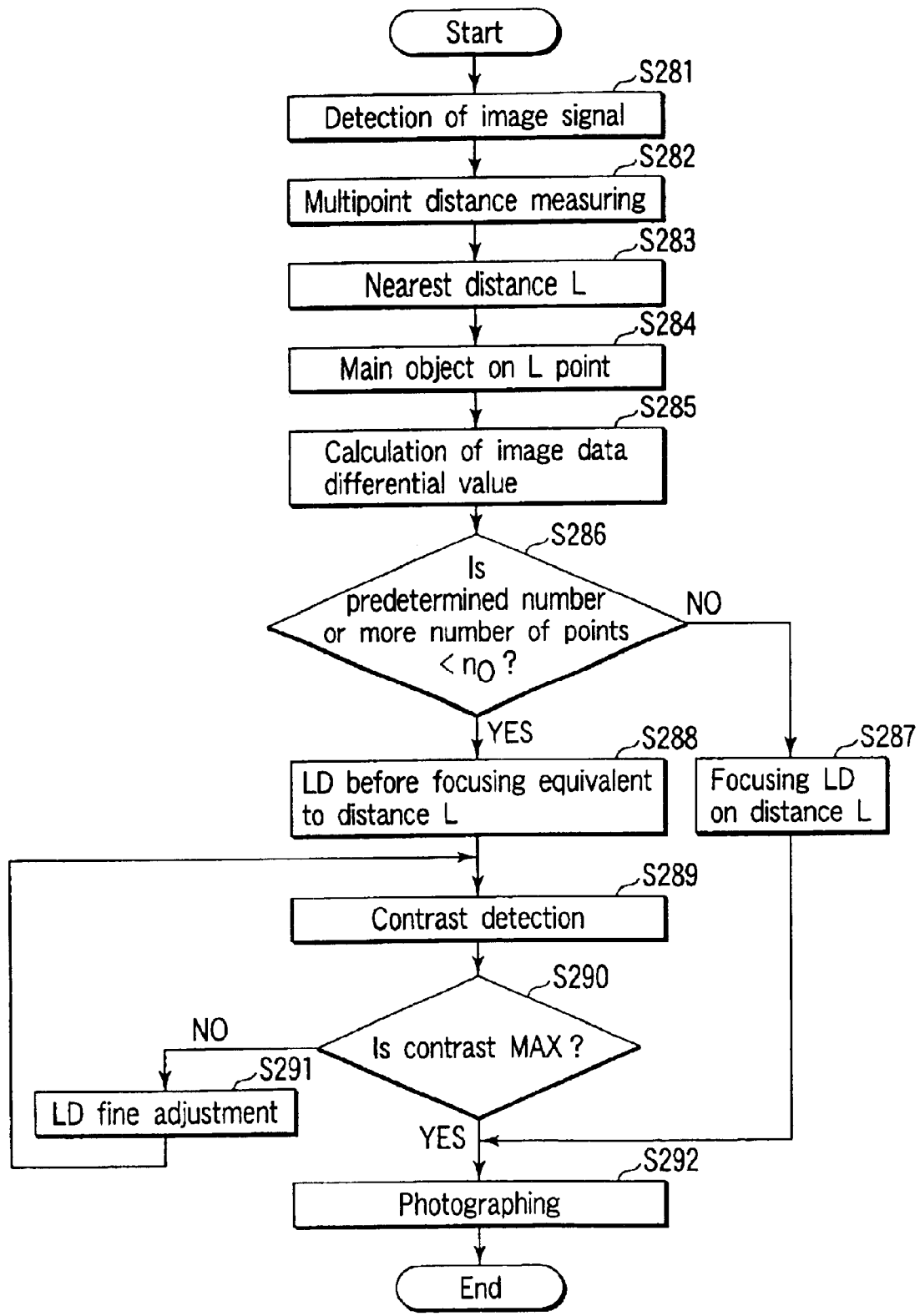
F I G. 59

CAMERA AND DISTANCE MEASURING METHOD THEREOF

CROSS-REFERENCE TO RELATED APPLICATIONS

This application is based upon and claims the benefit of priority from the prior Japanese Patent Applications No. 2002-247359, filed Aug. 27, 2002; No. 2002-314449, filed Oct. 29, 2002; No. 2002-324016, filed Nov. 7, 2002; and No. 2002-325266, filed Nov. 8, 2002, the entire contents of all of which are incorporated herein by reference.

BACKGROUND OF THE INVENTION

1. Field of the Invention

The present invention relates to a focusing technology of an electronic camera, and more particularly to a camera which can change a compressibility when an electronic image is stored, and switch a focusing method.

2. Description of the Related Art

Additionally, the present invention relates to an improvement of a so-called autofocus technology of a digital camera which electronically records an object image obtained through a taking lens by an imager.

In focusing of the electronic camera, a system called a climbing type imager AF (autofocus) which uses a photographing imager but no special sensors is often used.

In the imager AF, however, it is necessary to monitor a change made in contrast of the object on the imager in accordance with a focusing position of the taking lens, and a time lag during releasing often becomes a problem.

Thus, different focusing systems are disposed to correct the problem. For example, see Jpn. Pat, Appln. KOKAI Publication Nos. 2001-141985, 2001-249267, 2001-255456 etc.

On the other hand, various improvements have been made regarding image compression. The applicant of the present invention has filed Patent No. 3115912 etc. This regards a technology of changing a compressibility during image recording by using information obtained when the imager AF is operated. Similar technologies are disclosed in Jpn. Pat. Appln. KOKAI Publication No. 2000-201287 etc.

An advantage of the imager AF is that even if there is an error in a stop position of the taking lens, a focusing position including the error is controlled, and thus feedback control which cancels the error can be carried out even in the case of lens position characteristics different from design due to a temperature, humidity or posture difference etc.

However, since it takes time until focusing as described above, in the cameras described in Jpn. Pat. Appln. KOKAI Publication Nos. 2001-141985 and 2001-249267, in a situation of a large focal depth, the previous lens position error is ignored, and focus control (LD) is carried out only based on a result of an external light AF.

In the distance measurement apparatus described in Jpn. Pat. Appln. KOKAI Publication No. 2001-255456, two systems are switched depending on a mode.

However, there may be a scene to be focused more accurately even if a focal depth is large, and a scent to be photographed by eliminating a release time lag even if a focal depth is small. Thus, setting by a mode is burdensome. Therefore, if priority can be switched between focusing and a time lag depending on a scene, it is possible to provide a camera more satisfactory to a user.

BRIEF SUMMARY OF THE INVENTION

Accordingly, a first object of the present invention is to provide a camera which optimally combines an AF system with a compression system in accordance with photographer's intension to enable high-speed photographing, and which can effectively use a capacity of a recording medium.

A second object of the present invention is to provide an autofocus camera which has, e.g., a multipoint distance measuring function, determines an intended photographing type (i.e., whether priority is on focusing or a time lag) of a photographer depending on a photographic scene, and can set distance measuring and a shutter speed suited to the scene, for example without any release time lags or losses of a photo opportunity.

A third object of the present invention is to provide a camera which carries out accurate photographic scene detection, can photograph the scene by selecting a focusing system optimal to the scene, and has no unsatisfactory time lags or focusing accuracy, a distance measuring apparatus, a camera distance measuring method, and a distance measuring method.

A fourth object of the present invention is to provide an easy-to-use camera which employs a focusing method optimal to a scene, and provides focusing accuracy and a time lag satisfactory to a photographer even in a scene where focusing accuracy is important, or a scene where a high speed is necessary, and a distance measuring method.

A first feature of the present invention is directed to a camera comprising:
  a taking lens;
  a first focus adjustment section which adjusts a focusing position of the taking lens;
  a second focus adjustment section which has accuracy lower than that of the first focus adjustment section but which adjusts the focusing position of the taking lens at a high speed;
  an imaging section which includes an imager to image an object image through the taking lens, and converts an output signal of the imager into image data;
  a compressibility setting section which sets a compressibility of the image data obtained in the imaging section;
  a compression section which compresses the image data in accordance with the compressibility set in the compressibility setting section; and
  a deciding section which decides one of the first focus adjustment section and the second focus adjustment section which is employed to carry out a final focus adjustment operation of the taking lens in accordance with the compressibility set in the compressibility setting section (corresponding to claim 1).

A second feature of the present invention is directed to a camera comprising:
  a taking lens;
  an imaging section which includes an imager to image an object image through the taking lens, and converts an output signal of the imager into image data;
  a first focus adjustment section which adjusts a focusing position of the taking lens by detecting a contrast change of the image data outputted from the imaging section during movement of the taking lens;
  a second focus adjustment section which includes a section to output a signal dependent on a distance of an object, and adjusts the focusing position of the taking lens in accordance with an output result of the section;

an image processing section which carries out predetermined processing for the image data outputted from the imaging section; and a control section which causes one of the first focus adjustment section and the second focus adjustment section to execute a final focus adjustment operation for the taking lens in accordance with a processing content of the image processing section (corresponding to claim 5).

A third feature of the present invention is directed to a camera comprising:

a taking lens;

an imaging section which includes an imager to image an object image through the taking lens, and converts an output signal of the imager into image data;

a compressibility setting section which sets a compressibility of the image data obtained in the imaging section;

a compression section which compresses the image data in accordance with the compressibility set in the compressibility setting section;

a first focus adjustment section which adjusts a focusing position of the taking lens by detecting a contrast change of the image data outputted from the imaging section during movement of the taking lens;

a second focus adjustment section which includes a section to output a signal dependent on a distance of an object, and adjusts the focusing position of the taking lens in accordance with an output result of the section; and a control section which operates the second focus adjustment section alone when the compressibility set in the compressibility setting section is a first compressibility, and which operates the first focus adjustment section after the second focus adjustment section when the compressibility is a second compressibility lower than the first compressibility (corresponding to claim 9).

A fourth feature of the present invention is directed to a camera comprising:

a taking lens;

an imager which images an object image through the taking lens;

an image processing circuit which generates digital image data from an output of the imager, and includes a compression circuit to compress the image data at a compressibility selected from a plurality of compressibilities;

a focus adjustment mechanism which adjusts a focusing position of the taking lens;

a distance measuring circuit which detects a distance of an object or a focus deviation amount of the taking lens; and a CPU which receives the output of the imager and an output of the distance measuring circuit, controls the focus adjustment mechanism based on the received outputs, and decides a control form of the focus adjustment mechanism in accordance with the compressibility selected by the compression circuit (corresponding to claim 10).

A fifth feature of the present invention is directed to a camera comprising:

a contrast detection section which detects contrast of an object image signal obtained through a taking lens;

a multipoint distance measuring section which can range a plurality of points in a photographic screen through a pair of optical systems different from the taking lens;

a first focus adjustment section which focuses the taking lens in accordance with a detection result of the contrast detection section;

a second focus adjustment section which focuses the taking lens based on a distance measuring result of the multipoint distance measuring section;

a position determination section which determines a position of a main object in the photographing screen from the distance measuring result of the plurality of points; and a selection section which operates the first focus adjustment section when the position determination section determines that the main object is positioned on a center, and which operates the second focus adjustment section when the main object is determined to be positioned on a periphery in the photographing screen (corresponding to claim 13).

A sixth feature of the present invention is directed to a camera comprising:

a first autofocus section which focuses a taking lens based on contrast of an object image signal obtained through the taking lens;

a second autofocus section which can range a plurality of points in a photographic screen through a pair of optical systems different from the taking lens, and focuses the taking lens based on a distance measuring result thereof; and a selection section which preferentially operates the second autofocus section when it is determined from the distance measuring result of the plurality of points that a main object is positioned on a periphery in the photographing screen (corresponding to claim 14).

A seventh feature of the present invention is directed to a camera comprising:

a multipoint distance measuring section which ranges a plurality of points in a photographic screen by using an optical system other than a taking lens to obtain a distance to a main object and a position in the photographing screen;

a contrast detection section which obtains an object image through a predetermined taking lens, and detects contrast information of the object image; and a control section which focuses the taking lens based on the contrast information detected by the contrast detection section when the multipoint distance measuring section determines that the main object is positioned on a center of the photographic screen (corresponding to claim 15).

An eighth feature of the present invention is directed to a camera comprising:

a determination section which determines a position of a main object in a photographic screen;

a contrast detection section which obtains an object image through a predetermined taking lens, and detects contrast information of the object image; and a control section which focuses the taking lens based on the contrast information detected by the contrast detection section when the determination section determines that the main object is positioned on a center of the photographic screen (corresponding to claim 16).

A ninth feature of the present invention is directed to a camera which has a zoom lens in a taking lens, comprising:

a multipoint distance measuring section which ranges a plurality of points in a photographic screen by using an optical system different from the taking lens;

a contrast focusing section which decides a focusing position based on contrast of a photographing target obtained through the taking lens;

a zoom position detection section which detects a zoom position of the taking lens; and a deciding section which decides whether or not to actuate the contrast focusing section in accordance with the zoom position and a result of the multipoint distance measuring (corresponding to claim 17).

A tenth feature of the present invention is directed to a camera comprising:

a first switch turned ON before photographing, and a second switch turned ON by an operation of a photographing timing;

a distance measuring section which measures a distance of an object by an optical system different from a taking lens by a timing of the first switch; and a control section which controls a focusing device based on contrast of an image signal obtained through the taking lens when a timing of operating the first switch and a timing of operating the second switch are different from each other by predetermined time or more, and focuses the taking lens based on an output of the distance measuring section when the timing of operating the first switch and the timing of operating the second switch are less than the predetermined time (corresponding to claim 19).

An eleventh feature of the present invention is directed to a camera which has a focus lock button to execute focus lock control before photographing, comprising:

a control section which carries out no focusing based on contrast of an image signal obtained through a predetermined taking lens when the focus lock button is operated, and carries out focusing based on an output result of distance measuring by an optical system different from the taking lens (corresponding to claim 20).

A twelfth feature of the present invention is directed to a camera comprising:

a taking lens;

an imager which images an object image through the taking lens;

an image processing circuit which generates digital image data from an output of the imager;

a focus adjustment mechanism which adjusts a focusing position of the taking lens;

a distance measuring optical system;

a distance measuring circuit which detects a distance of an object for a plurality of points in a photographing screen through the distance measuring optical system; and a CPU which receives outputs of at least the image processing circuit and the distance measuring circuit, determines a position of a main object from a plurality of distance measuring results outputted from the distance measuring circuit, and decides a control method of the focus adjustment mechanism in accordance with a result of the determination (corresponding to claim 21).

A thirteenth feature of the present invention is directed to a camera comprising:

a first autofocus section which focuses a taking lens based on contrast of an object image signal obtained through the taking lens;

a second autofocus section which focuses the taking lens in accordance with an output of a distance measuring device having a distance measuring optical system different from the taking lens;

a blurring detection section which detects blurring of the camera; and a selection section which selects one of the first autofocus section and the second autofocus section based on an output of the blurring detection section (corresponding to claim 24).

A fourteenth feature of the present invention is directed to a camera comprising:

a distance measuring section which executes distance measuring by obtaining an image signal in a photographic screen through an optical system other than a taking lens, and obtains a main object distance and the image signal; and a control section which determines a blurring state based on a time change of the image signal obtained by the distance measuring section, carries out focus control of the taking lens in accordance with a result of the distance measuring when the blurring state is determined, and in accordance with contrast of the object image obtained by the taking lens when no blurring state is determined (corresponding to claim 25).

A fifteenth feature of the present invention is directed to a distance measuring device comprising:

a distance measuring section which obtains an image signal in a photographic screen through an optical system other than a taking lens to carry out distance measuring before photographing, and obtains a main object distance and the image signal;

a determination section which determines a blurring state; and a switching section which switches between execution of distance measuring by the distance measuring section based on the blurring state determined by the determination section and execution of distance measuring based on contract of the object image obtained by the taking lens (corresponding to claim 26).

A sixteenth feature of the present invention is directed to a camera which has a zoom lens in a taking lens, comprising:

a distance measuring section which obtains an object image signal by an optical system different from the taking lens, and measures a distance of an object;

a contrast focusing section which decides a focusing position based on a contrast change obtained by an imaging section through the taking lens during very small driving of the taking lens;

a zoom position detection section which detects a zoom position of the taking lens; and a deciding section which decides whether or not to continue the contrast focusing control in accordance with the zoom position and the image signal by the distance measuring section (corresponding to claim 30).

A seventeenth feature of the present invention is directed to a distance measuring method of a camera, comprising:

a first step of focusing a taking lens by a first autofocus system based on contact of an object image signal obtained through the taking lens;

a second step of focusing the taking lens by a second autofocus system in accordance with a distance measuring result of a distance measuring device which has a pair of optical systems different from the taking lens;

a third step of detecting a change in the image signal used to enable distance measuring in a photographic screen of the distance measuring device during control of the first autofocus system; and a fourth step of selecting focusing by the second autofocus system when the change of the image signal is detected (corresponding to claim 32).

An eighteenth feature of the present invention is directed to a distance measuring method of a camera, comprising:

a first step of executing first autofocusing to focus a taking lens based on contact of an object image signal obtained through the taking lens;

a second step of executing second autofocusing to focus the taking lens in accordance with a distance measuring result of a distance measuring device which has a pair of optical systems different from the taking lens and can execute distance measuring in a photographic screen by using the image signal; and a third step of selecting execution or nonexecution of distance measuring by the second autofocus system based on a time change in an output of the first autofocusing (corresponding to claim 33).

A nineteenth feature of the present invention is directed to a distance measuring method of a camera, comprising:

a first step of obtaining an image signal in a photographic screen by using an optical system other than a taking lens to carry out distance measuring before photographing, and obtaining a main object distance and the image signal;

a second step of determining a blurring state based on a time change in the image signal obtained by the distance measuring; and a third step of focusing the taking lens in accordance with a result of the distance measuring when a blurring state is determined by the determination step, and in accordance with contrast of the object image obtained by the taking lens when no blurring state is determined (corresponding to claim 34).

A twentieth feature of the present invention is directed to a distance measuring method comprising:

a first step of obtaining an image signal in a photographic screen by using an optical system other than a taking lens to carry out distance measuring before photographing, and obtaining a main object distance and the image signal;

a second step of determining a blurring state; and a third step of switching between execution of distance measuring based on the blurring state determined by the second step and execution of distance measuring based on contrast of the object image obtained by the taking lens (corresponding to claim 35).

A twenty-first feature of the present invention is directed to a camera comprising:

a taking lens;

an imager which images an object image through the taking lens;

an image processing circuit which generates digital image data from an output of the imager;

a focus adjustment mechanism which adjusts a focusing position of the taking lens;

a distance measuring optical system different from the taking lens;

a distance measuring circuit which detects a distance of an object through the distance measuring optical system, and includes a distance measuring sensor to detect a partial object image in a photographic screen; and a CPU which controls the focus adjustment mechanism based on an output of the imager, determines a blurring state from an output signal of the distance measuring sensor, and cancels a focus adjustment operation based on the output of the imager when the amount of blurring is large (corresponding to claim 36).

A twenty-second feature of the present invention is directed to a camera comprising:

a taking lens;

an imager which images an object image through the taking lens;

an image processing circuit which generates digital image data from an output of the imager;

a focus adjustment mechanism which adjusts a focusing position of the taking lens;

a distance measuring optical system different from the taking lens;

a distance measuring circuit which detects a distance of an object through the distance measuring optical system, and includes a distance measuring sensor to detect a partial object image in a photographic screen; and a CPU which controls the focus adjustment mechanism to control a focus of the taking lens, determines presence of blurring based on an output signal of the distance measuring sensor, executes focus control of the taking lens based on the output of the imager when no blurring is present, and based on an output of the distance measuring circuit when blurring is present (corresponding to claim 38).

A twenty-third feature of the present invention is directed to a camera comprising:

a first autofocus system which focuses a taking lens based on contrast of an object image signal obtained through the taking lens; and a second autofocus section which focuses the taking lens in accordance with a distance measuring result of a distance measuring device having a pair of optical systems different from the taking lens;

wherein the distance measuring device can range a plurality of points in a photographic screen, and comprises a selection section which preferentially carries out focusing by the second autofocus system when a main object and other objects are determined to be in a predetermined distance range based on a distance measuring result of the plurality of points (corresponding to claim 39).

A twenty-fourth feature of the present invention is directed to a camera comprising:

a first autofocus system which focuses a taking lens based on contrast of an object image signal obtained through the taking lens;

a second autofocus section which focuses the taking lens in accordance with a distance measuring result of a distance measuring device having a pair of optical systems different from the taking lens;

wherein the distance measuring section can range a plurality of points in a photographic screen, and comprises a switching section to carry out distance measuring by switching between the first autofocus system and the second autofocus system (corresponding to claim 40).

A twenty-fifth feature of the present invention is directed to a camera comprising:

a multipoint distance measuring section which ranges a plurality of points by using an optical system other than a taking lens to obtain a main object distance and a position in a screen before photographing; and a control section which carries out focus control of the taking lens in accordance with a result of the distance measuring when the multipoint distance measuring section determines that the main object is present at a distance not different from those of other objects, and in accordance with contrast of the object image obtained by the taking lens when the main object is determined to be present at a distance far from the other objects (corresponding to claim 41).

A twenty-sixth feature of the present invention is directed to a camera which has a zoom lens in a taking lens, comprising:

a multipoint distance measuring section which measures distances of a plurality of points in a screen by an optical system different from the taking lens;

a contrast focusing section which decides a focusing position based on contrast of an imaging section-obtained through the taking lens;

a zoom position detection section which detects a zoom position of the taking lens; and a deciding section which decides whether or not to actuate the contrast focusing control in accordance with the zoom position and a relation between a main object and a background based on a result of the multipoint distance measuring section (corresponding to claim 42).

A twenty-seventh feature of the present invention is directed to a camera comprising:

a first autofocus system which focuses a taking lens based on contrast of an object image signal obtained through the taking lens, and a second autofocus section which focuses the taking lens in accordance with a distance measuring result of a distance measuring device having a pair of optical systems different from the taking lens, wherein the distance measuring device can range a plurality of points in accordance with image signals of the plurality of points in a photographic screen, and comprises a differentiation section to obtain differentiation data of the image signals, and a selection section which preferentially carries out focusing by the second autofocus system when the differentiation information is higher than a predetermined level (corresponding to claim 44).

A twenty-eighth feature of the present invention is directed to a camera comprising:

a first autofocus system which focuses a taking lens based on contrast of an object image signal obtained through the taking lens, a second autofocus section which focuses the taking lens in accordance with a distance measuring result of a distance measuring device having a pair of optical systems different from the taking lens, wherein the distance measuring section can range a plurality of points in accordance with image signals of the plurality of points in a photographic screen, and comprises a determination section to detect contrast information in the photographic screen, and to determine a size of the contrast, and a switching section to switch between the first autofocus system and the second autofocus system based on a result of the determination section (corresponding to claim 45).

A twenty-ninth feature of the present invention is directed to a distance measuring method of a camera which has a zoom lens in a taking lens, comprising:

a first step of executing multipoint distance measuring to measure distances of a plurality of points in a screen by an optical system different from the taking lens;

a second step of deciding a focusing position based on contrast of a photographed image obtained through the taking lens;

a third step of detecting a zoom position of the taking lens; and a fourth step of deciding whether or not to actuate contrast focusing to decide the focusing position based on the zoom position and a relation between distances of a main object and a background in accordance with a result of the multipoint distance measuring (corresponding to claim 48).

A thirty feature of the present invention is directed to a distance measuring method of a camera, comprising:

a step of focusing a taking lens by a first autofocus system based on contact of an object image signal obtained through the taking lens;

a step of focusing the taking lens by a second autofocus system in accordance with a distance measuring result of a distance measuring device which has a pair of optical systems different from the taking lens, and which can range a plurality of points in accordance with image signals of the plurality of points in a photographic screen;

a step of obtaining differentiation information of the image signals; and a step of making selection to preferentially execute focusing by the third autofocus system when the differentiation information is higher than a predetermined level (corresponding to claim 50).

A thirty-first feature of the present invention is directed to a distance measuring method of a camera, comprising:

a step of focusing a taking lens by a first autofocus system based on contrast of an object image signal obtained through the taking lens;

a step of focusing the taking lens by a second autofocus system in accordance with a distance measuring result of a distance measuring device which has a pair of optical systems different from the taking lens, and which can range a plurality of points in accordance with image signals of the plurality of points in a photographic screen;

a step of detecting contrast information in the photographic screen, and determining a size of the contrast; and a step of switching between the first autofocus system and the second autofocus system based on a result of the determination (corresponding to claim 51).

A thirty-second feature of the present invention is directed to a camera comprising:

a taking lens;

an imager which images an object image through the taking lens;

an image processing circuit which generates digital image data from an output of the imager;

a focus adjustment mechanism which adjusts a focusing position of the taking lens;

a distance measuring optical system;

a distance measuring circuit which detects a distance of an object for a plurality of points in a photographic screen; and a CPU which receives outputs of at least the image processing circuit and the distance measuring circuit, and controls the focus adjustment mechanism based on the received outputs, determines a distance relation between a main object position and a background from a plurality of distance measuring results outputted from the distance measuring circuit, and decides a control method of the focus adjustment mechanism in accordance with a result of the determination (corresponding to claim 52).

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a flowchart explaining a photographing operation of the camera of the first embodiment of the present invention;

FIGS. 18A and 18B are views showing an example of switching the number of recording pixels according to a fourth embodiment of the present invention;

FIGS. 19A to 19C are views explaining an edge emphasis processing function of the fourth embodiment of the present invention;

FIG. 20 is a flowchart explaining a photographing operation of a camera of the fourth embodiment of the present invention;

FIG. 21 is a block constitutional diagram showing an internal constitution of a camera of each of fifth and sixth embodiments of the present invention;

FIGS. 22A and 22B are views showing the camera and a distance measuring section of each of the fifth and sixth embodiments, FIG. 22A an explanatory view showing a principle of the distance measuring section incorporated in the camera, and FIG. 22B a perspective view showing an appearance of the camera;

FIG. 30 is a flowchart explaining a photographing control operation of a camera according to a modified example;

FIG. 32A is a view showing an example of a scene where a human as a main object is present on a screen center;

FIG. 32B is a view showing an example of an image signal obtained by an external light distance measuring device which monitors an area 140*a* of a screen 140 of FIG. 32A;

FIG. 32C is a view explaining a change in a monitor position caused by blurring;

FIG. 32D is a view showing an example of an image signal obtained by the external light distance measuring device which monitors the area 140a of FIG. 32C;

FIGS. 33A and 33B are views explaining a distance measuring principle of an external light distance measuring device which plays an important role according to a seventh embodiment;

FIG. 34 is a block diagram showing an internal constitution of a digital camera according to the seventh embodiment of the present invention;

FIG. 35A is a view showing a positional relation between light receiving lenses 154a, 154b and sensor arrays 156a, 156b, and a taking lens 160 and an imager 162;

FIG. 35B is an appearance perspective view of the camera of the seventh embodiment;

FIG. 40 is a view showing a relation between a focusing position and contrast;

FIGS. 42A and 42B are views explaining amounts of blurring at wide time and tele time by a camera equipped with a zoom, FIG. 42A a view showing the wide time, and FIG. 42B a view showing the tele time;

FIGS. 43A and 43B are views explaining amounts of blurring at wide time and tele time by the camera equipped with the zoom, FIG. 43A a view showing the wide time, and FIG. 43B a view showing the tele time;

FIGS. 46A and 46B are views explaining a distance measuring principle of the external light distance measuring device which plays an important role in the present invention;

FIG. 47 is a view explaining a multidistance measuring device of an active system;

FIG. 48 is a block diagram showing an internal constitution of a camera according to a tenth embodiment of the present invention;

FIG. 49A is a view showing a positional relation between light receiving lenses 214a, 214b and sensor arrays 21a, 216b, and a taking lens 220 and an imager 222;

FIG. 49B is an appearance perspective view of the camera of the tenth embodiment;

FIG. 50 is a view showing an example of a distance distribution;

FIG. 51 is a flowchart explaining a distance measuring operation of the camera of the tenth embodiment of the present invention;

FIG. 52 is a timing chart explaining the distance measuring operation of the camera of the tenth embodiment;

FIG. 54 is a flowchart showing a first example of changing step S233 of determination to obtain a difference between a main object distance and another distance in the flowchart of FIG. 51;

FIG. 57 is a view showing characteristics of image data obtained by a sensor array of an external light AF in the scene of FIG. 45A;

FIG. 58A is a view showing characteristics of image data obtained by a sensor array of an external light AF in the scene of FIG. 48B;

FIG. 58B is a view showing characteristics of differential data of the image data of FIG. 58A;

FIG. 59 is a flowchart explaining a distance measuring operation of a camera according to a twelfth embodiment of the present invention;

FIG. 60 is a schematic sectional view showing a constitution of a camera according to a thirteenth embodiment of the present invention; and FIG. 61 is a view showing an example of a screen 278 of a photometric sensor 266 of FIG. 60.

DETAILED DESCRIPTION OF THE INVENTION

Next, the preferred embodiments of the present invention will be described with reference to the accompanying drawings.

(First Embodiment)

First, description will be made of a first embodiment of the present invention with reference to FIGS. 1 to 9C.

Figure 1:
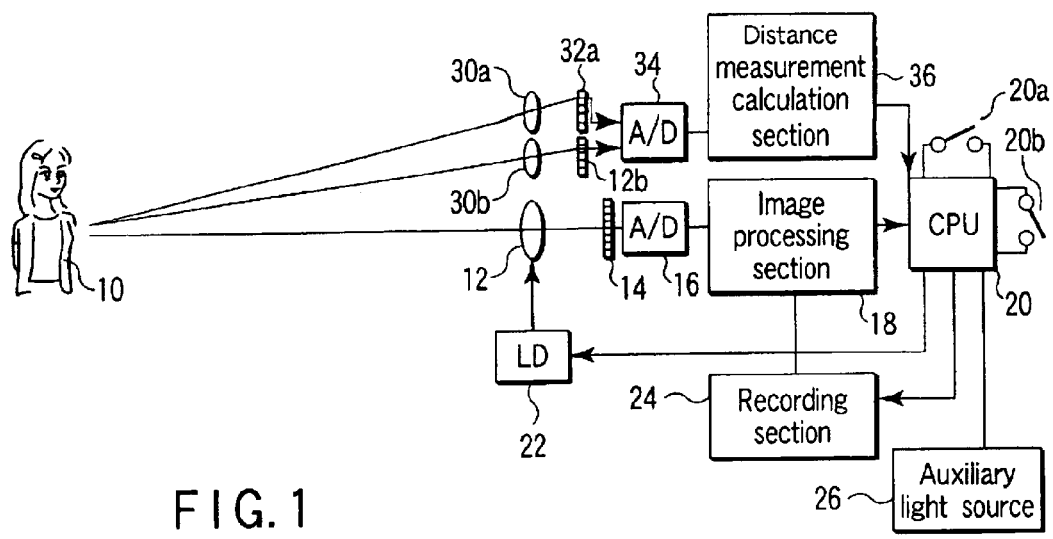
FIG. 1 is a block diagram showing a schematic constitution of an AF camera according to a first embodiment of the present invention.

FIG. 1 is a block diagram showing a schematic constitution of an AF camera according to the first embodiment of the present invention.

A light from a main object 10 is passed through a taking lens 12 to form an image on an imager 14 such as a CCD. Then, a signal of the image subjected to photoelectric conversion at the imager 14 is outputted through an analog/digital (A/D) converter 16 to an image processing section 18. The signal processed by the image processing section 18 is supplied to a CPU 20.

The CPU 20 is arithmetic operation control means constituted of a microcontroller which controls an entire sequence of the camera. The CPU 20 comprises a release switch 20a and a compressibility setting switch 20b described later. The CPU 20 controls a lens driver (LD) 22 for focusing and controlling the taking lens 12, a recording section 24, and an auxiliary light source 26 such as a flash device. The auxiliary light source 26 is used to assist expose or distance measuring in accordance with a scene.

The light from the main object 10 is entered through a pair of light receiving lenses 30a and 30b to sensor arrays 32a and 32b. Output signals from the sensor arrays 32a and 32b are supplied through an A/D converter 34 and a distance measuring calculation section 36 to the CPU 20.

According to such a constitution, when the main object 10 is photographed, the image formed through the taking lens 12 on the imager 14 is electrically converted into an image signal by the imager 14, the A/D converter 16 etc. Then, at the image processing section 18, color and gradation are adjusted, and the image is compressed to be easily recorded in the recording section 24.

Upon detection of an operation of the not-shown release switch 20a by a photographer, the image of the main object 10 entered through the light receiving lenses 30a and 30b is fetched in the sensor arrays 32a and 32b. Outputs of the sensor arrays 32a and 32b are subjected to A/D conversion at the A/D converter 34, subjected to a digital arithmetic operation, and a distance to the object is calculated at the distance measuring calculation section 36.

After the calculation of the distance, the lens driver 22 is controlled to focus and control the taking lens 12. Subsequently, the image signal from the imager 14 is recorded to complete the photographing.

Figure 2:
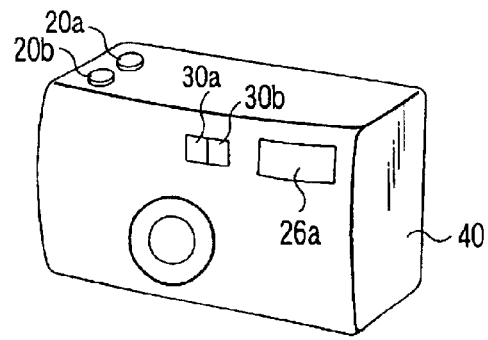
FIG. 2 is a perspective view showing an appearance constitution of the AF camera of the first embodiment.

FIG. 2 is a perspective view showing an appearance constitution of the AF camera of the first embodiment.

In FIG. 2, the release switch 20a and the compressibility setting switch 20b are disposed on the upper surface of the camera 40. The taking lens 12 is disposed on the center of the front of the camera 40. The light receiving lenses 30a, 30b for distance measuring are disposed above the taking lens 12 and, in FIG. 2, a light emission window 26a for the auxiliary light source 26 is arranged on the right side of the light receiving lenses 30a, 30b.

Figure 3:
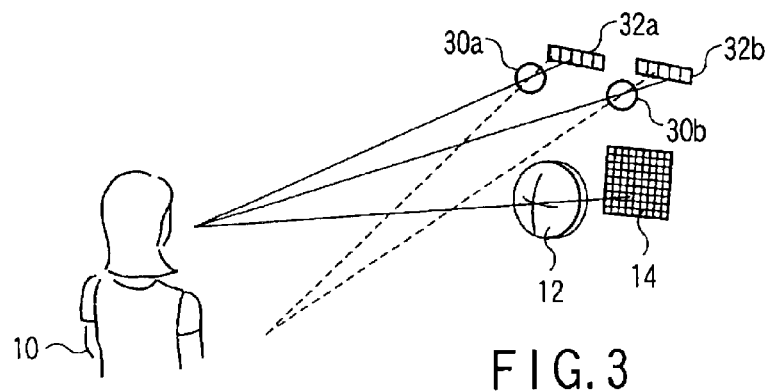
FIG. 3 is a view showing a relation between light receiving lenses 30*a*, 30*b* and sensor arrays 32*a*, 32*b*, and a taking lens 12 and an imager 14.

A relation between the light receiving lenses 30a, 30b and the sensor arrays 32a, 32b, and the taking lens 12 and the imager 14 is similar to that shown in FIG. 3.

That is, the same image of the main object 10 can be detected by the external light sensor arrays 30a, 30b and the imager 14. Additionally, FIG. 3 shows that an object in a position other than the main object 10 can also be detected if images of different areas of the sensor arrays 30a, 30b are utilized.

The external light system AF constituted of the two light receiving lenses and the two sensor arrays is used as in the case of two human eyes to detect an object distance based on a triangular distance measuring principle.

The imager AF detects its contrast by the imager 14 while shifting the focusing position of the taking lens 12. A lens position of highest contrast is a position suited to focusing. Thus, the imager AF is basically different from a system, e.g., the external light AF which obtains a focusing position based on distance data. That is, even if there is an error in lens position control or the like, since the focusing position including the error is detected, the error is canceled to enable focusing.

Figure 4A:
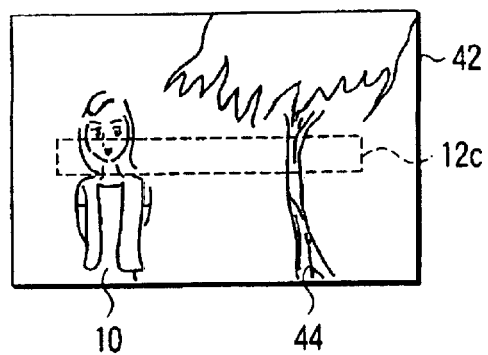
FIGS. 4A to 4C are views showing an example of focusing when there is an object on other than a center of a screen.

However, as shown in FIG. 4A, if the main object 10 is present on other than a center of a screen 42, it is difficult to detect presence of the human on the front and to quickly focus on this human. It is because of impossibility of detecting which main object is present on the front before it is determined that the screen center is great, a focusing position is examined by focusing on the human (main object) 10, and then the taking lens is moved to a tree 44 which becomes a background, and a focusing position is examined by focusing.

If a distance is great between the objects (human 10 and tree 44), it takes time because a process for stopping the taking lens 12 in corresponding focusing position to fetch images, and to determine contrast is required.

On the other hand, in the case of the external light system AF, since driving of the taking lens is unnecessary, as shown in FIG. 3, it is only necessary to detect the image of each sensor array, and to calculate a parallax due to the light receiving lenses 30a, 30b. Thus, since a distance distribution can be detected over a wide area 12c shown in FIG. 4A, a distance distribution of each object can be known, and it is possible to determine where the main object is present and how far at a high speed.

Figure 4B:
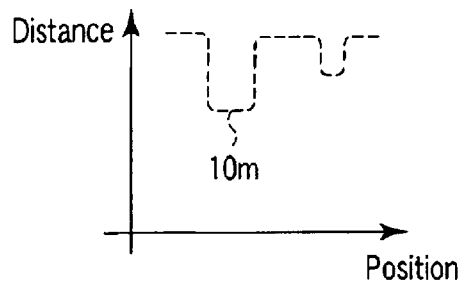

For example, as shown in FIG. 4B, by obtaining a relation between a distance and a position, it is possible to determine which position and what distance of the area 12c the object is present based on main object 10m data. However, if the image signal is used, since it is difficult to detect a distance for an area of no contrast of the center, for example, a light may be emitted from the auxiliary light source 26 of the camera to detect a reflected light. That is, only a small amount of reflected light is returned from an object of a great distance while a large amount of a reflected signal light is returned from a near distance. Thus, for a point which cannot be ranged by the image signal, information is supplemented based on such reflected light amount determination. Needless to say, a similar effect can be obtained when nonpresence of the main object in a low contrast area is determined.

Next, a detailed constitution of the image processing section 18 shown in FIG. 1 will be described by referring to a block diagram of FIG. 5.

Figure 5:
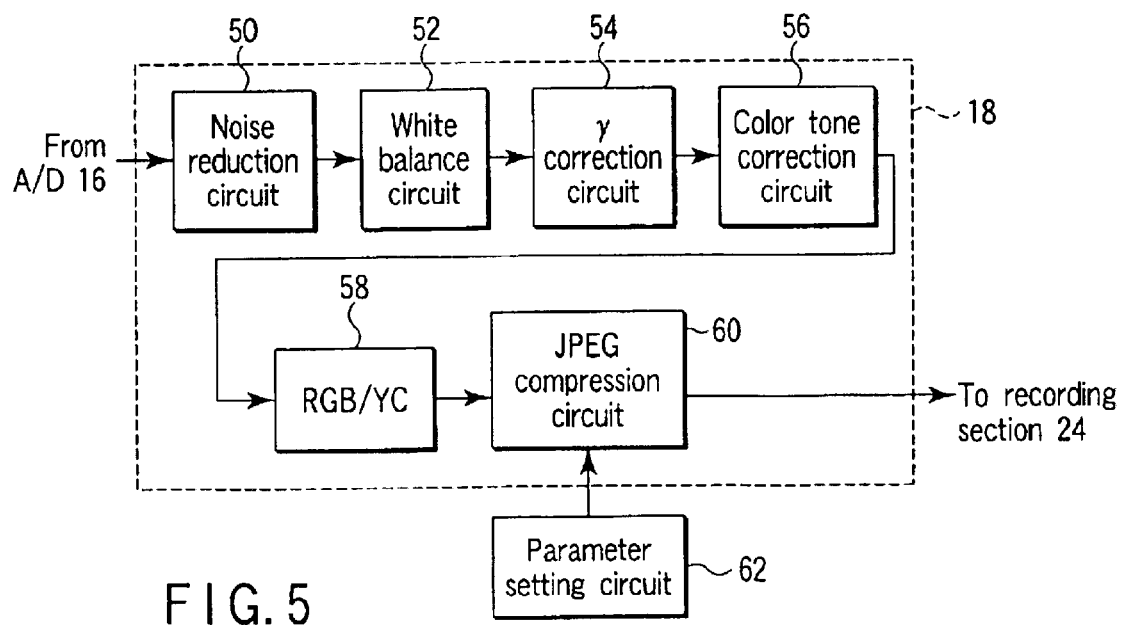
FIG. 5 is a system block diagram showing a detailed constitution of an image processing section 18 of FIG. 1.

In FIG. 5, the image processing section 18 is constituted by comprising a noise reduction circuit 50, a white balance circuit 52, a gamma (γ) correction circuit 54, a color tone correction circuit 56, an RGB/YC conversion circuit 58, and a JPEG compression circuit 60.

The noise reduction circuit 50 removes a noise component from a digital RGB signal corresponding to three colors A/D converted at the A/D converter 16. The white balance circuit 52 carries out processing to whiten a white portion of the image by using the image signal from which the noise has been removed.

An output of the white balance circuit 52 is adjusted in brightness changing characteristics by the gamma correction circuit 54 of a next stage in order to naturally represent brightness during displaying on a not-shown monitor or the like. Then, a color tone of a signal corresponding to three colors RGB is corrected at the color tone correction circuit 56.

At the RGB/YC conversion circuit 56, the signal is converted into luminance information Y, and color difference information $C_b$, $C_r$ of a color space in order to facilitate compression of a subsequent stage. These obtained Y, Cb, Cr signals are subjected to image compression of a JPEG system at the JPEG compression circuit 60. This operation uses the fact that human eyes become insensitive to a high-frequency component of an image, and a lower frequency component is quantized more finely while a higher frequency component is quantized more roughly. In this case, for example, by a scale factor (parameter), a compressibility, i.e., which frequency component is quantized and how much, is changed. This parameter is set based on table data of a parameter setting circuit 62 of the CPU 20 of FIG. 1.

At the CPU 20, an input state (operation state) of the compressibility setting switch 20b is detected to set a compressibility. A recorded image is rougher as a compressibility is higher while a recorded image is finer as a compressibility is lower. Accordingly, the number of images recorded in the recording section 24 is greatly changed. That is, more images can be recorded as the images are rougher, and the number is lower as the images are finer.

For example, a user who goes on a trip or the like only carrying limited recording media may wish to capture as many images as possible in the limited capacity. However, in a scene a fine detail of which is considered important, the user may wish to keep an image of a small compressibility even if a recording capacity becomes large.

Thus, to reflect a desire to change a compressibility in accordance with a scene, a switch may be disposed in the camera as in the case of the embodiment. The present invention can also be applied to a camera which determines a scene to automatically change compressibility.

Next, description will be made of a photographing operation of the camera of the first embodiment by referring to a flowchart of FIG. 6.

In the photographing sequence, first, in step S1, distance measuring of the external light AF system is carried out. Accordingly, a focusing position is obtained from an obtained distance $L_H$. Then, in step S2, a compressibility is determined in order to switch an operation in accordance with a set compressibility.

In this system, since there are no feedbacks to the taking lens 12 and the imager 14 as described above, very small errors are generated depending on a use environment or a state. However, an influence of the errors is small in a scene where a high compressibility is allowed. Thus, the process moves to step S3 when a high compressibility is set.

In step S3, a focusing position is decided based on the raging result, and the taking lens 12 is paid out. Then, in step S4, photographing is carried out.

On the other hand, in step S2, when a compressibility is set small, the user may wish to reproduce a fine detail. Thus, for focus control, a method is employed to match even a pixel unit of the imager 14. That is, the process moves from step S2 to step S8, where a paying-out direction of the taking lens 12 for focusing is decided corresponding to the distance $L_H$ in step S1.

Then, in step S9, the taking lens 12 is paid out to the near side by a predetermined position, and climbing AF is executed in step S10 (image signal corresponding to an object position obtained during distance measuring is used (see FIG. 3)). Here, the taking lens is stopped in a position where contrast on the imager 14 is highest to carry out focusing.

Subsequently, photographing is executed in step S11. In step S12, a relation between distance measuring and a lens position is calculated based on a focusing position $LD_H$ obtained in step S10 and the distance measuring result of step S1.

After the relation has been calculated, during subsequent photographing, even without executing climbing AF, accurate focusing can be carried out based on only the distance measuring result.

After the processing of step S4 or S12, in step S5, the aforementioned image processing is carried out by the image processing section 18. Then, in step S6, JPEG compression is carried out by the JPEG compression circuit 60 in the image processing section 18 in accordance with the set compressibility. Then, after image recording in step S7, the sequence is finished.

Figure 7:
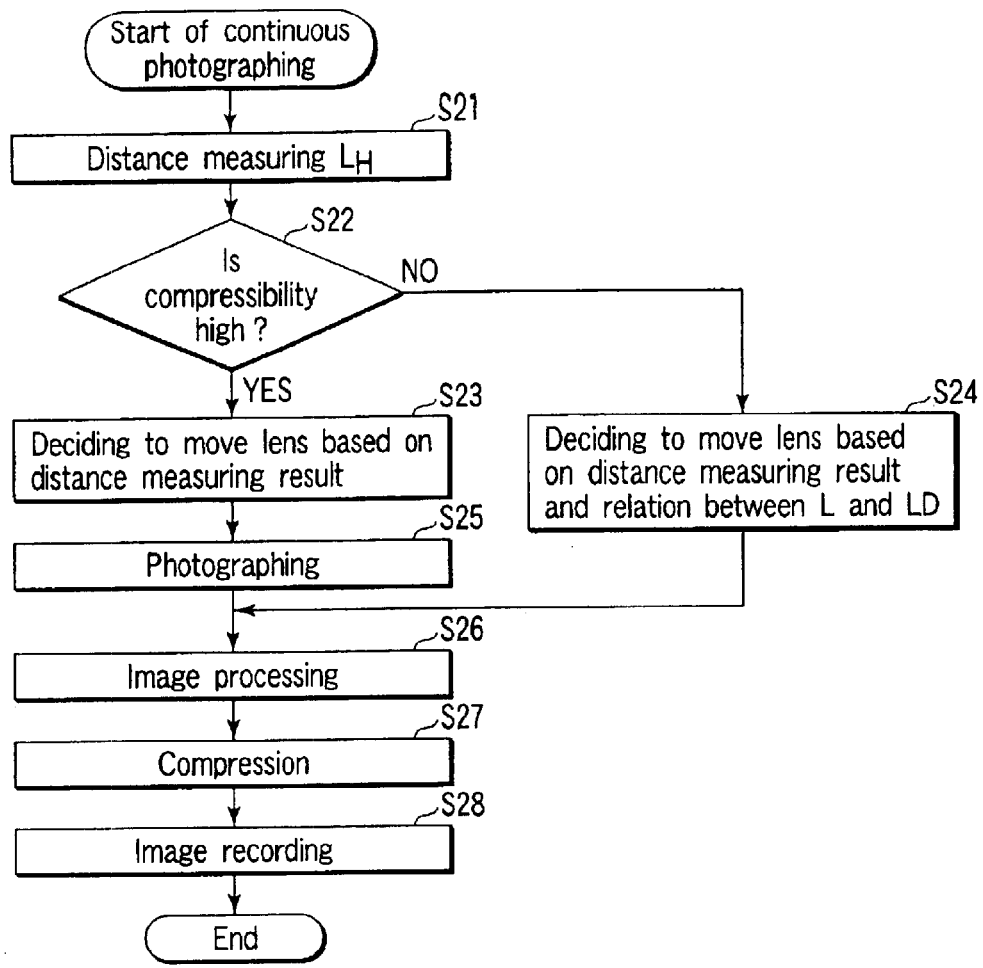
FIG. 7 is a flowchart explaining an operation of a camera when continuous photographing is carried out in the first embodiment.

FIG. 7 is a flowchart explaining an operation of the camera when continuous photographing is carried out.

In this case, since the taking lens 12 is repeatedly operated and stopped, even without execution of climbing AF which takes time, external light distance measuring is carried out to obtain a position and a distance of an object at a high speed in step S21. Then, in step S22, determination is made based on a compressibility.

If the compressibility is high, the process moves from step S22 to step S23. In step S23, based on a result of the compressibility, a paying-out direction of the taking lens 12 is decided as in the case of the flowchart of FIG. 6. On the other hand, if the compressibility is low, the process moves to step S24, where a paying-out position of the taking lens 12 for focusing is decided without executing climbing AF. This is decided based on the relation between the distance (L) and the focusing position (LD) calculated in step S12 of the flowchart of FIG. 6. After step S23 or S24, a photographing operation is carried out in step S25.

Processing operations thereafter, i.e., image processing, compression and image recording of steps S26, S27, S28 are similar to those of steps S5, 56, S7 described above with reference to the flowchart of FIG. 6, and thus description will be omitted.

In such a flowchart, if even a rough image is satisfactory (e.g., if a scene to be added to electronic mail and finally set in a small-capacity file is photographed), focusing of a shortened release time lag which is basic to the camera is carried out.

In the aforementioned example, the user first sets the compressibility to execute photographing. However, for example, the invention can be applied to a technology of a system where a camera sets an optimal compressibility based on an image signal or distance data detected by the distance measuring sensor array.

Figure 4C:
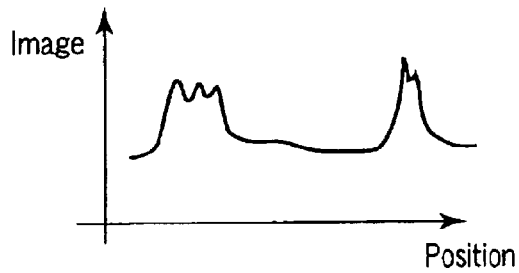

For example, in a scene shown in FIG. 4A, a distance distribution shown in FIG. 4B and a color distribution shown in FIG. 4C are obtained. By using such information, for example, if a main object is near and its mage data has a high frequency, a compressibility may be set low.

Next, description will be made of a method which obtains a focusing position from distance information.

Figure 8:
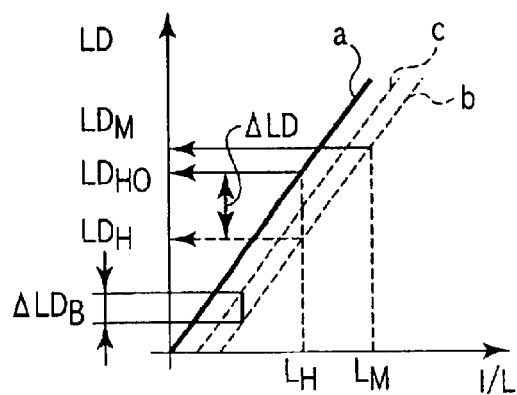
FIG. 8 is a view showing a relation between an inverse number 1/L of a distance L and a focusing position LD.

Generally, a relation between an inverse number 1/L of a distance L and a focusing position LD becomes similar to that indicated by a solid line a (examined value) in FIG. 8. Accordingly, the CPU 20 prestores a relation between 1/L and LD represented by the following equation (1):

$$LD = A \times 1/L + B \qquad (1)$$

(A, B are optional numbers).

However, as described above, the relation of the equation (1) is not always constant because of changes in humidity and temperature and a change of each block by a posture difference. Thus, since a generated error $\Delta LD$ is changed by such conditions, it becomes similar to that indicated by a broken line b (actual 1) of FIG. 8.

Thus, according to the embodiment, by using an output of the imager in a focusing position $LD_{H0}$ at a distance $L_H$ in first distance measuring, $\Delta LD$ which is a difference from a theoretical value is calculated by the following equation (2). Based on a result of re-distance measuring, during focusing of an object of a distance $L_M$, the $\Delta LD$ is added, and the focus lens is controlled to a focusing position of $LD_M$ by the following equation (3):

$$\Delta LD = LD_H - LD_{H0} \qquad (2)$$

$$LD_M = A \times 1/L_M + B + \Delta LD \qquad (3)$$

Figure 9A:
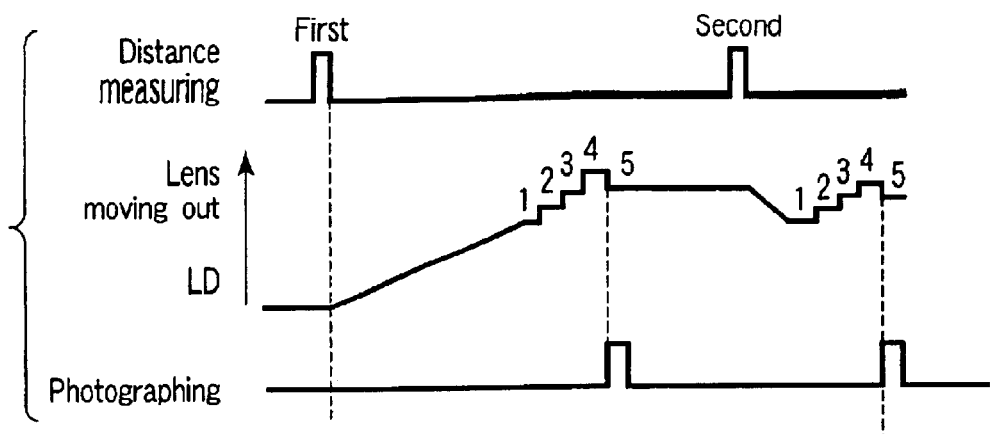
FIGS. 9A to 9C are timing charts showing an effect of a refocusing speed, FIG. 9A a timing chart when climbing is carried out for each distance measuring, FIG. 9B a timing chart in a form of resetting a lens position for each photographing, and FIG. 9C a timing chart showing an effect of the first embodiment of the present invention.
Figure 9B:
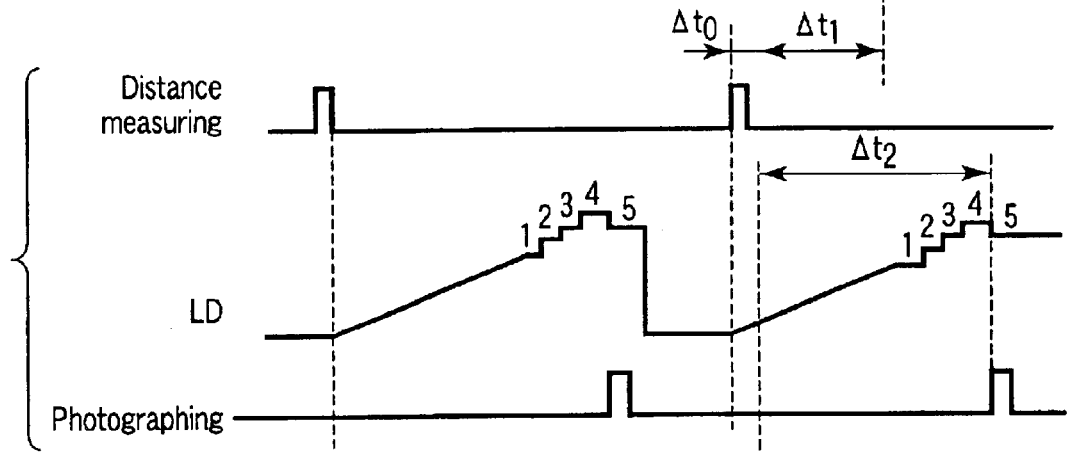
Figure 9C:
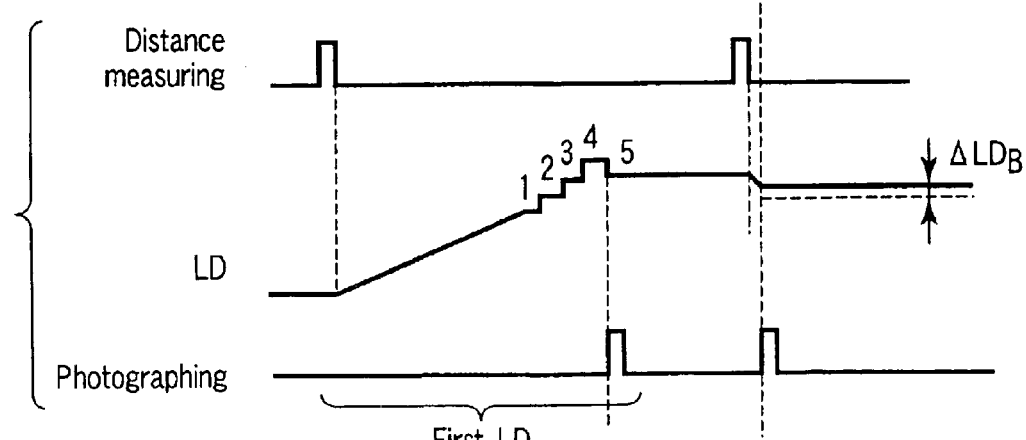

FIGS. 9A to 9C are timing charts showing effects of a refocusing speed in this case.

FIG. 9A is a timing chart when climbing AF is executed for each distance measuring. In this case, the taking lens is paid out from an infinite (∞) position in accordance with a distance measuring result. In the drawing, numerals 1 to 5 indicate five focusing positions, showing a situation of detecting contrast (situation of executing climbing AF).

In second distance measuring, climbing AF is executed again in the five focusing positions. In this example, the climbing AF is executed by bringing the focus lens to a climbing start position from the lens position of the first distance measuring without resetting it.

As shown in the timing chart of FIG. 9B, in the form of resetting the lens position for each photographing, the process takes more time equivalent to paying-out of an infinite position.

FIG. 9C is a timing chart showing effects of the first embodiment.

According to the present invention, as described above, a focusing position of the second distance measuring is calculated by using a result of first lens position (LD) control. Thus, by executing focusing position control only in distance measuring, focusing is possible within time of $\Delta t_0$. It can be understood that time of $\Delta t_1$ is improved compared with the example of FIG. 9A, and time of $\Delta t_2$ is improved compared with the example of FIG. 9B.

So-called "backlash" occurs when the lens is withdrawn as shown in FIG. 9C. The backlash is inevitable, because the mechanical system moves for a distance when the lens is moved forward and it moves a different distance when the lens is withdrawn. The backlash must be considered to set the relation that 1/L and LD should have when the lens is withdrawn.

The relation between 1/L and LD, which has been set in accordance with the backlash, is indicated by the chain line (c) (actual 2) in FIG. 8. Also shown in FIG. 8 is the relation that 1/L and LD have when the lens is moved forward.

If a difference at the time of the backlash is a predetermined value $\Delta LD_B$, it can be understood that the lens may be focused on a focusing position calculated by the following equation (4):

$$LD_M = A \times 1/L_M + B + \Delta LD - \Delta LD_B \qquad (4)$$

Thus, in the timing chart of FIG. 9C, the lens is focused on a position based on consideration to the $\Delta LD_B$ in second focusing. If a result of second distance measuring shows a near distance and it is not accompanied by a paying-in operation, the calculation of the equation (3) applies.

If the taking lens is a zoom lens, a focusing position is shifted by zooming, and thus focus control is carried out by considering this shifting.

Such contrivance enables a higher focusing speed to be achieved without executing climbing AF.

(Second Embodiment)

Next, a second embodiment of the present invention will be described.

Figure 10:
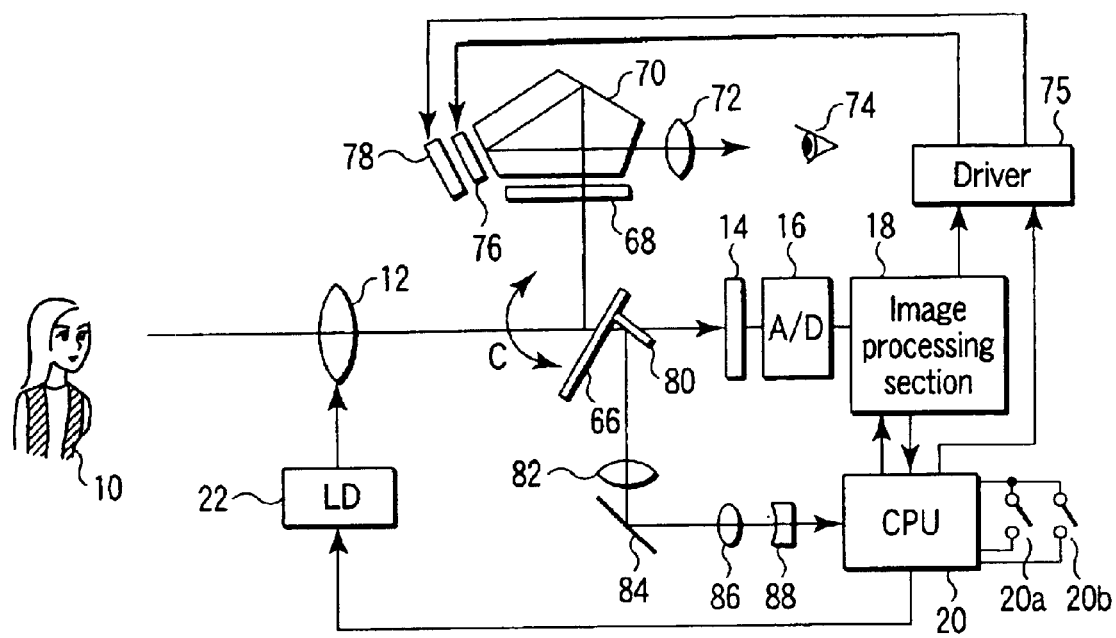
FIG. 10 is a block diagram showing a schematic constitution of an AF camera of a so-called single lens reflex type according to a second embodiment of the present invention.

FIG. 10 is a block diagram showing a schematic constitution of an AF camera of a so-called single reflex type according to the second embodiment of the present invention.

In the embodiment described hereinafter, since a constitution or the like of the camera is basically similar to that of the first embodiment, similar portions are denoted by similar reference numerals, and drawings and description thereof will be omitted.

In FIG. 10, a light from a main object 10 is guided through a taking lens 12 to a main mirror 66 which can be rotated in an arrow direction C in the drawing, and which is constituted of a half mirror. If this main mirror 66 is retreated (positioned above) from an optical path, the light from the main object 10 forms an image on an imager 14. On the other hand, if the main mirror 66 is positioned in the optical path, the light from the main object 10 is reflected by the main mirror 66 to form an image on a focusing screen 67. Further, through a pentaprism 70 and an eyepiece lens 72, the formed image can be observed by an eye 74 of a photographer.

Such optical constitutional contrivance enables checking of a video passed through the taking lens 12.

A liquid crystal display section 76 and an illumination section 78 are disposed through a driver 75 before the pentaprism 70 to form an electronic video by the imager 14.

Figure 11:
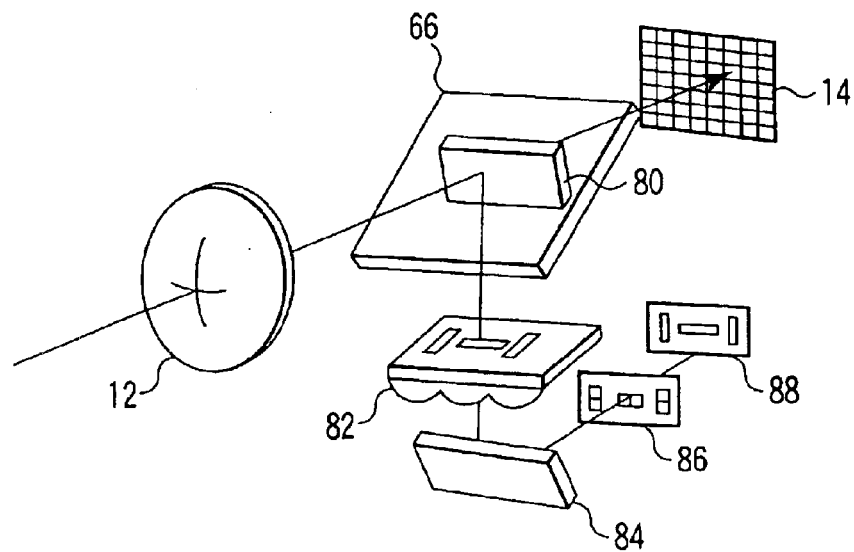
FIG. 11 is a perspective view showing an arrangement of a distance measuring optical system of FIG. 10.

On the other hand, as shown in FIG. 11, the object image passed through the main mirror 66 is reflected by a submirror 80 disposed after the main mirror 66. Then, the object image is formed through a condenser lens 82, a mirror 84 and a separator lens 86 on a photodiode array 88.

This image corresponds to a different pupil position of the taking lens 12, and a pair of image signals are formed for one point in the screen. The pair of image signals are set in a predetermined positional relation when the camera is focused on the object. Thus, in focus control of the taking lens 12 by the CPU 20, the taking lens 12 for focusing is moved back and forth through a lens driver 22 so as to set positions of the pair of image signals in a predetermined positional relation (TTL phase difference AF).

If the submirror 80 is constituted of a half mirror, a part of a main incident light on the imager 14 by the taking lens 12 reaches above the imager 14 even if the main mirror 66 is located in the optical path. Accordingly, image processing is carried out at an image processing section 18 to extract a contrast signal, and the taking lens 12 is fine-adjusted to enable execution of climbing AF. That is, according to the second embodiment, AF of the two systems can be used in combination as in the case of the first embodiment. However, during photographing, in the retreated state of the main mirror 66 from the optical path between the taking lens 12 and the imager 14, the TTL phase difference AF cannot be executed.

A liquid crystal display section 76 and the illumination section 78 disposed before the pentaprism 70 constitute an electronic finder (EVF). This electronic finder enables continuous monitoring of an electronic image made incident on the imager 14 from the taking lens 12 even if the image from the taking lens 12 is not projected on the focusing screen 68 after the main mirror 66 is retreated out of the optical path.

Thus, different from the case of the conventional single lens reflex camera, a field of vision is not blacked out even while a shutter is open.

By such contrivance, photographing can be enjoyed in long-time exposure or for a moving body while a movement of an object is checked.

Figure 12:
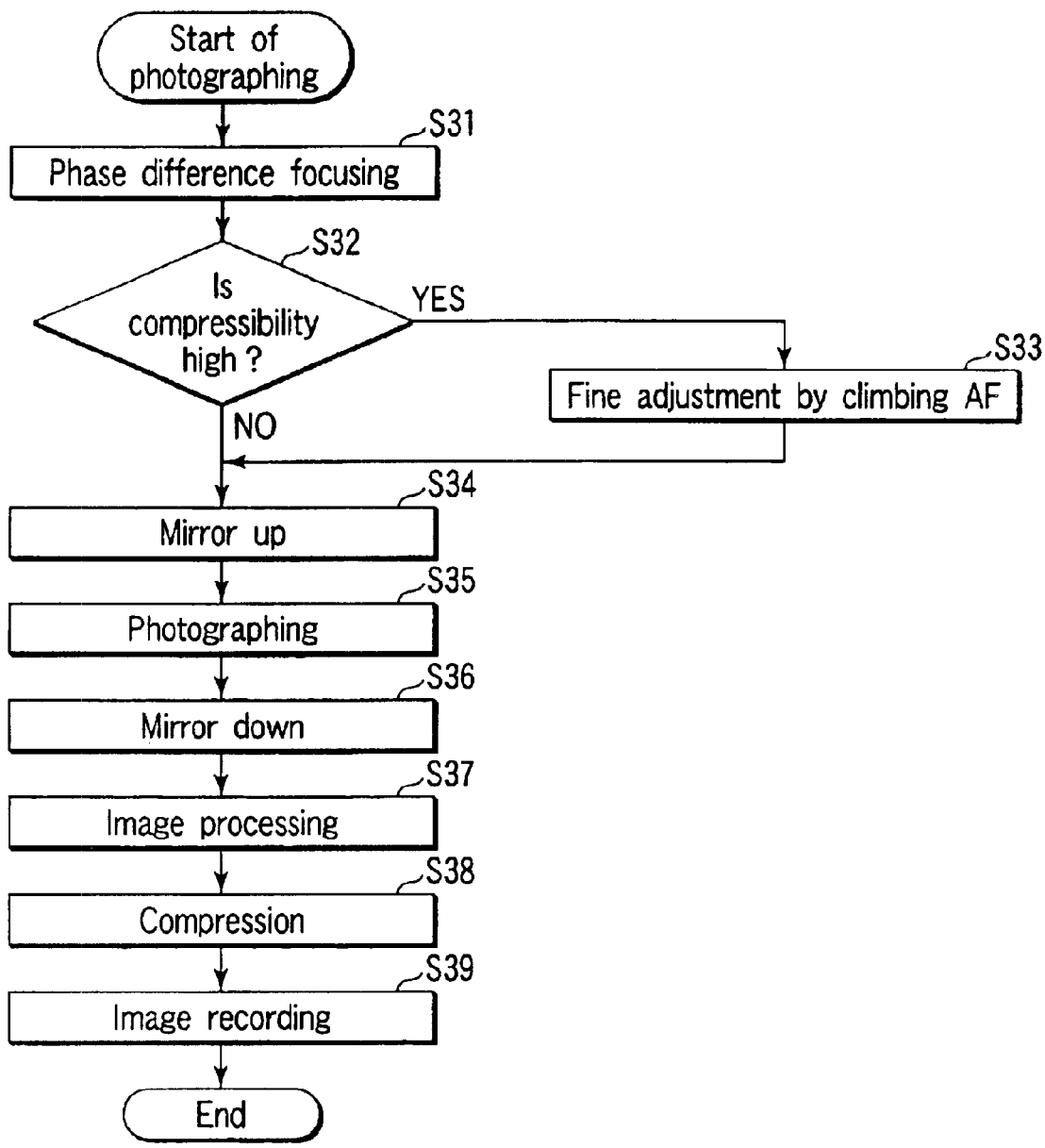
FIG. 12 is a flowchart explaining a photographing sequence of the camera of the second embodiment of the present invention.

FIG. 12 is a flowchart explaining a photographing sequence of the camera of the second embodiment.

In the sequence, first, in step S31, focusing is carried out by the aforementioned phase difference system. Normally, this focusing suffices. However, among a group of users of single lens reflex cameras, many set great store by image quality. Thus, in such a case, if photographing is carried out by low image compression, fine adjustment is added by climbing AF which evaluates contrast by a pixel unit of the imager.

Thus, in subsequent step S32, a compressibility is determined. If photographing of a low compressibility is selected, the process moves to step S33. If photographing of a high compressibility is selected, the process moves to step S34.

In step S33, in addition to the focusing by the phase difference, fine adjustment by climbing AF is added to carry out photographing by higher resolution.

Subsequently, in step S34, the main mirror 66 is retreated out of the optical path (mirror up), and photographing is executed in subsequent step S35. Then, after the main mirror 66 is positioned in the optical path (mirror down) in step S36, image processing is carried out in step S37. Further, image compression processing of step S38, and image recording of step S39 are carried out to finish the sequence.

Figure 14A:
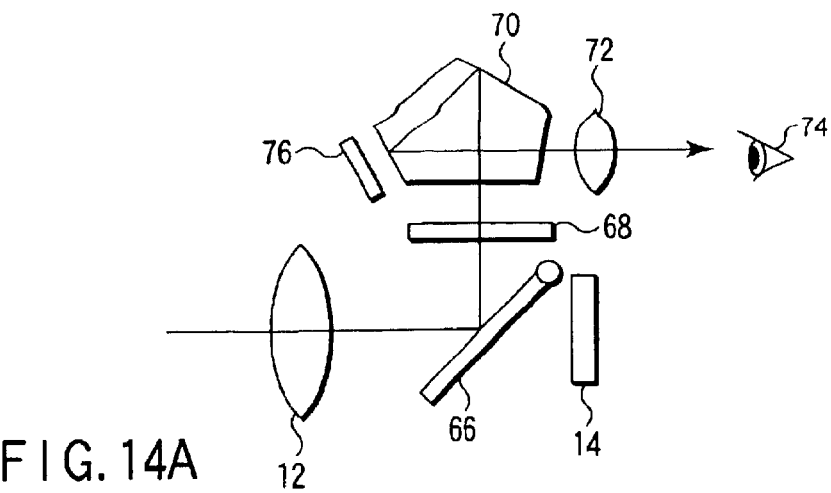
FIG. 14A is a view showing a state of an optical system when focusing is carried out by a phase difference AF.
Figure 14B:
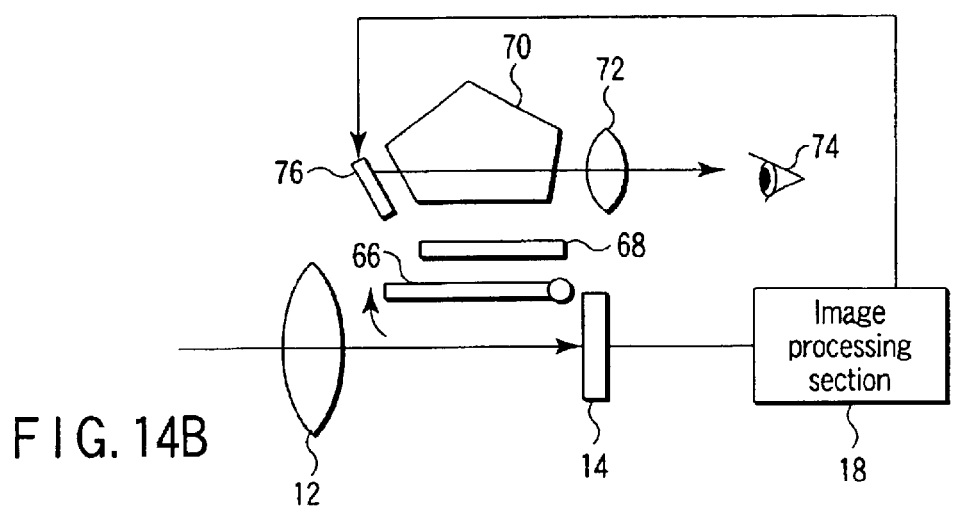
FIG. 14B is a view showing a state of the optical system when a mirror is up.

In this case, the aforementioned electronic finder function may be actuated to enable checking of the object image even while the mirror is up as shown in FIG. 14B.

During continuous photographing, the EVF function can be used more effectively.

Figure 13:
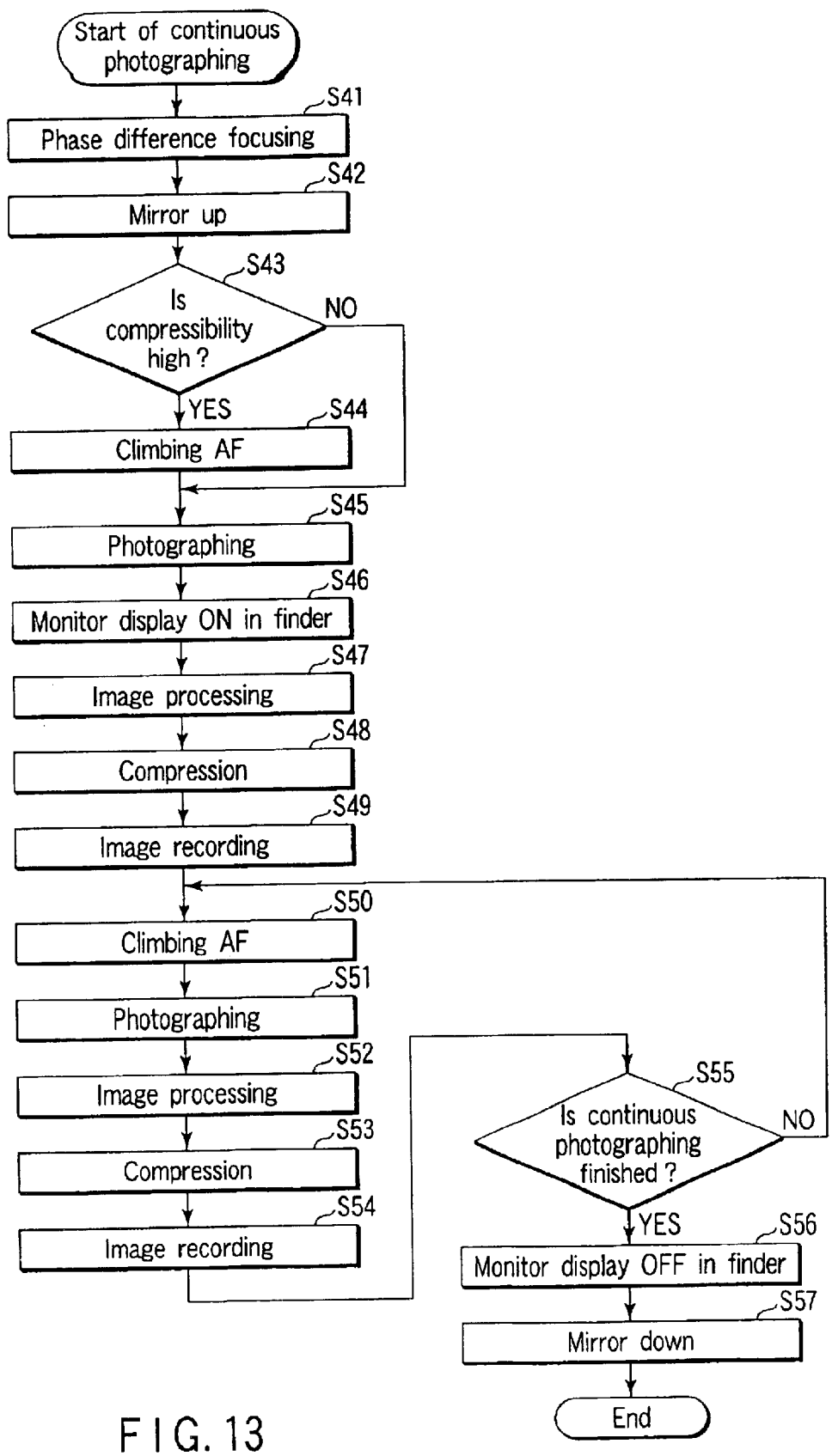
FIG. 13 is a flowchart explaining an operation of continuous photographing in the second embodiment.

FIG. 13 is a flowchart explaining the continuous photographing operation.

First, as in the case of the flowchart of FIG. 12, focusing by a phase difference AF is carried out in step S41. At this time, the main mirror 66 is located in a position shown in FIG. 14A.

Then, the mirror is moved up in step S42, and a compressibility is determined in step S43.

If photographing of a low compressibility is selected, the process moves to step S44 to execute climbing AF. On the other hand, in the case of photographing of a high compressibility, the process moves to step S45. Then, photographing is executed in step S45.

Then, in step S46, an image picked up by moving the mirror up is displayed by this timing as shown in FIG. 14B, and displayed on the monitor in the finder to function the electronic finder.

After image processing of step S47, image compression processing of subsequent step S48 and image recording of step S49 are carried out. Subsequently, in step S50, focusing is executed by climbing AF. Accordingly, second photographing is carried out in step S51. In the execution of this photographing, image processing is carried out again in step S52, and image compression processing of step S53 and image recording of step S54 are carried out.

Then, in step S55, determination is made as to whether the continuous photographing is finished or not. If the photographing (continuous photographing) is not finished yet, the process moves to step S50. If finished, the process moves to step S56.

In step S56, the monitor displaying in the finder which functions as the electronic finder in step S46 is turned OFF. Then, the mirror is moved down in step S57 to finish the sequence.

Steps S47 to S49 are steps of image processing, compression and recording. However, if the main mirror is moved up and down for each photographing, a time lag is made longer. Thus, during the continuous photographing, after the mirror is moved up in step S42, the mirror is not moved down (step S57) until the end of the continuous photographing (step S55).

Figure 15A:
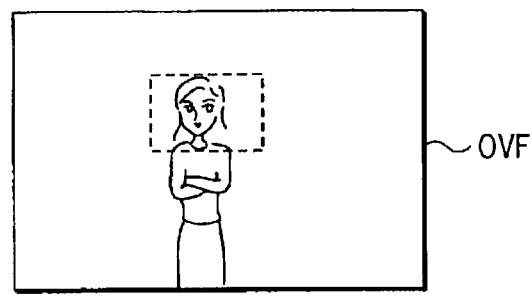
FIGS. 15A and 15B are views showing an example of a display state of a finder during continuous photographing.

After step S50, no phase difference AF is carried out, focusing is carried out by climbing AF, and the photographing sequence of steps S51 to 54 is repeated. The finder at this time is different from an optical finder (OVF) shown in FIG. 15A, and a display form (EVF) shown in FIG. 15B may be employed.

Figure 15B:
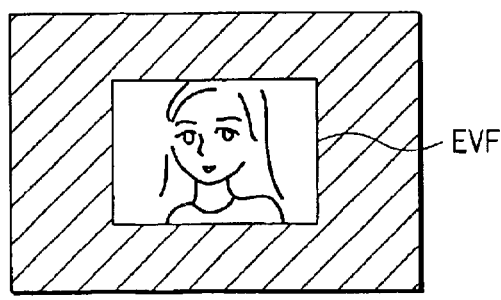

In the example shown in FIG. 15B, only the main object is enlarged so that a human expression can be known well. The monitor displaying in this finder is turned OFF before the mirror is moved down to suppress current consumption. However, roughness of a pixel during displaying may be switched to check effects.

As described above, according to the second embodiment of the present invention, in the digital camera of the so-called single lens reflex type, the AF system can be selected which is designed to set balance between a time lag basic to the camera and resolution by effectively using the TTL phase difference AF and the climbing AF separately.

(Third Embodiment)

Next, a third embodiment of the present invention will be described.

Figure 16:
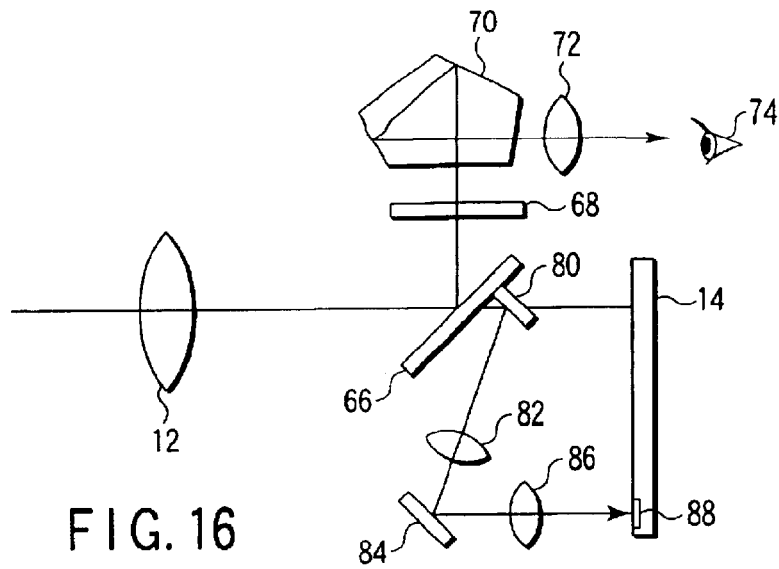
FIG. 16 is a view showing a schematic constitution of an optical system of an AF camera of a so-called single lens reflex type according to a third embodiment of the present invention.

As an optical system of a single lens reflex camera, a constitution is not limited to that described above with reference to FIG. 10, but a constitution similar to that of FIG. 16 may be employed.

That is, as shown in FIG. 16, the camera constitution of the second embodiment may be simplified by forming a phase difference AF sensor 88 on the same chip as that of an imager 14 for imaging.

The second embodiment has been described only by way of switching based on a compressibility. According to the third embodiment, however, a time lag priority mode can be set as shown in a flowchart of FIG. 17.

Figure 17:
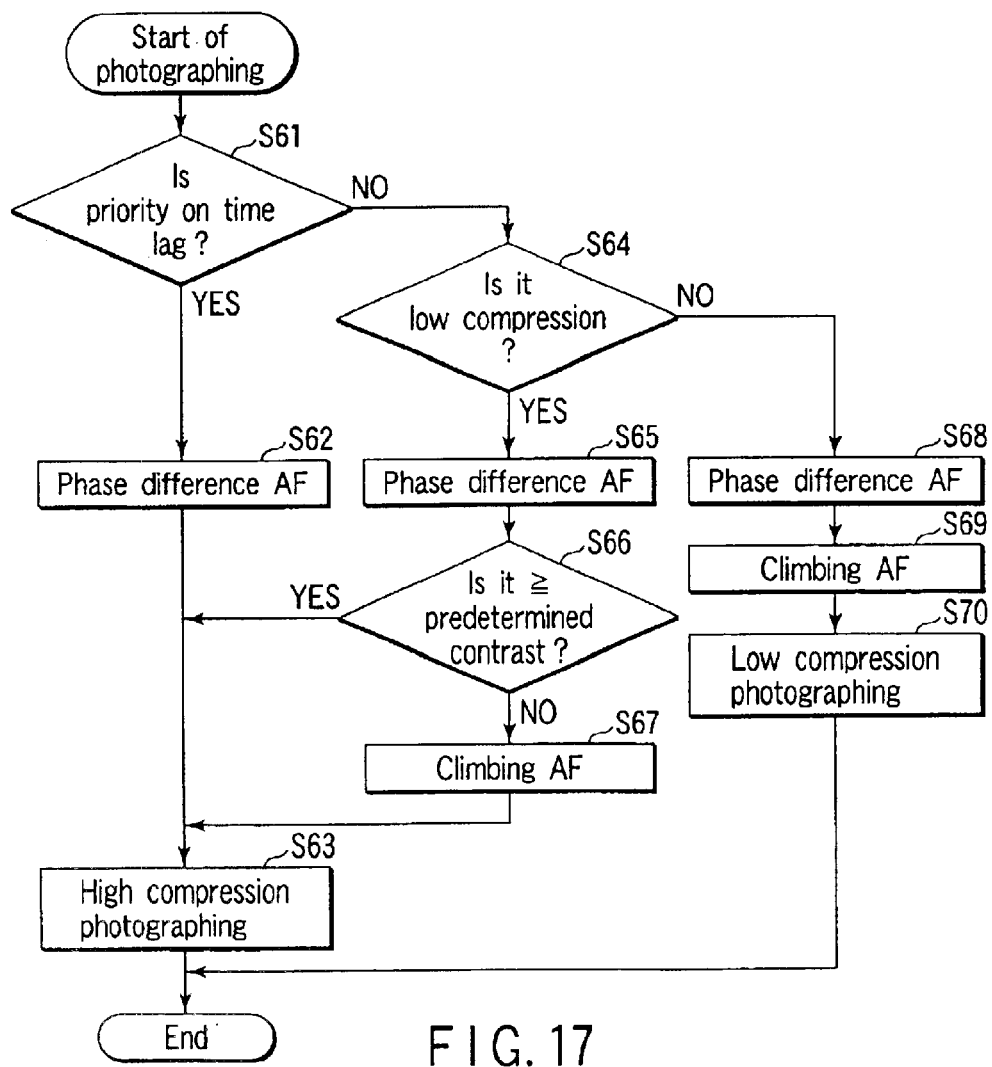
FIG. 17 is a flowchart explaining a photographing operation of the camera of the third embodiment of the present invention.

FIG. 17 is a flowchart explaining a photographing operation of a camera of the third embodiment.

First, in step S61, determination is made as to whether a time lag priority mode is selected or not. If the time lag mode is selected, the process moves to step S62 to carry out phase difference AF. Then, during photographing of step S63, a compressibility of photographing data is set high to record the data.

If the time lag priority mode is not selected in step S61, the process moves to step S64 to determine a compressibility. If a compressibility is not low, the process moves to step S65 to carry out phase difference AF. Then, in step S66, contrast is checked.

If a result of the checking shows that the contrast is equal to/higher than predetermined contrast, the process moves to step S63 to start photographing, and recording is carried out at high compression. On the other hand, if the contrast is lower than the predetermined contrast in step S66, the process moves to step S67 to carry out climbing AF, and then the process moves to step S63 to carry out photographing and recording.

If photographing where high resolution is obtained to lower a compressibility is determined in step S64, the process moves to step S68 to carry out phase difference AF first. Subsequently, climbing AF is carried out in step S69. In this case, a compressibility is lowered when photographing and recording are carried out in step S70.

Thus, according to the third embodiment, the AF system is decided by considering the release time lag and the compressibility.

(Fourth Embodiment)

Next, a fourth embodiment of the present invention will be described.

The first to third embodiments have been described by paying attention to the compressibility. However, according to the concept of the present invention, the AF system may be switched in accordance with not only the compressibility but also other parameters which decide image quality.

For example, a digital camera incorporates processing which converts an image constituted of a pixel shown in FIG. 18A into a pixel of an area larger by four times shown in FIG. 18B (switching of the number of recording pixels).

The digital camera often incorporates an edge emphasis processing function which detects, for an image pattern similar to that shown in FIG. 19A, an edge of a black and white changing point as shown in FIG. 19B, and increases a gain of this portion to add it to an original image (see FIG. 19C). In accordance with such processing selection, the AF system of the camera may be switched as shown in a flowchart of FIG. 20.

FIG. 20 is a flowchart explaining a photographing operation of a camera of the fourth embodiment of the present invention.

That is, first, in step S271, determination is made as to whether a zoom position is tele (T) or not. If the zoom position is tele, the process moves to step S272. If not, the process moves to step S273.

First, in step S81, phase difference AF is carried out (e.g., external light AF in the constitution of FIG. 1). Then, in step S82, determination is made as to whether the number of pixels is small or not. If the number of pixels is small, the process moves to step S83, and to step S85 if otherwise.

Then, in step S83, determination is made as to whether edge emphasis is carried out or not. In the case of edge emphasis, the process moves to step S84, and to step S86 if otherwise.

In step S84, contrast is determined. If a result shows that the contrast is equal to/higher than predetermined contrast, the process moves to step S86, and to step S85 if lower. In step S85, climbing AF is carried out.

That is, if the number of pixels is small and no edge emphasis is carried out, photographing, image processing and image recording of steps S86, S87, S88 are directly carried out. On the other hand, if the number of pixels is large, irrespective of edge emphasis, climbing AF of step S85 is carried out in addition to phase difference AF of step S81.

If edge emphasis is carried out while the number of pixels is small, contrast is determined in step S84. If a result shows that the contrast is equal to/higher than the predetermined contrast, the process directly starts photographing of step S86. If lower than the predetermined contrast, climbing AF of step S85 is executed.

Thus, according to the fourth embodiment, the AF system is optimized based on the number and sizes of pixels of an image, execution of sharpness processing etc. That is, for a sharp photograph having a large number of pixels, climbing AF which considers even contrast of a pixel unit is carried out. For other photographs, however, since a time lag is made longer in this system, no climbing AF is carried out, and high-speed focusing is achieved.

According to the first to fourth embodiments, it is possible to provide a camera which optimizes a relation between a focus control system and a compressibility to combine them, and sets balance between a release time lag and a memory amount of an image recording medium.

Next, brief description will be made of a basic constitution and an operation of a camera according to each of fifth and sixth embodiments with reference to FIGS. 21 to 23B.

Figure 23A:
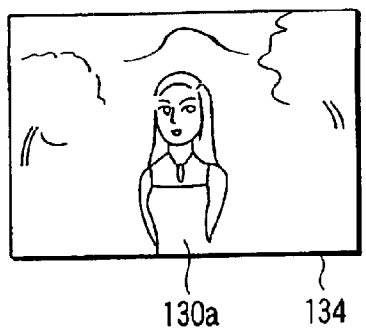
FIGS. 23A and 23B are views showing a photographic scene by the camera, FIG. 23A a view showing a human object in the photographic screen, and FIG. 23B a view showing the human object and a background in the photographic screen.
Figure 23B:
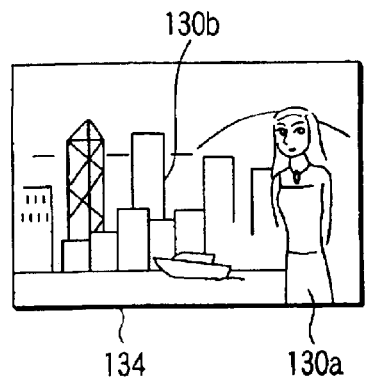

FIG. 21 is a block constitutional view showing an internal constitution of the camera of each of the fifth and sixth embodiments of the present invention. FIGS. 22A and 22B are views schematically showing an appearance of the camera and a distance measuring section inside. FIGS. 23A and 23B are views showing an example of a scene to be photographed by the camera.

As shown in FIG. 21, the camera is constituted by including a microprocessor (CPU) 100, a pair of light receiving lenses 102a, 102b, a pair of sensor arrays 104a, 104b, a distance measuring section 106 constituted of an A/D conversion section 106a, a distance measuring calculation section 106b etc., a taking lens 110, an imager 112, an A/D converter 114, an image processing section 116, a lens driving section 118, a zoom detection section 120, a recording medium 122, and a light source 124 as an auxiliary light source. This is a camera of a type called an external light system AF (referred to as "external light AF" hereinafter).

The CPU 100 works as arithmetic operation control means to control a photographing sequence (detailed later) of the entire camera overall. A switch 100a which starts the photographing sequence is connected to the CPU 100. According to setting, when the CPU 100 recognizes an ON operation of the switch 100 by a not-shown photographer, a series of photographing operations are started. The CPU 100 includes a function as later-described selection means, and controls the camera to select a plurality of focusing functions based on a position of an object image in a photographic screen (detailed later).

The pair of light receiving lenses 102a, 102b are arranged to receive a reflected light from an object 130, and to form images on the pair of sensor arrays 104a, 104b. In the pair of sensor arrays 104a, 104b, formed images (object images) from the object 130 are converted into electric signals (referred to as "image signals" hereinafter) to be outputted to the distance measuring section 106.

The distance measuring section 106 is distance measuring means of a "passive system" constituted by including the A/D conversion section 106a and the distance measuring calculation section 106b. The A/D conversion section 106a in the distance measuring section 106 converts the image signals entered from the sensor arrays 104a, 104b into digital signals, and outputs them to the distance measuring calculation section 106b. The distance measuring calculation section 106b calculates a distance (object distance) from the camera to the object based on the digital signals by a "triangular distance measuring principle". The distance measuring section 106 is equivalent to a distance measuring device incorporated in the camera.

The CPU 100 carries out focusing control of the taking lens 110 based on the calculated object distance. That is, the CPU 100 focuses the taking lens 110 by controlling the lens driving section 118 based on the object distance calculated by the distance measuring calculation section 106b.

The imager 112 is constituted of a CCD or the like. After the end of the focusing of the taking lens 110, this CCD is used to carry out an electronic exposure operation. That is, the imager 112 converts the object image formed through the taking lens 110 into an electric image signal, and outputs it to the analog/digital (A/D) converter 114.

The A/D converter 114 converts the image signal into a digital signal, and then outputs the digital signal to the image processing section 116. At the image processing section 116, color and gradation of the image are corrected based on the entered digital signal, then compression processing is executed for a corresponding image signal, the image is recorded on the recording medium 122, and thus a series of exposure operations are completed.

The light source 124 is constituted of a flash device or the like. From the light source 124, an auxiliary light for exposure or distance measuring is radiated to the object 130 in accordance with a scene to be photographed as occasion demands.

A positional relation between the light receiving lenses 102a, 102b and the sensor arrays 104a, 104b, and the taking lens 110 and the imager 112 is similar to that shown in FIG. 22A. The same image of the object 130 can be detected by the sensor arrays 104a, 104b and the imager 112.

Specifically, when outputs of the sensor arrays 104a, 104b are used for calculation of an object distance, in place of an image of the object 130 formed in a position indicated by a solid line in the drawing, an image of the object 130 formed in a different position, e.g., a position indicated by a broken line in the drawing, is used. Accordingly, it is possible to detect distances of objects other than the object 130 in the photographic screen (see a plurality of distance measuring points: FIG. 26B).

In the photographic screen, as actual examples, a center human 130a as a main object similar to that shown in FIG. 23A, and a background including a human 130a on a peripheral end and a center building 130b as a background object similar to that shown in FIG. 23B can be photographed.

Thus, the distance measuring section 106 incorporated in the camera which has an appearance similar to that shown in FIG. 22B carries out a distance measuring operation of a predetermined external light system based on the arrangement of the components shown in FIG. 22A.

A release button 100b is projected from the upper surface of the cameral (main body) 132 on the appearance to operate the switch 100a. On the front of the camera 132, the taking lens 110 and the light receiving lenses 102a, 102b are arranged in the positional relation shown in FIG. 22A. Further, a light emission window 124a for the light source 124 of the incorporated flash device is disposed on the upper end of the front of the camera 132.

Thus, it can be said that the camera of the embodiment is mainly constituted of components which have the following functions.

That is, the camera comprises contrast detection means (imager 112, A/D converter 114 or the like) which detects contrast of an object image signal obtained through the taking lens 110, multipoint distance measuring means (distance measuring section 106) which ranges a plurality of points in the photographic screen through a pair of optical systems (light receiving lenses 102a, 102b or the like) different from the taking lens 110, first, second focus adjustment means (lens driving section 118) which focus the taking lens 110 based on a detection result of the contrast detection means or a distance measuring result of the multipoint distance measuring means, position determination means (sensor arrays 104a, 104b) which determines a position of a main object in the photographic screen, and the CPU 100 which operates the first focus adjustment means (a part of the lens driving section 118) when the position determination means determines that the main object is positioned on the center, and which operates the second focus adjustment means (a part of the lens driving section 118) when the main object is determined to be positioned on the periphery in the photographic screen.

Next, features will be described by way of the fifth and sixth embodiments.

(Fifth Embodiment)

Hereinafter, description will be made of features of the camera of the fifth embodiment with reference to FIGS. 23A and 23B.

Regarding "scene division" for focusing control intended by a photographer in the composition of the photographic screen, a scene shown in FIG. 23A is an example where a human 130a as a main object is on the center of the screen, and a scene shown in FIG. 23B is an example where the human 130a as the main object is on the periphery of the screen.

In the case of FIG. 23A, since the human 130a is on a most important position of the screen, there is no doubt that a main object of the not-shown photographer is this human 130a. Thus, since sufficient focus control is considered necessary for the human 130a, focusing is carried out by an "imager AF" which is not affected by a temperature, a humidity and a posture difference during photographing. The imager AF is a system to determine contrast of an image while moving the taking lens 110, and thus it has a drawback that it takes time to start/stop the taking lens 110 and a time lag is made longer.

The focusing of such a system is not always satisfactory in a scene similar to that of FIG. 23B. That is, in such a scene to be photographed, the photographer is surely interested not only in the human 130a but also in the background building 130b, and the photographer may wish to focus not only on the human 130a but also on the building 130b. Such a situation is often generated during trips, snapshot photographing is not a target itself, rather a value as a record of memories is high, and the photographing is normally finished within a short time.

In such a scene to be photographed, there is no problem even if the camera is focused on the background, e.g., the building 130b. Even if there is a slight error in the lens driving control as described above, as long as it is little far from the human 130a, the error can often be ignored.

Under such a situation, if time is taken more than necessary to focus on the human 130a, a photo opportunity may often be lost. It is all right if a background object is stationary. However, as shown in FIG. 23B, in a scene where a ship sails across or the like, if focusing takes excessive time, the ship may goes out of the screen 134. Thus, under such a photographing scene, in the camera of the fifth embodiment of the invention, especially focusing which sets great store by a speed having priority on time is carried out.

Now, description will be made of distance measuring in the camera, i.e., a distance measuring principle of the external light distance measuring device which plays an important role in the present invention by referring to FIGS. 24A and 24B.

Figure 24A:
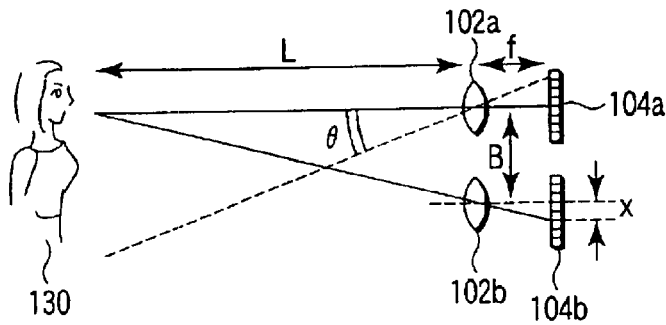
FIGS. 24A and 24B are views showing photometry by the camera, FIG. 24A an explanatory view showing a distance measuring principle of the camera, and FIG. 24B an explanatory view showing a photometric point corresponding to the photographic screen.
Figure 24B:
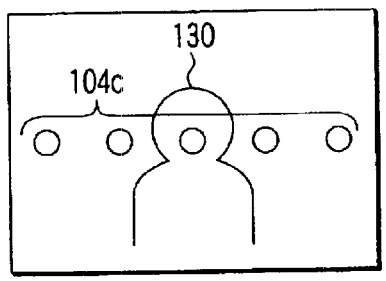

FIG. 24A schematically shows the distance measuring principle of the camera, and FIG. 24B shows an arrangement example of photometry points corresponding to the photographic screen.

The image of the object 130 is guided to the sensor arrays 104a, 104b by the pair of light receiving lenses 102a, 102b separated from each other by a base line length between focal distances. An obtained light from the object forms an image of a relative position difference x where an optical axis is an origin in accordance with a triangular distance measuring principle. Then, an object distance L is obtained based on the relative position difference x.

FIG. 24A shows an example where an image on the optical axis of the light receiving lens 102a is made incident on a position x (position shifted by x from the center) on the sensor array 104b. In the case of distance measuring a position shifted by θ from the optical axis of the light receiving lens 102a, if a focal distance of the light receiving lens is f, by using an image signal of a position ftan θ, a distance up to a point shifted from the optical axis is obtained by a similar idea (L=f/x).

Thus, since several distance measuring points can be set in the arraying direction of the sensor arrays 102a, 102b, as shown in FIG. 24B, it is possible to obtain object distance data regarding multiple points in the screen (multidistance measuring). The distance measuring device having such a distance measuring function is called a "multipoint distance measuring device".

The multidistance measuring device of the "active system" which is a well-known technology may be used in the embodiment. For example, as shown in a principle of active system multidistance measuring of FIG. 25, lights from a plurality of LED's 136 are projected through a projection lens 102c, and reflected signal lights thereof are received through a light receiving lens 102d by an optical position detector 138 to examine incident positions. In this way, multidistance measuring similar to the above can be carried out.

As described above, in the external light system AF (external light AF) described above with reference to FIGS. 21, 22A and 22B, by using the pair of light receiving lenses 102a, 102b and the pair of sensor arrays 104a, 104b similarly to both eyes of the human, an object distance is detected based on the triangular distance measuring principle, and the taking lens 110 is focused based on the object distance.

On the other hand, in the AF (imager AF) which uses the imager output through the taking lens 110, contrast of an object image formed on the imager 112 is detected while the position of the taking lens 110 is changed by the lens driving section 118. Then, the position of the taking lens 110 where contrast becomes highest is determined to be set as a focusing position (lens position of a focusing point).

That is, the imager AF carries out focus control which is different from the system which decides a focusing position based on the object distance as in the case of the external light AF.

In such an imager AF, even if an error is generated in the position control of the taking lens 110, it is possible to detect a focusing position by considering an error as long as the error is small.

However, as shown in FIG. 23B, if the human 130a as the main object is located on other than the center of the photographic screen 134, it is difficult to quickly focus the taking lens 110 on the human 130a.

That is, in order to specify the main object, after contrast determination is carried out for each of the human 130 and the background building 130b as described above, it is necessary to determine which of the human 130a and the background (e.g., building 130b) is suitable as a main object, e.g., which object is located more on the front side. In such a case, it is necessary to carry out the process of contrast determination after an image in a focusing position corresponding to each object is temporarily fetched, which makes time relatively longer.

In the "external light A", image signals from the sensor arrays 104a, 104b shown in FIG. 22A are detected, and shifting of the image signals of the objects based on the parallax of the light receiving lenses 102a, 102b is detected to decide object distances. That is, since the time of driving the taking lens 110 is only after the focusing position is decided, time necessary for focusing is made shorter compared with that of the imager AF.

For a distance to an object other than the main object, it is only necessary to switch the image signal of the object used in object distance calculation. Thus, irrespective of the position of the main object, it is possible to detect an object distance distribution in a wide area such as an area 104c shown in FIG. 24B.

Figure 26:
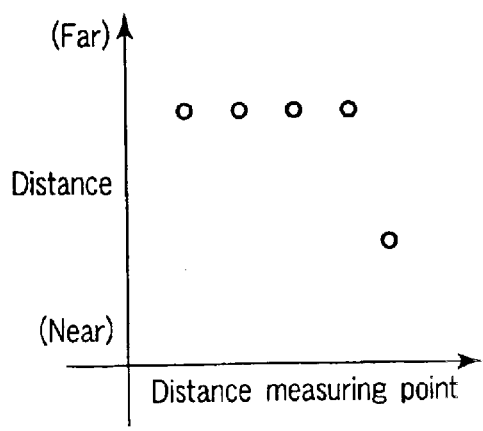
FIG. 26 is a graph showing a distribution relation between a plurality of distance measuring points and an object distance.

FIG. 26 is a graph showing an example of the detected distance distribution. That is, an ordinate indicates a distance, and five distance measuring points are plotted in an abscissa.

After the distance distribution is obtained, where the main object is located can be detected at a high speed. In this case, since right end one of the five distance measuring points is located relatively near, its detection target can be surmised to be a main object.

Next, specific description will be made of operation control of the camera based on a basic idea of the present invention.

Figure 27:
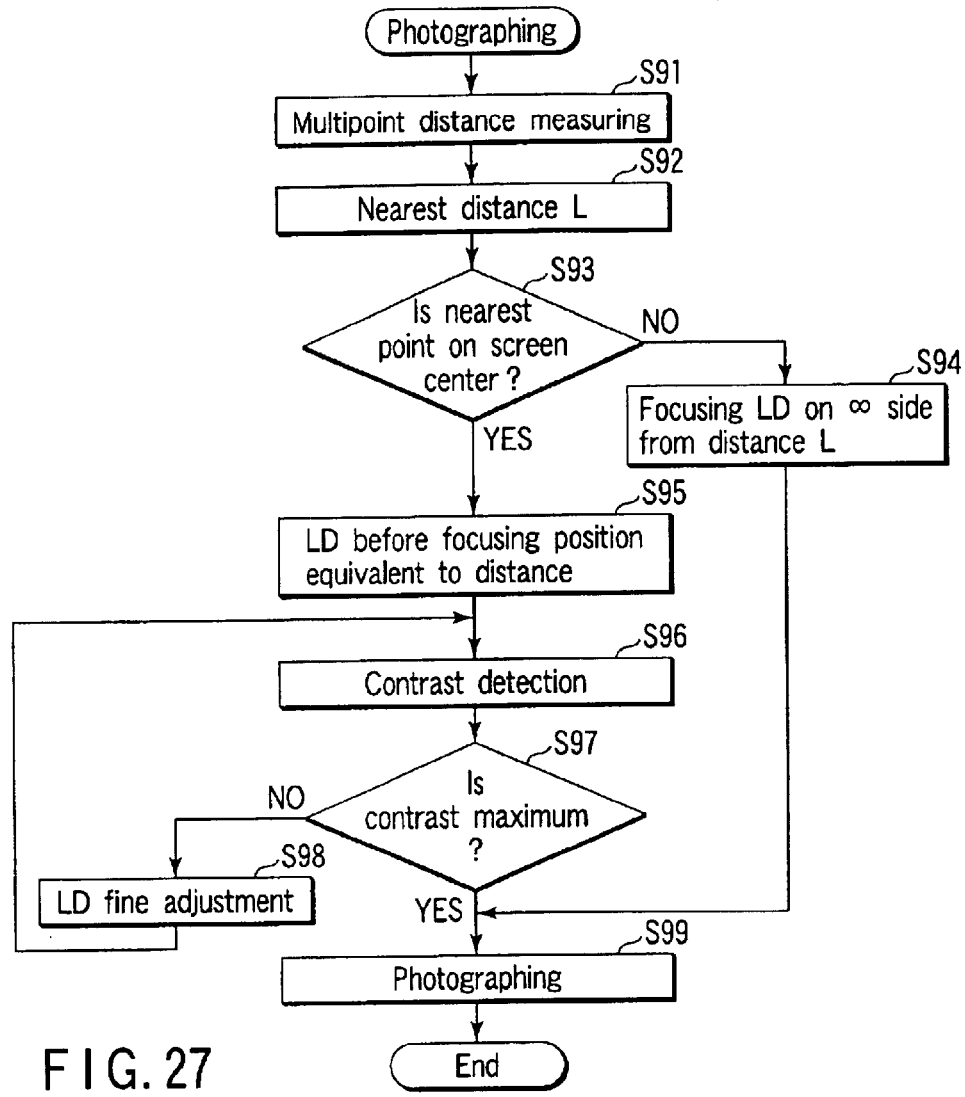
FIG. 27 is a flowchart explaining a photographing control operation of the camera of the fifth embodiment of the present invention.

FIG. 27 is a flowchart explaining a control operation regarding "photographing" in the camera of the fifth embodiment.

First, in step S91, the distance measuring device of the external light AF is driven to range multipoints in the screen. Then, in step S92, since a distance distribution (see FIG. 26) is obtained in a scene similar to that of FIG. 23B, for example, a nearest distance is selected as a main object distance L from this distribution.

In step S93, determination is made as to whether a point (i.e., main object position) indicating a nearest distance is on the center of the photographic screen 134 or not. If the point is on other than the center, the process moves to step S94. For example, in a scene similar to that of FIG. 23B, the operation is regarded as snapshot photographing, and quick focusing which gives priority to a speed is carried out.

In the case of such a scene, photographing including a background becomes a problem more than "just focusing" on a human. Accordingly, if the taking lens 110 is focused accurately on the distance L of the human, shifting caused by an error of lens control to focus on a near distance side results in a photograph of no focus. Thus, a possible error is added, and lens control for focusing is carried out so as to focus on a far distance side (∞ side) from the distance L. Then, the process directly moves to step S99, where a photographing operation is executed, and a series of photographing operations are finished.

Such contrivance enables photographing where focus balance is set between the human and the background at a high speed.

On the other hand, in a scene similar to that shown in FIG. 23A, a main object is located on the center of the screen 134 and, different from the case of FIG. 23B, it is considered that an interest of the photographer is not in the background but only in the human 130a. In such a case, since just focusing on the human 130a becomes one of the conditions for producing a good photograph, the sequence of the imager AF which can set a state of "just focusing" including a lens error is continuously carried out.

However, if contrast detection is executed for all the areas of lens driving, it leads to a great time loss. Accordingly, in step S95, the taking lens 110 is driven before a lens position equivalent to the distance L to the object. Then, in step S96, contrast detection is started.

Then, in step S97, a lens position where contrast is maximum is detected. Here, until the position of the maximum contrast is found, the process moves to step S98, where the lens position is finely adjusted to search a position of "just focusing". Then, focus is set on this position and, after correct focusing, the process moves to step S99 to start a photographing operation. After the end of the photographing operation, the routine is finished.

According to the embodiment based on the foregoing scene division, in the scene where the interest of the photographer is concentrated on one object (human) as shown in FIG. 23A, careful focusing on the human is carried out even if it takes time. In the scene of snapshot photographing during a trip as shown in FIG. 23B, focus control which gives priority to a speed is carried out, and thus no photo opportunity is lost.

Figure 28:
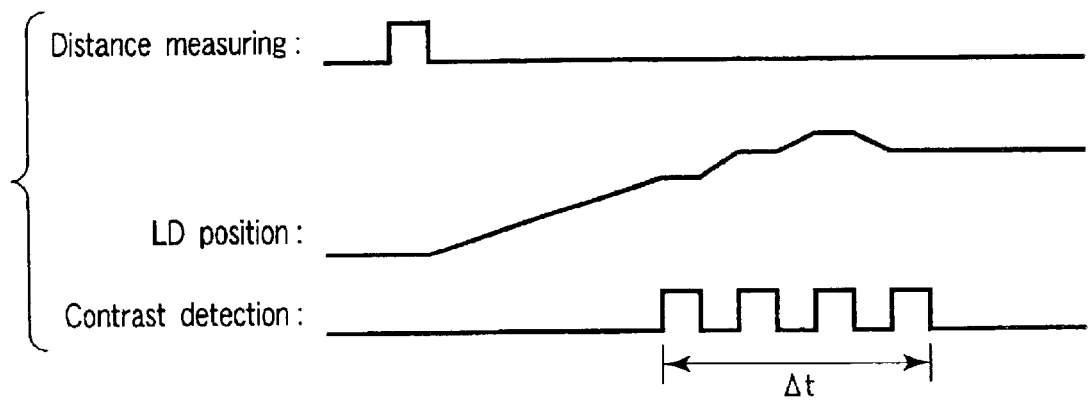
FIG. 28 is a time chart showing a distance measuring timing, a lens driving position and a contrast detection timing.

FIG. 28 shows three timing charts of matched time series for a distance measuring timing, and detection timings of a lens driving (LD) position and contrast for reference.

First, distance measuring is carried out by the external light system distance measuring device and, subsequently, lens driving control is executed based on a result thereof. For example, in a scene similar to that of FIG. 23A, contrast detection is further carried out here, and a lens position of peak contrast is obtained. Thus, lens driving and contrast detection are repeated for time Δt.

However, in a scene similar to that of FIG. 23B, the above contrast detection is not carried out. Thus, photographing can be started within time shorter by Δt. However, even in the composition of FIG. 23B, in order to just focus on the human, photographing is carried out by using a well-known "focus lock" technology or the like.

For example, in the camera which has a focus lock button (not shown) for executing well-known focus lock control before photographing, when the focus lock button is operated, focusing based on contrast of an image signal obtained through the taking lens 110 is not carried out.

On the other hand, a camera is implemented which has a feature that when the focus lock button is not operated, focus control means (lens driving section 118, CPU 100 or the like) is set so as to carry out focusing based on an output result of distance measuring by an optical system (light receiving lenses 102a, 102b) different from the taking lens 110.

As described above, according to the fifth embodiment, when the focus lock is operated, considering that the photographer as a user intends to focus even if it takes time, photographing which gives priority to focus accuracy is carried out. On the other hand, when the object is located on the periphery of the screen, photographing based on the external light AF which gives priority to time is carried out so as not to lose a photo opportunity. In this external light AF, after lens driving based on an object distance obtained as a result of external light distance measuring is executed, focus is set on a desired object in the composition to carry out photographing. Thus, it is possible to enjoy photographing in accordance with a photographing situation and a photographing scene.

(Sixth Embodiment)

Next, description will be made of the sixth embodiment as another improvement example of the present invention.

The camera is a zoom camera which includes basic components similar to those of the foregoing camera (see FIG. 21).

Figure 25:
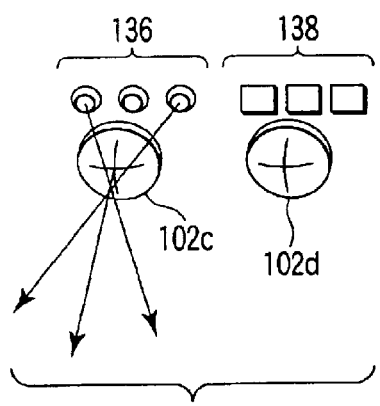
FIG. 25 is an explanatory view showing a principle of multidistance measuring of an active system.

Hereinafter, a photographing control operation of the camera of the sixth embodiment will be described by referring to a flowchart of FIG. 29, a principle view of an active multidistance measuring of FIG. 25, and a graph of FIG. 26 showing a distribution relation between a plurality of distance measuring points and an object distance.

According to the sixth embodiment, "zoom position determination" of step S101 regarding the taking lens 110 is added to the flowchart of FIG. 27. The embodiment provides a long focal distance. For example, the embodiment is effective for a camera equipped with a zoom lens.

That is, in the zoom lens of long focus, a slight error of lens driving during focusing results in a large error to adversely affect photo coming-out itself. In a photographing scene using such a zoom lens, control is carried out to give priority to the imager AF.

In the scene of the composition shown in FIG. 23B, since there is a wish to enter many landscapes in the photographic screen 134, consideration is given to the fact that photographing is often carried out on the wide angle side of the zoom lens. Thus, by considering the zoom position of the lens and the object position, a photographing scene which gives priority to a photo opportunity such as snapshot photographing is determined to execute focusing.

Figure 29:
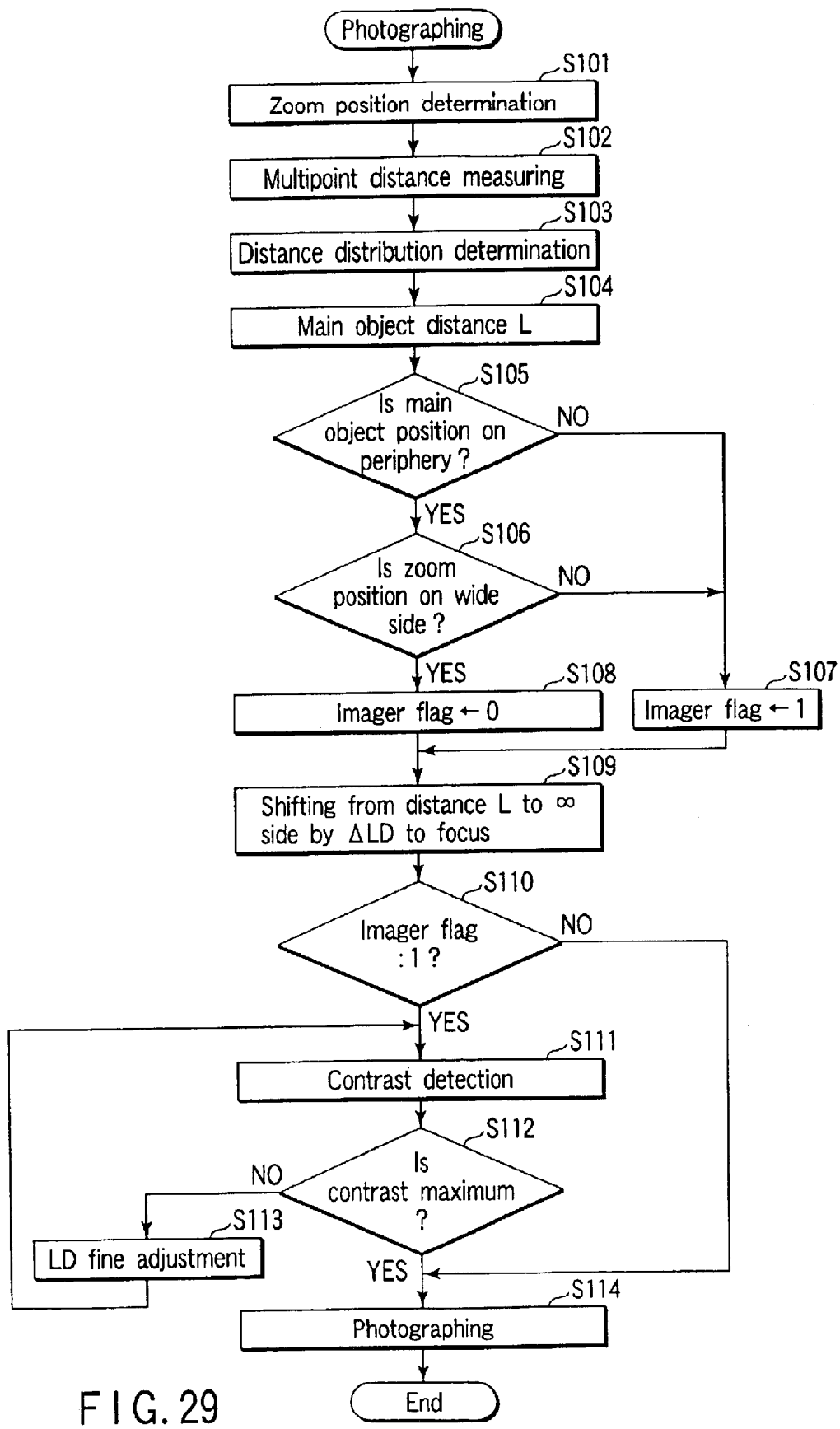
FIG. 29 is a flowchart explaining a photographing control operation of the camera of the sixth embodiment of the present invention.

Thus, in the camera of the sixth embodiment, by using the zoom detection section 120 (see FIG. 21), photographing is carried out in a control procedure shown in the flowchart of FIG. 29.

First, in step S101, a zoom position of the zoom lens is determined. Subsequently, in step S102, multipoint distance measuring is carried out by external light distance measuring. Further, in step S103, a distance distribution of distance measuring points is created based on values obtained by the distance measuring.

Then, in step S104, an object distance L to a main object is determined from the form of the distance distribution. In this case, however, different from the fifth embodiment, it is not always necessary to regard an object of a nearest distance as a main object. For example, a selection method which has "predetermined distance priority" or ignores an object too near as a "rough object" may be implemented, to which the present invention can be applied.

In step S105, determination is made as to a position of the obtained main object in the screen. For example, if the position of the main object is on the periphery of the photographic screen, the process moves to step S106, and to step S107 if the position is not on the periphery.

In step S106, determination is made as to a zoom position. Here, if the zoom position is on the wide side, the process moves to step S108, where a flag indicating execution or nonexecution of the imager AF is set to "0". In the case of other conditions (standard, telescopic), the process moves to step S107, where the flag indicating execution or nonexecution of the imager AF is set to "1".

In subsequent step S109, the lens is shifted to the ∞ side (far distance side) from the main object distance L obtained in step S104 by an error conceivable in lens control to carry out focusing. Then, in step S110, determination is made as to whether the flag indicating execution or nonexecution of the imager AF is "1" or not. If the flag is other than "1", the process moves to step S114, where a high-speed electronic photographing operation is started without operating the imager AF.

On the other hand, in step S110, if the flag indicating execution or nonexecution of the imager AF is "1", the imager AF which can execute feedback control considering even a lens stop position error is started. That is, in step S111, the image obtained through the taking lens 110 is used to start contrast detection. Then, in step S112, a size of the image contrast is determined.

In this case, until maximum image contrast is determined, the process moves to step S113, where the taking lens 110 is moved only by a small amount to be finely adjusted, and the contrast detection is repeated. In a position where the contrast of the obtained image becomes maximum, the lens driving (LD) is stopped, and the process moves to step S114 to start an electronic photographing operation. Then, the photographing is finished.

As described above, according to the sixth embodiment, the camera having the zoom lens in the taking lens 110 comprises the multipoint distance measuring means (distance measuring section 106) which measures distances to the objects of the plurality of points in the photographic screen by the optical system (light receiving lenses 102a, 102b) different from the taking lens 110, the contrast focusing means (lens driving section 118 for the zoom lens) which decides a focusing position based on the contrast of the photographing target obtained through the taking lens 110, the zoom detection means (zoom detection section 120) which detects the zoom position of the taking lens 110, and the deciding means (CPU 100) which decides whether or not to actuate the contrast focusing means in accordance with the zoom position and the result of the multipoint distance measuring.

As control regarding scene division, determination processing of the zoom position of the taking lens is added, a high possibility of snapshot photographing is understood when the zoom position is on the wide side, and focusing which gives priority to a speed is carried out. However, if the main object is on the center of the photographic screen, or during photographing in a telescopic state, control is carried out to execute photographing which gives priority to focusing accuracy.

Thus, an optimal focusing method can be selected by adding the zoom position and automatically determining a photographing situation. Therefore, an easy-to-use camera can be provided.

MODIFIED EXAMPLE

The fifth and sixth embodiments may be modified as follows.

For example, the present invention can be applied to a camera which can use a focus lock in combination.

Figure 31:
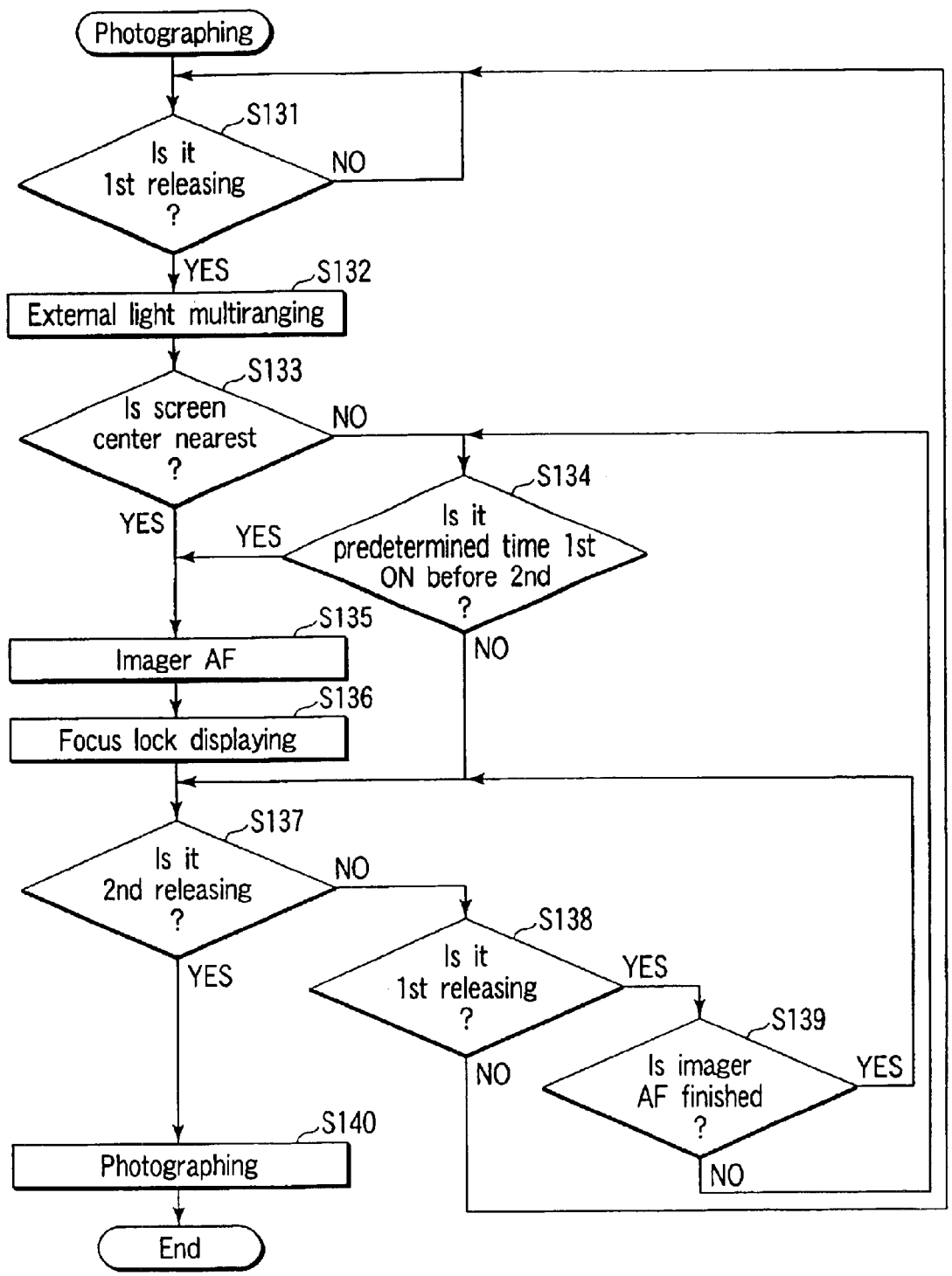
FIG. 31 is a flowchart explaining a photographing control operation of a camera according to another modified example.

FIGS. 30 and 31 are flowcharts explaining in detail a photographing control operation of the camera of the modified example. As in the previous case, according to the modified example, a release button 100b is coupled with a two-stage release switch which corresponds to first and second release switches. Distance measuring can be carried out by an ON operation of the first-stage switch corresponding to the first release switch, and electronic photographing can be carried out by depressing until the second-stage switch is turned ON. In this example, especially, if photographing is carried out by changing a composition after a focusing position is decided at the first stage, focus locking is enabled.

FIG. 30 is a flowchart explaining a control operation when the focus locking is possible. That is, in the camera which additionally includes a focus lock switch (not shown), specification of the following flowchart can be designed.

First, in step S121, presence of an operation of the focus lock switch is detected. Then, if the focus lock switch is operated, the process moves to step S122, where careful focusing is carried out by the imager AF, and then photographing of step S124 is started.

On the other hand, if the focus lock switch is not operated, the process moves to step S123, where external light AF is carried out. In step S123, focusing is executed only based on a result of the external light AF. Then, the process moves to step S124 to start photographing.

FIG. 31 is a flowchart more specifically showing the aforementioned process.

Specifically, first, in step S131, determination is made as to an ON operation (half depressing) of the first stage of the two-stage release switch. If the ON operation is detected, in subsequent step S132, distances to distance measuring points are measured by "external light multidistance measuring".

Based on a result of the distance measuring, in step S133, determination is made as to whether a distance to a point corresponding to the screen center is a nearest object distance or not. If the screen center is determined not to be a nearest object distance, the process moves to step S134.

On the other hand, if the point corresponding to the screen center is determined to be a nearest object distance, the process moves to step S135 to operate the imager AF. Then, in subsequent step S136, displaying regarding the focus locking is executed.

In step S134, determination is made as to continuance of the ON state of the first release switch for a predetermined time before the release button is depressed to turn ON the second release switch. If the ON state of the first release switch is continued, the process moves to step S135, and to step S137 if not.

In step S137, determination is made as to an ON state of the second release switch. Here, during focus locking, the composition is changed before the second release switch is turned ON, and the process moves from S138 to S139.

The user continues an ON operation of the first release switch until a focus lock display is outputted in step S136.

After one execution of the imager AF, in step S139, determination is made as to the end of the imager AF. If the end is determined, the process moves again to step S137. Thus, the process waits for release button depressing determination of step S137, and moves to a photographing sequence of next step S140 by a release button operation of the user by a photographing timing.

By such a modified example, effects similar to those of the fifth and sixth embodiments can be expected.

The present invention can be similarly applied to a camera which has a multipoint distance measuring function even if it is other than the camera which uses the foregoing electronic imager.

(Seventh Embodiment)

Next, the seventh embodiment of the present invention will be described.

First, the seventh embodiment will be described briefly by referring to FIGS. 32A to 32D.

FIG. 32A shows a scene where a human as a main object is located on a screen center, and FIG. 32B shows an example of an image signal obtained by an external light system distance measuring device which monitors an area 140a of a screen 140 of FIG. 32A.

In FIG. 32A, if the camera is firmly held by a photographer, and no changes occur even if an image signal is repeatedly detected, there is no doubt that a main object is a human 142a in the screen 140. Thus, sufficient focusing control is considered necessary for the human 142a, and focusing is carried out by an imager AF which is not affected by a temperature, humidity or a posture change.

However, since image contrast is determined while a lens is moved, the imager AF has a drawback that it takes time to start/stop the lens, and thus a time lag is made longer. Focusing of such a type is not always necessary in a scene where image changes occur.

That is, as shown in FIG. 32C, a change in a monitoring position caused by blurring in hasty photographing (see arrow E in the drawing) causes an image change similar to that shown in FIG. 32D. However, in such a situation, the photographer may start photographing in a hurry, photographing which gives priority to a time lag is preferred and, in the imager AF, a disturbed change similarly occurs in a contrast value by an image change. Thus, it is a scene of difficult focusing.

Such a situation often occurs during trips or the like, photographing is higher in value as a record of memories than a target, and it should be carried out within a short time. Additionally, in such a scene, instantaneous expression of the object is more important than focusing. Even if there is an error in lens driving control (LD) as described above, the error can be ignored as long as expression and overall atmosphere can be reproduced.

In such a situation, if time more than necessary is taken to focus on the human, needless to say, a photo opportunity is lost. It is all right in a landscape where a background is stationary. However, for example, as shown in FIG. 32C, in a scene where a ship 142b sails across in the background or the like, if excessive time is taken for focusing, the ship 142b may go out of the screen. Thus, in a situation similar to that shown in FIG. 32C, according to the present invention, focusing which gives priority to time is carried out.

Next, description will be made of a distance measuring principle of the external light system distance measuring device which plays an important role in the embodiment by referring to FIGS. 33A and 33B.

In FIG. 33A, a pair of light receiving lenses 144a, 144b are arranged in positions separated from the object 142 by a distance L. A distance between main points thereof is equal to a base line length B, and the light receiving lenses 144a, 144b guide images of the object 142 to sensor arrays 146a, 146b. A light thus obtained from the object 142 forms an image having a relative position difference x where an optical axis is an origin based on a triangular distance measuring principle. A distance L is obtained from x.

In FIG. 33A, an image on the optical axis of the light receiving lens 144a is made incident on the x position of the sensor array 146b. However, in the case of distance measuring a position shifted from the optical axis of the light receiving lens 144a by θ, if a focal distance of the light receiving lens is f, by using an image signal of a position ftan θ, a distance of a point shifted from the optical axis can be obtained by a similar idea (L=Bf/x).

Thus, since several distance measuring points can be set in the arraying direction of the sensor arrays, as shown in FIG. 33B, distance data of several points 148 in the screen can be obtained. A distance measuring device having such a function is called a multipoint distance measuring device. Since it is external light distance measuring, even if zooming changes the screen to T (tele: telescopic)/W (wide: wide angle), the distance measuring sensor monitors the same place.

Next, the seventh embodiment of the present invention will be described.

FIG. 34 is a block diagram showing an internal constitution of the camera of the seventh embodiment of the present invention.

In FIG. 34, the digital camera is constituted by including a microprocessor (CPU) 152, a pair of light receiving lenses 154a, 154b, a pair of sensor arrays 156a, 156b, a distance measuring section 158, a taking lens 160, an imager 162, an analog/digital (A/D) converter 164, an image processing section 166, a lens driving section 168, a zoom detection section 170, a recording medium 172, and a light source 174.

The CPU 152 works as arithmetic operation control means to control an overall sequence of the camera, and includes selection means and control means. A switch 152a which starts the photographing sequence is connected to the CPU 152. The CPU 152 determines an ON operation of the switch 152a by a photographer to start a series of photographing operations.

The pair of light receiving lenses 154a, 154b receive an image from an object 150, and form images on the pair of sensor arrays 156a, 156b. In the pair of sensor arrays 156a, 156b, formed images (object images) from the object 150 are converted into electric signals (referred to as "image signals" hereinafter) to be outputted to the distance measuring section 158.

The distance measuring section 158 is distance measuring means of a passive system constituted by including the A/D conversion section 158a and a distance measuring calculation section 158b. The A/D conversion section 158a in the distance measuring section 158 converts the image signals entered from the sensor arrays 156a, 156b into digital signals, and outputs them to the distance measuring calculation section 158b. The distance measuring calculation section 158b calculates a distance, i.e., object distance, from the camera to the object 150 based on the digital signals by the aforementioned triangular distance measuring principle. The distance measuring section 158 is equivalent to a distance measuring device.

The CPU 152 carries out focusing control of the taking lens 160 based on the calculated object distance. That is, the CPU 152 focuses the taking lens 160 by controlling the lens driving (LD) section 168 based on the object distance calculated by the distance measuring calculation section 158b.

The zoom detection section 170 is zoom position detection means which detects a zoom position of the taking lens 160. The zoom detection section 170 detects how much the taking lens 160 is moved on the optical axis by the lens driving section 168, i.e., the zoom position. Thus, the CPU 152 carries out focusing in accordance with the zoom position obtained by the zoom detection section 170 and the image signal from the distance measuring section 158.

After the end of the focusing of the taking lens 160, an exposure operation is carried out. The imager 162 is constituted of a CCD or the like. The image of the object 150 formed through the taking lens 160 is converted into an electric image signal, and outputted to the A/D converter 164. The imager 162 is equivalent to an "imager".

The A/D converter 164 converts the image signal from the imager 162 into a digital signal, and then outputs the digital signal to the image processing section 166. At the image processing section 166, color and gradation of the image are corrected based on the entered digital signal, then compression is executed for an image signal. Then, the compressed image is recorded on the recording medium 172, and thus the exposure operation is completed.

The light source 174 is constituted of a flash device or the like. From the light source 174, an auxiliary light or the like for exposure or distance measuring is radiated to the object 150 in accordance with a scene to be photographed.

A positional relation between the light receiving lenses 154a, 154b and the sensor arrays 156a, 156b, and the taking lens 160 and the imager 162 is similar to that shown in FIG. 35A.

That is, the same image of the object 150 can be detected by the sensor arrays 156a, 156b and the imager 162. When outputs of the sensor arrays 156a, 156b are used for object distance calculation, by using an image of an object formed in a different position, e.g., a position indicated by a broken line in the drawing, in place of the image of the object 150 formed in the position indicated by a solid line in the drawing, as shown in FIG. 33B, it is possible to detect distances of objects other than the object 142 in the photographic screen.

FIG. 35B is an appearance perspective view of the camera of the seventh embodiment.

In FIG. 35B, a release button 152b is disposed on the upper surface of the camera 180 to operate the switch 152a. The taking lens 160 is disposed nearly on the center of the screen of the camera 180. The light receiving lenses 154a, 154b are arranged above the taking lens 160 in the positional relation shown in FIG. 35A. Further, in FIG. 35B, a light emission window 174a for the light source 174 is disposed on the right side of the light receiving lenses 154a, 154b.

In the aforementioned external light system AF, by using the pair of light receiving lenses 154a, 154b and the pair of sensor arrays 156a, 156b similarly to both eyes of the human, an object distance is detected based on the triangular distance measuring principle, and the taking lens 160 is focused based on the object distance.

On the other hand, the AF which uses the imager output through the taking lens 160 is called an imager AF. This imager AF detects contrast of an object image formed on the imager 162 while changing the position of the taking lens 160, and determines a position of the taking lens 160 where contrast becomes highest to set it as a focusing position.

That is, the imager AF carries out focus control which is different from the system which decides a focusing position based on the object distance as in the case of the external light AF.

In such an imager AF, even if an error is generated in the position control of the taking lens 160, it is possible to detect a focusing position by considering an error as long as the error is small. As shown in FIG. 32A, if the human 142a as the main object is located on the center of the photographic screen 140, there is no problem. However, if the human 142a is located on other than the center of the photographic screen 140, it is difficult to quickly focus the taking lens 160 on the human 142a.

That is, in order to specify the main object, after contrast determination is carried out for each of the human 142a and the building as a background object, it is necessary to determine which of the objects is suitable as a main object, e.g., which object is located more on the front side. In such a case, it is necessary to carry out the process of contrast determination after an image in a focusing position corresponding to each object is temporarily fetched, which makes time relatively longer.

On the other hand, in the external light AF, image signals from the sensor arrays 156a, 156b shown in FIG. 35A are detected, and shifting of the image signals of the objects based on the parallax of the light receiving lenses 154a, 154b is detected to decide object distances. That is, since the time of driving the taking lens 160 is only after the focusing position is decided, time necessary for focusing is made shorter compared with that of the imager AF.

For a distance to an object other than the main object, it is only necessary to switch the image signal of the object used in object distance calculation. Thus, irrespective of the position of the main object, it is possible to detect an object distance distribution in a wide area such as an area 148 shown in FIG. 33B.

Figure 36:
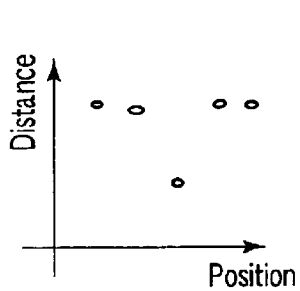
FIG. 36 is a view showing an example of a distance distribution.

FIG. 36 is a view showing an example of the obtained distance distribution.

After the distance distribution is obtained, where the main object is located can be detected at a high speed.

Figure 37:
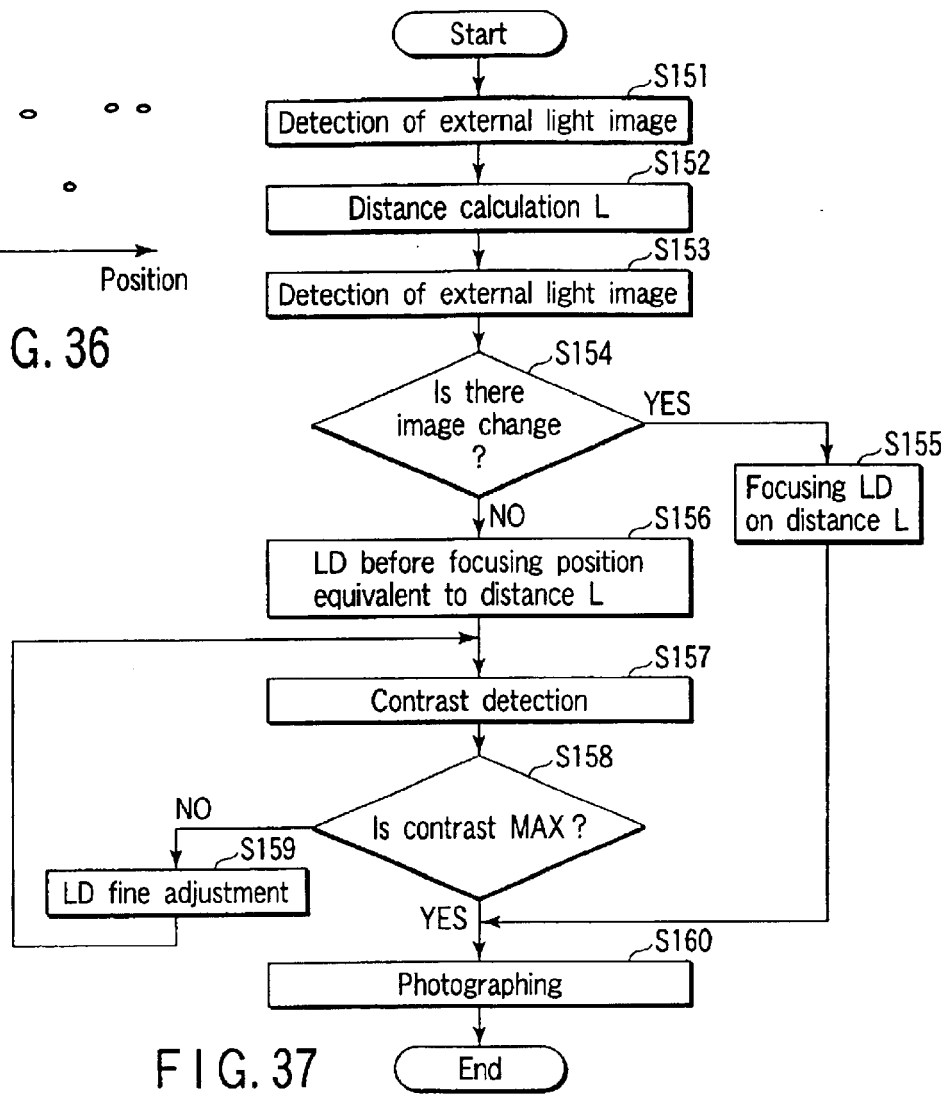
FIG. 37 is a flowchart explaining a distance measuring operation of the camera of the seventh embodiment of the present invention.

Next, description will be made of a distance measuring operation of the camera of the seventh embodiment by referring to a flowchart of FIG. 37.

In step S151, an image signal is detected by the external light distance measuring device to range a plurality of points in the screen. When distances are obtained as a result, a distribution similar to that shown in FIG. 36 is obtained for a scene shown in FIG. 33B. Thus, in step S152, a nearest distance is selected as a main object distance.

In subsequent step S153, image detection is carried out again to detect an image which is a feature of the embodiment.

Then, in step S154, determination is made as to whether there is any change in the image signal obtained by a plurality of image detections. If there is an image signal, the process moves to step S155. Then, for example, in a scene similar to that shown in FIG. 32C, the operation is regarded as snapshot photographing, and focusing which gives priority to a speed is carried out. In such a scene, instantaneous expression or the like of the human becomes a problem more than just focusing on the human.

As described above, the scene determination is carried out based on presence of blurring caused by camera holding during photographing. That is, in a scene to be accurately focused, the user firmly holds the camera, and takes time to photograph the object. On the other hand, in snapshot photographing during trips or the like, blurring easily occurs because the release button is quickly operated. In this case, the blurring is detected by an image change. After the processing of step S155, the process directly moves to step S160 to photograph the object, and the operation is finished.

However, in a scene similar to those shown in FIGS. 32A and 32B, there is no change in the image of the main object 142a and, different from the scene of FIG. 31C, an interest of the photographer may be concentrated on only human representation. In this case, since just focusing on the human is one of the conditions to produce good photographs, the sequence of the imager AF which can realize a just focused state including a lens error is continued. However, if contrast detection is executed for all the lens driving areas, it leads to a great time loss. Thus, in step S156, the lens is driven before the lens position equivalent to the main object distance L, and contrast detection is started in step S157.

Then, in step S158, a lens position of maximum contrast is detected. Here, if contrast is not maximum, the process moves to step S159 to finely adjust the lens position, and moves to step S157. That is, the process of steps S157 to S159 is repeated until the position of maximum contrast is found, and a position of just focusing is searched.

Thus, if the contrast is maximum in step S158, the process moves to step S160, where focus is set on its position to execute photographing.

As described above, according to the embodiment, as shown in FIG. 31A, in the scene where the interest of the photographer is concentrated only on one object (human), focus is set on the human even if it takes time. As shown in FIG. 32C, in the scene of snapshot photographing during trips or the like, since focusing which gives priority to a speed is carried out, a photo opportunity is not lost.

Figure 38:
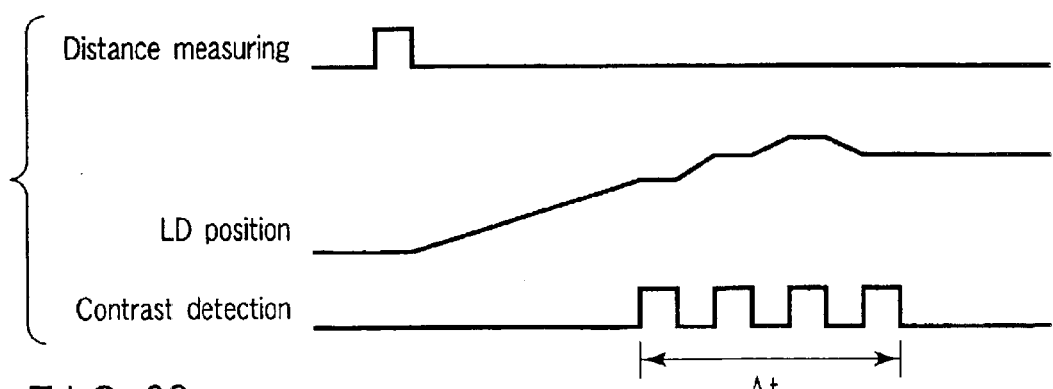
FIG. 38 is a timing chart explaining an operation in the seventh embodiment.

FIG. 38 is a timing chart explaining an operation of the seventh embodiment.

First, distance measuring by the external light system distance measuring device is carried out and, based on the result thereof, lens control (LD) is carried out. In the scene shown in FIG. 32A, contrast detection is further executed to obtain a lens position of peak contrast. Thus, the lens control and the contrast detection are repeated (Δt period).

However, in the scene shown in FIG. 32C, the above contrast detection is not executed. Thus, photographing can be started within a time shorter by Δt. Additionally, if even in the composition shown in FIG. 32B, focus is set on the human, photographing may be carried out by using a well-known focus locking technology or the like.

Next, an eighth embodiment of the present invention will be described.

Figure 39:
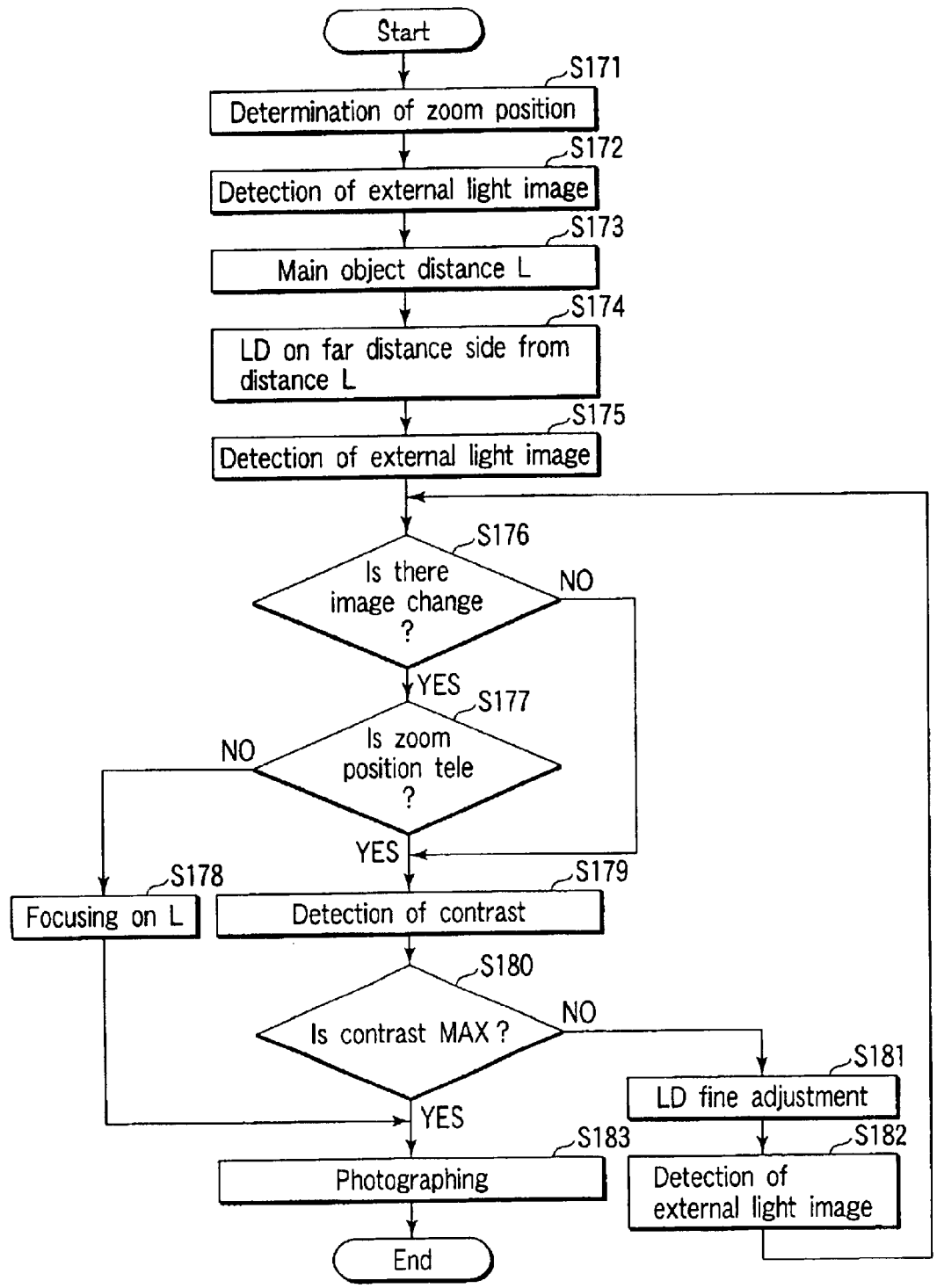
FIG. 39 is a flowchart explaining a distance measuring operation of a camera according to an eighth embodiment of the present invention.

FIG. 39 is a flowchart explaining a distance measuring operation of a camera of the eighth embodiment of the present invention.

According to the eight embodiment, as described above, during the imager AF of contrast detection which takes time, image detection is repeated by using the sensor array of repeated external light distance measuring, and generation of blurring or an image data change caused by a movement of an object is monitored.

By switching determination based on a zoom position, more specific situation determination is carried out. That is, consideration is given to the fact that the number of snapshot photographing times is larger at a wide time than at a tele time, a time lag should be made shorter, and a large focal depth prevents a photo from becoming out of focus because of a slight lens stop error.

On the assumption of such points, first, a zoom position is determined in step S171. Then, an image for distance measuring is detected in step S172, and a main object distance L is obtained in step S173. Then, in step S174, lens driving is executed so as to focus on a side little far from the distance L. Additionally, since blurring may occur even at this stage, image detection is carried out again in step S175.

Then, in step S176, the image detection results of steps S171 and 5175 are compared with each other. In this case, if there is an image change, a zoom position is determined in subsequent step S177. That is, in steps S176 and S177, if there is an image change and the zoom position is wide, the process moves to step S178, where focus control is carried out to focus on the distance L obtained in step S173. This means that photographing is started without any time for the photographer to firmly hold the camera, and focusing which gives importance to a timing is carried out. Then, the process moves to step S183 to execute photographing.

On the other hand, if the zoom lens is tele even when there is an image change, a lens position error often affects focusing conspicuously. Thus, the process moves to step S179 to start contrast detection. Even when no image change is detected on the wide in step S178, the process also moves to step S179.

Upon detection of a lens position of maximum contrast in step S180, the process moves to step S183 to execute photographing.

Thus, since image detection is carried out in step S182 for each fine adjustment of the taking lens position of step S181, and the process moves to step S176, if blurring or object shaking occurs during the execution of the imager AF, the process moves to step S178 to start high-speed focusing by the external light AF. On the other hand, if the zoom position is tele, the imager AF which deals with a lens position error is continued as described above.

As described above, according to the eighth embodiment, a photographing scene is determined more accurately in accordance with blurring, object shaking and a zoom position, and a focal depth by the zoom position is added to implement an optimal focusing system. Thus, it is possible to provide an AF camera which can reduce stress on the photographer by preventing a loss of a photo opportunity and an out-of focus state.

The imager AF carries out focusing by using a change in contrast (contrast is higher as the lens is focused more) with respect to the focusing amount LD of the taking lens. However, it is on the assumption that an area is monitored through the taking lens by the imager. If the area is changed due to blurring or the like, correct focus control cannot be executed.

For example, as shown in FIG. 40, it is assumed that no blurring occurs when contrast is determined at focusing positions $LD_1$, $LD_2$ (point e in the drawing). Even if contrast is higher at $LD_3$, when a monitoring position is changed by blurring to cause a change in an incident image (point f in the drawing), it is erroneously determined that contrast is stopped, and the lens position of $LD_2$ is a best focusing position.

In order to deal with such a situation, determination is made by the external light distance measuring device as to whether an object position monitored by the imager is changed or not to determine contrast. When there is an optional change (blurring), contrast determination is carried out all over again. The process is shown in a flowchart of FIG. 41.

Figure 41:
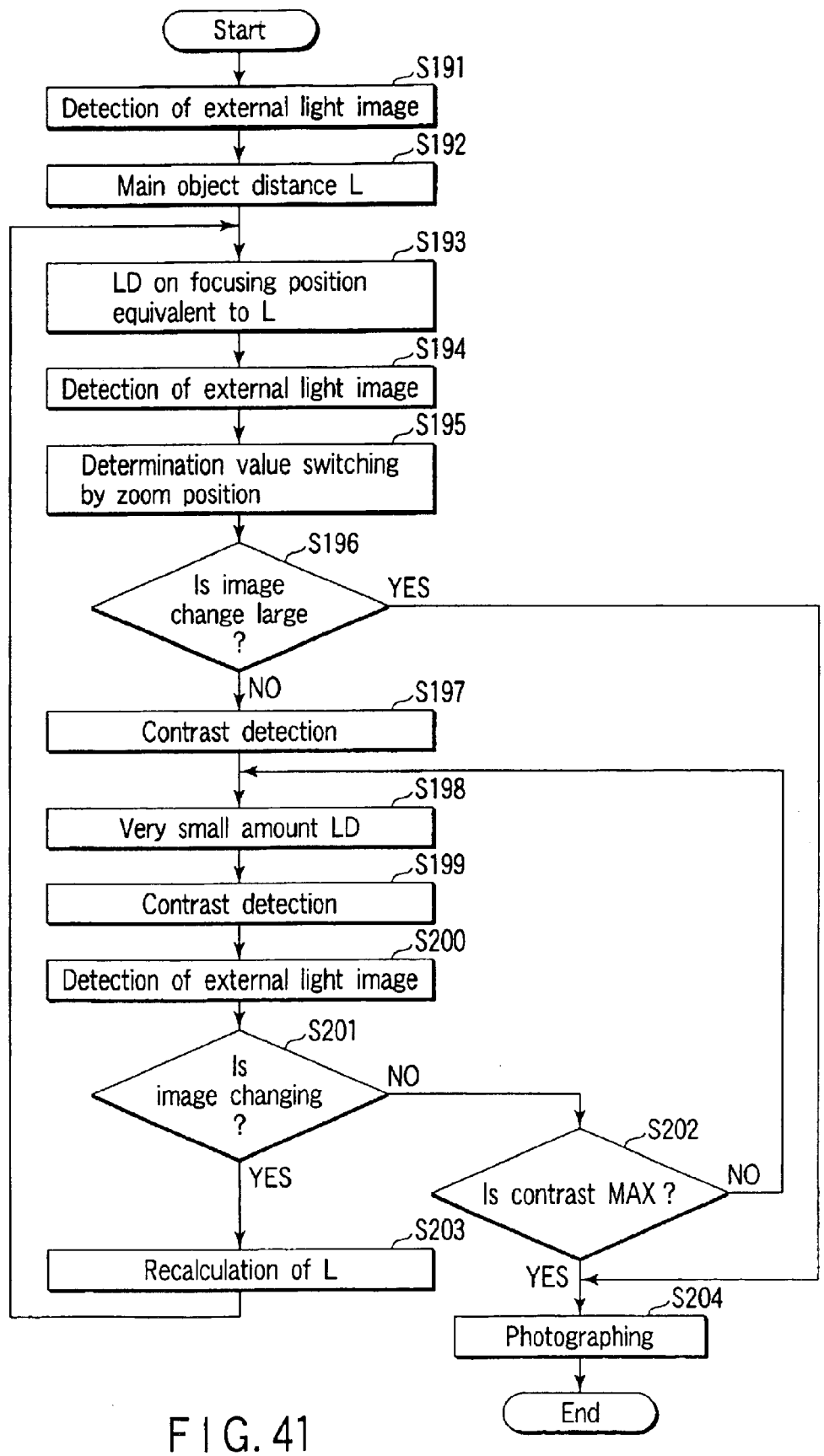
FIG. 41 is a flowchart explaining a distance measuring operation of a camera according to a modified example of the eighth embodiment of the present invention.

FIG. 41 is a flowchart explaining a distance measuring operation of a camera according to a modified example of the eighth embodiment of the present invention.

First, in step S191, image detection is carried out by the external light distance measuring device. Based on a result thereof, a main object distance L is obtained in step S192. Then, in step S93, a focus lens is controlled to a focusing position thereof. Further, in step S194, image detection is carried out again by the external light distance measuring sensor in step S194.

Then, in step S195, a level of an image change is switched based on the zoom position of the taking lens. Specifically, a determination level at tele time is set small since an influence is larger at the tele time even in the case of the same amount of blurring.

Then, in step S196, the image changes detected in step S191 and step S194 are compared with each other. If a result shows a large image change, considering that the scene is improper for the imager AF, the process moves to step S204 to immediately start photographing.

However, if an image signal is not greatly changed, in steps S197 to S199, contrast detection is executed while lens driving (LD) is carried out by a small amount. Then, in step S200, image detection is carried out by the external light sensor.

In step S201, the image changes are compared again. If a result shows that an image change is equal to/lower than a predetermined value (about a middle level), the process moves to step S202 to detect contrast. Then, the process of steps S198 to S202 is repeated until contrast becomes maximum. When the contrast becomes maximum, the les driving is finished, and the process moves to step S104 to start photographing.

On the other hand, in step S201, if the image change is detected by the external light sensor, it is determined that blurring has caused a change in monitoring position. Thus, the process moves to step S203 to calculate a distance L again. Then, in step S193, the process is started all over again from focusing position control.

Thus, since the imager AF can be carried out from a position where blurring has stopped, it is possible to execute highly accurate focusing. Moreover, even if the blurring is not stopped, in step S196, the process is branched to carry out focusing which gives priority to a speed.

Therefore, according to the embodiment, a scene in which the imager AF is unskilled is detected by the external light sensor to enable highly accurate AF.

In the case of a camera equipped with a zoom, as shown in FIGS. 42A and 42B, a near-distance object is often photographed on the wide, and a far-distance object on the tele. In this case, if the same blurring amount $\theta_b$ occurs, an image is detected on a face of the object at the wide time shown in FIG. 42A, but an image detection area may be shifted from the face at the tele time shown in FIG. 42B.

In such a state, correct focusing is difficult in the imager AF which repeats detection many times. This is because the blurring amount θb of an area 182 at the wide time shown in FIG. 43A is greatly changed in the screen at the tele time as shown in FIG. 43B.

Thus, external light distance measuring can be preferentially carried out on the telescopic side or a far-distance side.

A ninth embodiment of the present invention is directed to a camera distance measuring which gives priority to external light distance measuring on a telescopic side or a far-distance side.

Figure 44:
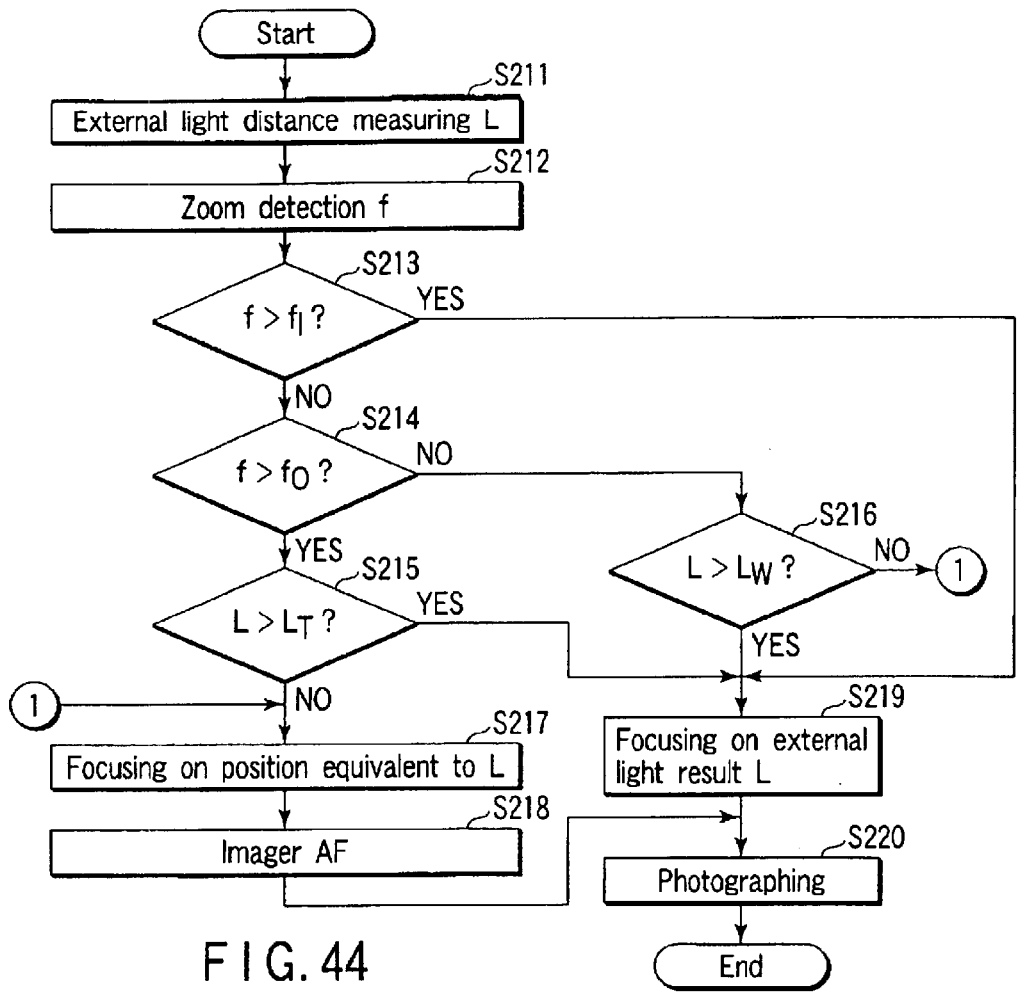
FIG. 44 is a flowchart explaining a distance measuring operation of a camera according to a ninth embodiment of the present invention.

FIG. 44 is a flowchart explaining a distance measuring operation of the camera of the ninth embodiment of the present invention.

First, in step S211, a distance l is obtained by external light distance measuring. In subsequent step S212, a focal distance f is obtained by zoom position detection. In accordance with a result thereof, focusing by external light distance measuring or focusing by an imager AF is selected.

That is, in step S213, the focal distance f obtained in step S212 is compared with a predetermined focal distance $f_1$. If the focal distance f is determined to be larger than the focal distance $f_1$, the external light AF is selected to proceed to step S219. On the other hand, if f is equal to/smaller than $f_1$, the process moves to step S214.

In step S214, the focal distance f is compared with $f_0$ which is smaller than the focal distance $f_1$. If a result shows that f is larger than $f_0$, the process moves to step S215. If f is equal to/smaller than $f_0$, the process moves to step S216.

In step S215, the distance L obtained in step S211 is compared with a predetermined distance $L_T$. If L is nearer than $L_T$, the process moves to step S217. If it is farther, the process moves to step S219.

On the other hand, in step S216, the distance L obtained in step S211 is compared with a predetermined distance $L_W$. If L is nearer than $L_W$, the process moves to step S217. If it is farther, the process moves to step S219.

In the case of a near distance, the imager AF is selected. That is, in steps S217 and S218, the taking lens is driven to a position equivalent to the distance L, and focusing is executed by the imager AF.

In the case of a far distance, the process moves to step S219, and focusing is executed on the distance by external light distance measuring.

Then, photographing is executed in step S220.

Thus, according to the ninth embodiment, it is possible to carry out accurate focusing which predicts an influence of blurring, and reduces the influence of blurring.

The seventh to ninth embodiments have been described by way of example of the digital camera. However, the invention is not limited to this, and various changes can be made without departing from the teachings. For example, needless to say, the invention can be applied to a portable telephone, a PDA etc., having imaging sections other than the digital camera.

Next, the tenth embodiment will be described briefly with reference to FIGS. 45A to 45C.

Figure 45A:
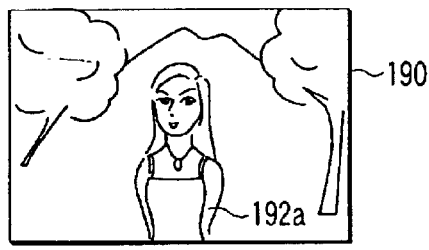
FIG. 45A is a view showing an example of a scene where a human as a main object is present in a landscape.
Figure 45B:
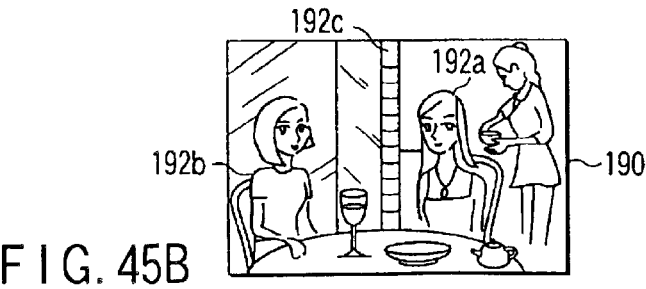
FIG. 45B is a view showing an example of a scene where the human as the main object is present in a situation more disorderly than the scent of FIG. 45A.
Figure 45C:
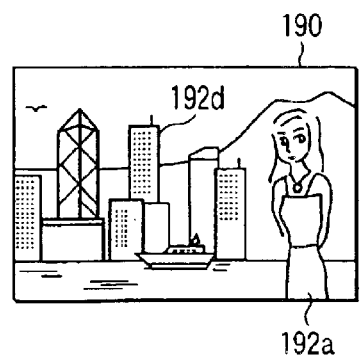
FIG. 45C is a view showing an example of a scene where the main object is present on an end of a screen.

FIG. 45A shows an example of a scene where a human as a main object is located in a landscape, FIG. 45B shows an example of a scene where the human as the main object is located in a situation rougher than that of the scene of FIG. 45A, and FIG. 45C shows an example of a scene where the main object is located on an end of the screen.

In the case of the scene shown in FIG. 45A, since a distance of an object is completely separated from the landscape on a screen 190, there is no doubt that a main object of a photographer is a human 192a. Thus, sufficient focusing control is considered necessary for the human 192a, and focusing is carried out by an imager AF which is not affected by a temperature, humidity or a posture change.

However, since image contrast is determined while a lens is moved, the imager AF has a drawback that it takes time to start/stop the lens, and thus a time lag is made longer. Focusing of such a type is not always necessary in a scene similar to that shown in FIG. 45B.

That is, in such a scene, the photographer is surely interested not only in one human but also other humans and a background. Thus, it may be a scene where the photographer wishes to focus not only on the human 192a but also on a human 192b, a background 192c etc. Such a situation often occurs at parties, banquets or the like, photographing is higher in value as a record of memories than a target, and it should be carried out within a short time. Additionally, in such a scene, focusing on a near background is not a problem, and even if there is an error in lens driving control (LD) as described above, the error can often be ignored as long as it is located a little far side from the human.

In such a situation, if time more than necessary is taken to focus on the human, a photo opportunity is often lost. It is all right in a landscape or the like where a background is stationary. However, for example, as shown in FIG. 45B, in a scene where there are a plurality of humans, if excessive time is taken for focusing, gestures, expressions etc., of all the humans may go out of the intension of the photographer.

Thus, in a situation similar to that shown in FIG. 45B, according to the embodiment, focusing which gives priority to time is carried out.

Next, description will be made of a distance measuring principle of the external light system distance measuring device which plays an important role in the present invention by referring to FIGS. 46A and 46B.

In FIG. 46A, a pair of light receiving lenses 194a, 194b are arranged in positions separated from the object 192 by a distance L. A distance between main points thereof is equal to a base line length B, and the light receiving lenses 194a, 194b guide images of the object 192 to sensor arrays 196a, 196b. A light thus obtained from the object 192 forms an image having a relative position difference x where an optical axis is an origin based on a triangular distance measuring principle. A distance L is obtained from x.

In FIG. 46A, an image on the optical axis of the light receiving lens 194a is made incident on the x position of the sensor array 196b. However, in the case of distance measuring a position shifted from the optical axis of the light receiving lens 194a by θ, if a focal distance of the light receiving lens is f, by using an image signal of a position ftan θ, a distance of a point shifted from the optical axis can be obtained by a similar idea (L=Bf/x).

Thus, since several distance measuring points can be set in the arraying direction of the sensor arrays, as shown in FIG. 46B, distance data of several points 198 in the screen can be obtained. A distance measuring device having such a function is called a multipoint distance measuring device.

As the multipoint distance measuring device, a well-known active system multidistance measuring device may be used. For example, as shown in FIG. 47, a plurality of LED's 194d project lights through a projection lens 194c, and reflected signal lights thereof are received through a light receiving lens 194d by an optical position detector 202 to investigate incident positions thereof. Similar multidistance measuring can be carried out in this way.

Next, the tenth embodiment of the present invention will be described.

FIG. 48 is a block diagram showing an internal constitution of the camera of the tenth embodiment of the present invention.

In FIG. 48, the digital camera of the tenth embodiment of the invention is constituted by including a microprocessor (CPU) 212, a pair of light receiving lenses 214a, 214b, a pair of sensor arrays 216a, 216b, a distance measuring section 218, a taking lens 220, an imager 222, an analog/digital (A/D) converter 224, an image processing section 226, a lens driving (LD) section 228, a zoom detection section 230, a recording medium 232, and a light source 234.

The CPU 212 works as arithmetic operation control means to control an overall sequence of the camera, and includes selection means and control means. A switch 212a which starts the photographing sequence is connected to the CPU 212. The CPU 212 determines an ON operation of the switch 212a by a photographer to start a series of photographing operations.

The pair of light receiving lenses 214a, 214b receive an image from an object 210, and form images on the pair of sensor arrays 216a, 216b. In the pair of sensor arrays 216a, 216b, formed images from the object 210 are converted into electric signals (referred to as "image signals" hereinafter) to be outputted to the distance measuring section 218.

The distance measuring section 218 is distance measuring means of a passive system constituted by including an A/D conversion section 218a and a distance measuring calculation section 218b. The A/D conversion section 218a in the distance measuring section 218 converts the image signals entered from the sensor arrays 216a, 216b into digital signals, and outputs them to the distance measuring calculation section 218b. The distance measuring calculation section 218b calculates a distance, i.e., object distance, from the camera to the object 210 based on the digital signals by the aforementioned triangular distance measuring principle. The distance measuring section 218 is equivalent to a "distance measuring device".

The CPU 212 carries out focusing control of the taking lens 220 based on the calculated object distance. That is, the CPU 212 focuses the taking lens 220 by controlling the lens driving section 228 based on the object distance calculated by the distance measuring calculation section 218b.

The zoom detection section 230 is zoom position detection means which detects a zoom position of the taking lens 220. The zoom detection section 230 detects how much the taking lens 220 is moved on the optical axis by the lens driving section 228, i.e., the zoom position. Thus, the CPU 212 carries out focusing in accordance with the zoom position obtained by the zoom detection section 230 and the image signal from the distance measuring section 218.

After the end of the focusing of the taking lens 220, an exposure operation is carried out. The imager 222 is constituted of a CCD or the like. The image of the object 210 formed through the taking lens 220 is converted into an electric image signal, and outputted to the A/D converter 224. The imager 222 is equivalent to an "imager".

The A/D converter 224 converts the image signal from the imager 222 into a digital signal, and then outputs the digital signal to the image processing section 226. At the image processing section 226, color and gradation of the image are corrected based on the entered digital signal, then compression is executed for an image signal. Then, the compressed image is recorded on the recording medium 232, and thus the exposure operation is completed.

The light source 234 is constituted of a flash device or the like. From the light source 234, an auxiliary light or the like for exposure or distance measuring is radiated to the object 210 in accordance with a scene to be photographed.

A positional relation between the light receiving lenses 214a, 214b and the sensor arrays 216a, 216b, and the taking lens 220 and the imager 222 is similar to that shown in FIG. 49A.

That is, the same image of the object 210 can be detected by the sensor arrays 216a, 216b and the imager 222. When outputs of the sensor arrays 216a, 216b are used for object distance calculation, by using an image of an object formed in a different position, e.g., a position indicated by a broken line in the drawing, in place of the image of the object 210 formed in the position indicated by a solid line in the drawing, as shown in FIG. 46B, it is possible to detect distances of objects other than the object 192 in the photographic screen.

FIG. 49B is an appearance perspective view of the camera of the tenth embodiment.

In FIG. 49B, a release button 212b is disposed on the upper surface of the camera 240 to operate the switch 212a. The taking lens 220 is disposed nearly on the center of the screen of the camera 240. The light receiving lenses 214a, 214b are arranged above the taking lens 220 in the positional relation shown in FIG. 49A. Further, in FIG. 49B, a light emission window 234a for the light source 234 is disposed on the right side of the light receiving lenses 214a, 214b.

In the aforementioned external light system AF, by using the pair of light receiving lenses 214a, 214b and the pair of sensor arrays 216a, 216b similarly to both eyes of the human, an object distance is detected based on the triangular distance measuring principle, and the taking lens 220 is focused based on the object distance.

On the other hand, the AF which uses the imager output through the taking lens 220 is called an imager AF. This imager AF detects contrast of an object image formed on the imager 222 while changing the position of the taking lens 220 by the lens driving section, and determines a position of the taking lens 220 where contrast becomes highest to set it as a focusing position.

That is, the imager AF carries out focus control based on a principle different from the system which decides a focusing position based on the object distance as in the case of the external light AF.

In such an imager AF, even if an error is generated in the position control of the taking lens 220, it is possible to detect a focusing position by considering an error as long as the error is small. However, as shown in FIG. 45C, if the human 192a as a main object is located on other than the center of the photographic screen 190, it is difficult to quickly focus the taking lens 220 on the human 192a. In this case, the center of the photographic screen is a building 192d which becomes a background object.

That is, in order to specify the main object, after contrast determination is carried out for each of the human 192a and the building 192d, it is necessary to determine which of the objects is suitable as a main object, e.g., which object is located more on the front side. In such a case, it is necessary to carry out the process of contrast determination after an image in a focusing position corresponding to each object is temporarily fetched, which makes time relatively longer.

On the other hand, in the external light AF, image signals from the sensor arrays 216a, 216b shown in FIG. 49A are detected, and shifting of the image signals of the objects based on the parallax of the light receiving lenses 214a, 214b is detected to decide object distances. That is, since the time of driving the taking lens 220 is only after the focusing position is decided, time necessary for focusing is made shorter compared with that of the imager AF.

For a distance to an object other than the main object, it is only necessary to switch the image signal of the object used in object distance calculation. Thus, irrespective of the position of the main object, it is possible to detect an object distance distribution in a wide area such as an area 198 shown in FIG. 46B.

FIG. 50 is a view showing an example of the obtained distance distribution.

After the distance distribution is obtained, where the main object (g in the drawing) is located can be detected at a high speed.

Next, description will be made of an operation of the tenth embodiment by referring to a flowchart of FIG. 51.

First, in step S231, a plurality of points in the screen are ranged by the external light distance measuring device. For example, a distribution similar to that shown in FIG. 50 is obtained for a scene shown in FIG. 45B. Thus, in step S232, a nearest distance is selected as a main object distance L.

In subsequent step S233, determination is made as to whether a difference between a point (main object position) indicating a nearest distance and the other point is large or not. Here, if the difference is small, the process moves to step S234, where for example in a scene similar to that shown in FIG. 45B, the operation is regarded as snapshot photographing, and focusing which gives priority to a speed is carried out. In such a scene, coming-out of a photograph including the background becomes a problem more than just focusing on the human.

Additionally, in the scene of FIG. 45B, there are objects before the human, and these objects are also important to the photographer depending on situations. Thus, considering that only human focusing is not always important, focusing which gives priority to a timing rather than a slight error is carried out. Then, the process moves to step S239 to finish the photographing.

On the other hand, if the difference is large in step S233, the process moves to step S235. In the scene shown in FIG. 45A, a distance of the main object 192a is greatly different from the background. That is, different from the case of the scene shown in FIG. 45B, an interest of the photographer is not in the background but concentrated on only the human. In such a case, since just focusing on the human is one of the conditions to produce good photographs, the sequence of the imager AF which can realize a just focused state including a lens error is continued.

However, if contrast detection is executed for all the lens driving areas, it leads to a great time loss. Thus, in step S235, the lens is driven (LD) before the lens position equivalent to the main object distance L, and contrast detection is started in step S236.

Then, in step S237, a lens position of maximum contrast is detected. Here, if contrast is not maximum, the process moves to step S238 to finely adjust the lens position, and a position of just focusing is searched.

The process of steps S236 to S238 is repeated until the position of the maximum contrast is found. After the position of the maximum contrast is reached, focus is set on this position to execute photographing in step S239.

As described above, according to the tenth embodiment, as shown in FIG. 45A, in the scene where the interest of the photographer is concentrated only on one object (human), focus is set on the human even if it takes time. As shown in FIG. 45B, in the scene of snapshot photographing at parties or banquets, since focusing which gives priority to a speed is carried out, a photo opportunity is not lost.

FIG. 52 is a timing chart explaining a distance measuring operation of the camera of the tenth embodiment.

First, distance measuring by the external light system distance measuring device is carried out and, based on the result thereof, lens control (LD) is carried out. In the scene shown in FIG. 45A, contrast detection is further executed to obtain a lens position of peak contrast. Thus, the lens control and the contrast detection are repeated (Δt period).

However, in the scene shown in FIG. 45B, the above contrast detection is not executed. Thus, photographing can be started within a time shorter by Δt. Additionally, if even in the composition shown in FIG. 45B, focus is set on the human, photographing may be carried out by using a well-known focus locking technology or the like.

Next, an eleventh embodiment of the present invention will be described.

According to the eleventh embodiment, zoom position determination of a taking lens is added to the flowchart of FIG. 51. The embodiment is effective for a camera equipped with a long focal distance zoom lens.

That is, in the zoom lens of long focus, a slight error of lens driving during focusing results in a large error to adversely affect photo coming-out. In such a photographing scene, priority is given to the imager AF. In a scene similar to that shown in FIG. 45B, since there is a wish to enter many such as a background, and a surrounding atmosphere in the photographic screen, consideration is given to the fact that photographing is often carried out on the wide angle side of the zoom lens. Thus, by considering the zoom position of the lens and the object position, a photographing scene which gives priority to a photo opportunity such as snapshot photographing is determined to execute focusing.

Now, description will be made of a distance measuring operation of a camera according to a twelfth embodiment of the present invention by referring to a flowchart of FIG. 53.

First, in step S241, a zoom position is determined by using a zoom detection section 230 as shown in FIG. 48. Subsequently, in step S242, multipoint distance measuring is carried out by external light distance measuring. Thus, a distance distribution is obtained in subsequent step S243, and a main object distance L is determined in step S244.

However, different from the case of the twelfth embodiment, it is not always necessary to regard an object of a nearest distance as a main object. A selection method which has predetermined distance priority or ignores an object too near as a rough object may be implemented, to which the present invention can be applied.

Then, variance in inverse numbers of the distances of the points is obtained. Since this variance can be determined based on standard deviation σ or the like, the standard deviation σ is compared with another in step S245.

If small σ is determined, the process moves to step S246 to determine whether the zoom position is on the wide side or not. If a result thereof shows that the zoom position is on the wide side, the process moves to step S247, where a flag for implementing the imager AF is set to 0. On the other hand, if the standard deviation σ is determined not to be small in step S245 or the zoom position is determined not to be on the wide side in step S246, the process moves to step S248, where the flag for implementing the imager AF is set to 1.

Then, in step S249, the lens is shifted to the ∞ side (far distance side) from the main object distance L obtained in step S244 by an error conceivable in lens control to carry out focusing, and thus an important background is taken into consideration. Then, in step S250, determination is made as to a flag (imager flag) for implementing the imager AF.

If the flag is other than "1", the process moves to step S254, where high-speed photographing is started without operating the imager AF. However, if the flag for implementing the imager AF is "1", a sequence of the imager AF which can execute feedback control considering even a lens stop position error is started.

That is, in step S251, the image obtained through the taking lens is used to start contrast detection. Then, in step S252, if an image of maximum contrast is not determined, the process moves to step S253 to move the lens by a very small amount, and then the process moves to step S251. That is, until maximum image contrast is determined, contrast detection is repeated in steps S250 to S253.

At a point where the contrast of the obtained image becomes maximum, the lens driving (LD) is stopped, and the process moves to step S254 to execute photographing.

As described above, according to the twelfth embodiment, the zoom position of the taking lens is added and, if the zoom position is on the wide side, considering that a possibility of snapshot photographing is high, focusing which gives priority to a speed is carried out. However, if the main object is far from the background or in a telescopic state, photographing which gives important to focusing accuracy is carried out.

Thus, according to the twelfth embodiment, it is possible to provide an easy-to-use camera which can select an optimal focusing method by adding the zoom position and automatically determining a photographing situation.

Figure 53:
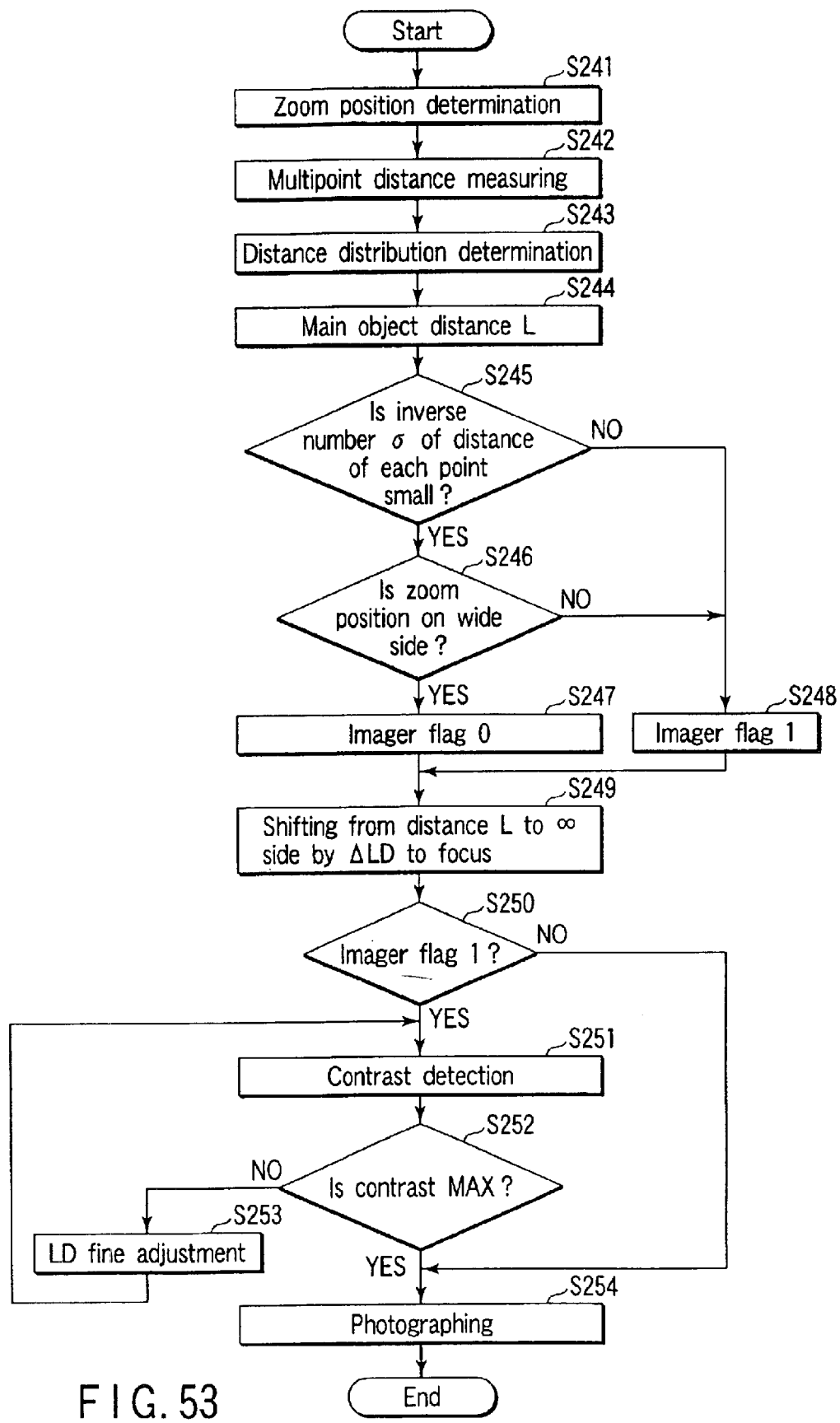
FIG. 53 is a flowchart explaining a distance measuring operation of a camera according to an eleventh embodiment of the present invention.

In the flowchart of FIG. 53, the variance in distances of the objects is determined by using the standard deviation. However, the determination step of obtaining a difference between the main object distance and the other distance in the flowchart of FIG. 15 may be changed to an algorithm similar to that shown in FIG. 54. Here, an example of adding zoom information to the determination method is described.

Figure 55:
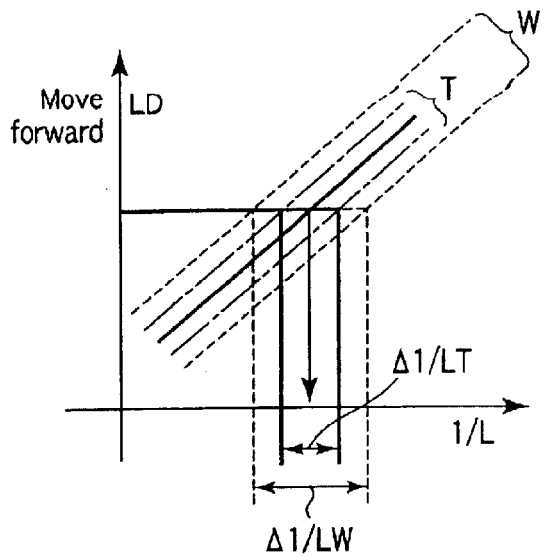
FIG. 55 is a view showing a relation between a focusing paying-out amount and an inverse number 1/L of a distance when focal distances of a zoom lens are tele and wide.

Generally, a focusing paying-out amount and an inverse number 1/L of a distance are set in a proportional relation similar to that shown in FIG. 55. However, between the telescopic (tele) case and the wide case of focal depths of the zoom lens, because of a foal depth relation, distance ranges to be covered are different at the time of the same paying-out amount as shown. That is, only a width of $\Delta 1/L_T$ can be covered for focusing at the tele (T) time, while a larger width of $\Delta 1/L_T$ can be covered at the wide (W) time.

Considering such a relation, step S263 in the flowchart of FIG. 54 must be switched.

In step S261, an average value of inverse numbers of distances of all points obtained in multidistance measuring is calculated as $1/L_{AV}$. Then, in step S262, an absolute value of a difference between the average $1/L_{AV}$ and an inverse number 1/L of a main object distance is obtained as $\Delta 1/L$. If a difference between both is large, it means that the main object is far from the background, and it can be understood that there is a scene similar to that shown in FIG. 45A.

On the other hand, if the difference is small, it can be understood that the main object and the other object are close to each other. That is, it can be understood that there is a scene similar to that shown in FIG. 45B. However, if the lens is on the wide side, since an object depth is large, focus can be set on both of the main object and the background even if they are not so close to each other.

Considering such a relation, branch determination is made in step S263. That is, determination is made as to whether the zoom position is tele (T) or not. If the zoom position is tele, the process moves to step S264, and to step S265 if not.

In step S264, a result $\Delta 1/L$ obtained in step S262 is compared with a predetermined value $\Delta 1/L_T$. If a result shows that the $\Delta 1/L$ is larger, the process moves to step S266, and to step S267 if not.

Similarly, in step S265, the result $\Delta 1/L$ obtained in step S262 is compared with a predetermined value $\Delta 1/LW$. If a result shows that the $\Delta 1/L$ is larger, the process moves to step S266, and to step S267 if not.

In step S266, a large distance difference is determined, while a small distance difference is determined in step S267. By making branch determination of step S233 in the flowchart of FIG. 51 based on such determination results, a situation of FIG. 45A or FIG. 45B can be determined, and the imager AF or the external light AF can be decided.

Figure 56:
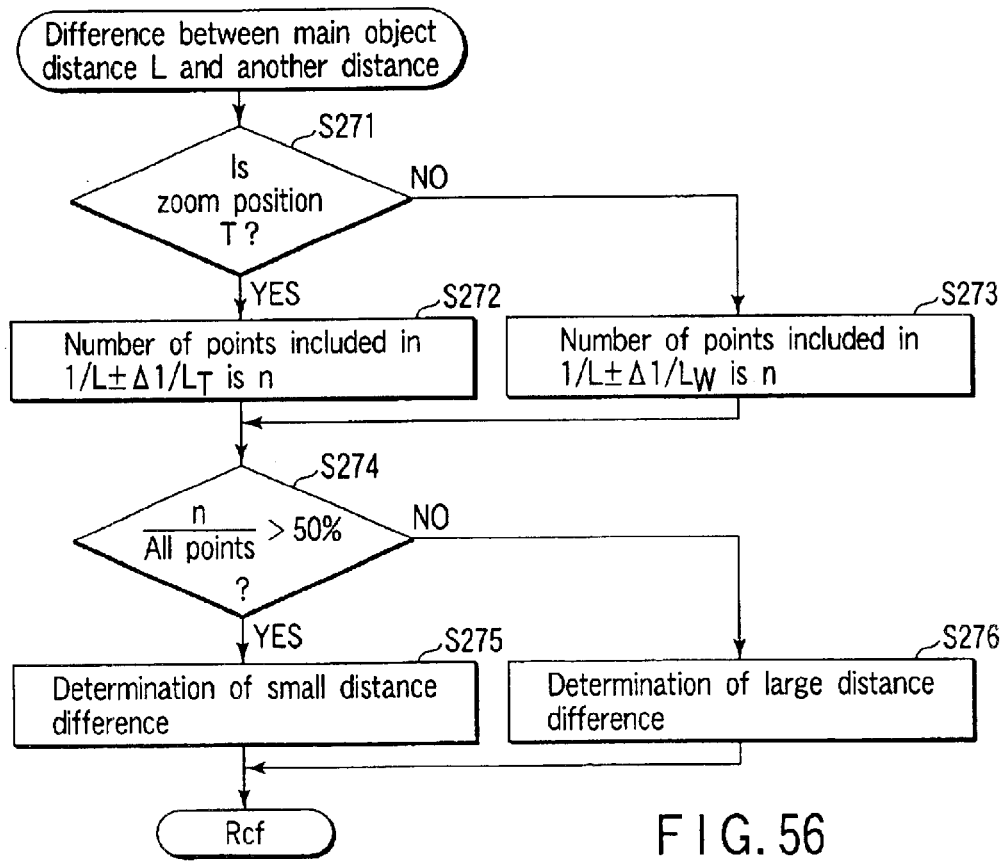
FIG. 56 is a flowchart showing a second example of changing the step S233 of determination to obtain a difference between the main object distance and another distance in the flowchart of FIG. 51.

In place of the determination step S233 of obtaining the difference between the main object distance and the other distance in the flowchart of FIG. 51, determination similar to that shown in a flowchart of FIG. 56 may be carried out based on the number of objects included in a predetermined distance range.

That is, in step S271, determination is first made as to whether a zoom position is tele (T) or not. If the zoom position is tele, the process moves to step S272, and if not, the process moves to step S273.

In step S272, with respect to the inverse number 1/L of the main object distance, the number of distance measuring points included in the range of the inverse number $\Delta 1/L_T$ of a switched distance is set to n. Similarly, in step S273, with respect to the inverse number 1/L of the main object distance, the number of distance measuring points included in a range of the inverse number $\Delta 1/1_W$ of a switched distance is set to n.

Then, in step S274, among all the distance measuring points of multidistance measuring, determination is made as to whether n obtained in step S272 or step S273 is larger than 50% or not. If it is larger than 50%, the process moves to step S275 to determine that a distance difference is small. On the other hand, if it is equal to/lower than 50%, the process moves to step S276 to determine that a distance difference is large.

Based on such result, scene determination may be carried out.

As described above, since a distance relation between the main object and the other object can be easily obtained by the determination method which uses simple calculation and comparison, it is possible to provide an AF camera which determines a scene at a high speed to enable accurate switching of an autofocus system which gives priority to a speed or focusing, and never loses a photo opportunity.

Next, a thirteenth embodiment will be described.

According to the foregoing eleventh and twelfth embodiments, the photographing scene is determined only based on the distance distribution. However, the invention is not limited to such determination. For example, as shown in FIG. 45C, if the main object 192a is located on the end of the screen 190, the background is also considered to be an important object and, even if the background distance is far, the operation may be switched to the AF which gives priority to the external light AF. In such an application case, in the flowchart of FIG. 51, a branch of determining an object position may be inserted between steps S233 and S235, and the process may be branched to step S234 if the main object is located on the end.

In addition to the distance distribution and the object position, a photographing scene may be determined based on a state of an image signal on the screen.

That is, in the scenes of FIGS. 45A and 45B, image data (main object) 192m obtained by the sensor arrays of the external light AF become similar to those shown in FIGS. 57 and 58A. That is, in FIG. 45A, the background is only a monotonous shade and, in FIG. 45B, there are various shades because various objects are present. In the case of such image data, great fluctuation characteristically occurs. To determine such characteristics, the amount of adjacent data is calculated to form so-called differentiation data. Accordingly, large data is generated in a place of changes, and data of a graph shown in FIG. 58B is obtained.

As shown in FIG. 58B, by investigating whether the differentiation data exceeds a predetermined value or not, it is possible to determine whether the scene in the screen is simple or rough.

FIG. 59 is a flowchart explaining a distance measuring operation of the camera which uses the image data obtained by external light distance measuring or the like, and determines a photographing scene to switch between the external light AF and the imager AF.

That is, first, in step S281, an image signal is detected by the external light AF sensor. Then, in step S282, a detection result of step S281 is used to carry out multipoint distance measuring. Then, in step S283, based on a result of step S282, data indicating a nearest distance is set for a main object distance.

In step S284, a point of the distance L obtained in step S283 is set as a main object. In subsequent step S285, differential value calculation which is a feature of the thirteenth embodiment is carried out.

Then, in step S286, as described above, the number of points which exceeds a predetermined amount is investigated, and this number is compared with a predetermined value $n_0$. If a result shows that the number is smaller than the predetermined value no, the process moves to step S288, and to step S287 if not.

In step S287, distance measuring by an external light is executed to focus on the distance L. Then, the process moves to step S292 to execute photographing.

On the other hand, in step S288, the taking lens is driven before the lens position equivalent to the main object distance L. Then, in step S289, contrast detection is started. Then, in step S290, a lens position of maximum contrast is detected. If contrast is not maximum, the process moves to step S291 to finely adjust the lens position, and a position of just focusing is searched.

Thus, until the position of maximum contrast is found, the process of steps S289 to S291 is repeated. After the position of maximum contrast is reached, focus is set on the position, and photographing is executed in step S292.

That is, focusing by the imager AF after step S288 or the external light AF after step S287 is switched. That is, considering that a scene having more differential time peaks is a rough scene, there are various objects, and these are also regarded as important objects. Conversely, in a scene of a smaller number of peaks, the main object is considered most important, and AF which gives priority to focusing is carried out.

As described above, according to the thirteenth embodiment, since scene determination is carried out by using the state of image distribution in the screen, it is possible to select an AF system most suited to the situation.

Incidentally, a contrast change of the object state can be determined by using not only the external distance measuring sensor arrays and the imager outputs but also the distance measuring sensor for camera exposure matching.

In most of the digital cameras, exposure control is carried out by using the CCD, but a camera similar to that shown in FIG. 60, on which a photometry sensor capable of instantaneous photometry of even low luminance, is available.

FIG. 60 is a schematic sectional view showing a constitution of a camera according to a fourteenth embodiment of the present invention.

In FIG. 60, a taking lens 252 is attached to the front of a camera main body 250. A half mirror 254 is disposed on an optical axis after the taking lens 252.

A CCD 266 which is an imager is arranged after the half mirror 254. A screen 256 and a pentaprism 258 are arranged above the half mirror 254. Thus, an object image made incident from the taking lens 258 is reflected on the half mirror 254 to be projected to the screen 256, and passed through the pentaprism 258 to be observed by an eye 160 of a photographer.

An external light optical system 262 is disposed between the screen 256 and the pentaprism 258. A photometry sensor 264 is arranged in a position which enables monitoring of an object image through the pentaprism 258. This photometry sensor 264 is divided, and can carry out photometry of a plurality of points, e.g., in a screen 278 like that shown in FIG. 61.

By using the photometry sensor of such a constitution, it is possible to measure a luminance distribution of the entire screen even if resolution is not as high as the CCD.

The embodiment can be applied to contrast determination which uses such a photometry sensor, and switching of an AF system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A camera comprising:
  a taking lens;
  a first focus adjustment section which adjusts a focusing position of the taking lens;
  a second focus adjustment section which has accuracy lower than that of the first focus adjustment section but which adjusts the focusing position of the taking lens at a high speed;
  an imaging section which includes an imager to image an object image through the taking lens, and converts an output signal of the imager into image data;
  a compressibility setting section which sets a compressibility of the image data obtained in the imaging section;
  a compression section which compresses the image data in accordance with the compressibility set in the compressibility setting section; and
  a deciding section which decides one of the first focus adjustment section and the second focus adjustment section which is employed to carry out a final focus adjustment operation of the taking lens in accordance with the compressibility set in the compressibility setting section.

2. The camera according to claim 1,
wherein the first focus adjustment section adjusts the focusing position of the taking lens by detecting a contrast change of the image data outputted from the imaging section during movement of the taking lens, and
the second focus adjustment section includes a section to output a signal dependent on a distance of an object, and adjusts the focusing position of the taking lens in accordance with an output result of the section.

3. The camera according to claim 1,
wherein the deciding section selects the first focus adjustment section when a first compressibility is set by the compressibility setting section, and the second focus adjustment section when a second compressibility smaller in compression rate than the first compressibility is set.

4. The camera according to claim 1,
wherein the first focus adjustment section carries out a focus adjustment by an imager AF system, and
the second focus adjustment section carries out a focus adjustment operation by an external light AF system or a TTL phase difference AF system.

5. A camera comprising:
a taking lens;
an imaging section which includes an imager to image an object image through the taking lens, and converts an output signal of the imager into image data;
a first focus adjustment section which adjusts a focusing position of the taking lens by detecting a contrast change of the image data outputted from the imaging section during movement of the taking lens;
a second focus adjustment section which includes a section to output a signal dependent on a distance of an object, and adjusts the focusing position of the taking lens in accordance with an output result of the section;
an image processing section which carries out predetermined processing for the image data outputted from the imaging section; and
a control section which causes one of the first focus adjustment section and the second focus adjustment section to execute a final focus adjustment operation for the taking lens in accordance with a processing content of the image processing section.

6. The camera according to claim 5,
wherein the image processing section includes a section to compress the image data obtained in the imaging section by a predetermined compressibility, and
the control section causes one of the focus adjustment sections to execute a final operation based on the compressibility.

7. The camera according to claim 5,
wherein the image processing section includes a section to convert the image data obtained in the imaging section into a predetermined image size, and
the control section causes one of the focus adjustment sections to execute a final operation based on the predetermined image size.

8. The camera according to claim 5,
wherein the image processing section includes a section to carry out edge emphasis processing for the image data obtained in the imaging section, and
the control section causes one of the focus adjustment sections to execute a final operation based on presence of the edge emphasis processing.

9. A camera comprising:
a taking lens;
an imaging section which includes an imager to image an object image through the taking lens, and converts an output signal of the imager into image data;
a compressibility setting section which sets a compressibility of the image data obtained in the imaging section;
a compression section which compresses the image data in accordance with the compressibility set in the compressibility setting section;
a first focus adjustment section which adjusts a focusing position of the taking lens by detecting a contrast change of the image data outputted from the imaging section during movement of the taking lens;
a second focus adjustment section which includes a section to output a signal dependent on a distance of an object, and adjusts the focusing position of the taking lens in accordance with an output result of the section; and
a control section which operates the second focus adjustment section alone when the compressibility set in the compressibility setting section is a first compressibility, and which operates the first focus adjustment section after the second focus adjustment section when the compressibility is a second compressibility lower than the first compressibility.

10. A camera comprising:
a taking lens;
an imager which images an object image through the taking lens;
an image processing circuit which generates digital image data from an output of the imager, and includes a compression circuit to compress the image data at a compressibility selected from a plurality of compressibilities;
a focus adjustment mechanism which adjusts a focusing position of the taking lens;
a distance measuring circuit which detects a distance of an object or a focus deviation amount of the taking lens; and
a CPU which receives the output of the imager and an output of the distance measuring circuit, controls the focus adjustment mechanism based on the received outputs, and decides a control form of the focus adjustment mechanism in accordance with the compressibility selected by the compression circuit.

11. The camera according to claim 10,
wherein the CPU controls the focus adjustment mechanism based on only the output of the distance measuring circuit when the selected compressibility is a first compressibility, and uses a focus adjustment based on the output of the imager in combination with a focus adjustment based on the output of the distance measuring circuit when the selected compressibility is a second compressibility lower than the first compressibility.

12. The camera according to claim 10,
wherein the CPU has a first control form to control the focus adjustment mechanism based on a contrast value of the image data outputted from the image processing circuit, and a second control form to control the focus adjustment mechanism based on the output of the distance measuring circuit.

* * * * *